US011659837B2

(12) United States Patent
Nave et al.

(10) Patent No.: US 11,659,837 B2
(45) Date of Patent: May 30, 2023

(54) MIXTURES COMPRISING AN UREASE INHIBITOR (UI) AND A NITRIFICATION INHIBITOR SUCH AS 2-(3,4-DIMETHYL-1H-PYRAZOL-1-YL)SUCCINIC ACID (DMPSA) OR 3,4-DIMETHYL PYRAZOLIUM GLYCOLATE (DMPG)

(71) Applicant: BASF SE, Ludwigshafen am Rhein (DE)

(72) Inventors: Barbara Nave, Limburgerhof (DE); Gregor Pasda, Limburgerhof (DE); Alexander Wissemeier, Limburgerhof (DE); Maarten Staal, Limburgerhof (DE); Karl-Heinrich Schneider, Limburgerhof (DE); Markus Schmid, Limburgerhof (DE); Wolfram Zerulla, Limburgerhof (DE); Daniella Lohe, Limburgerhof (DE); Sascha Shuxia Zhu, Ludswigshafen (DE); Wolfgang Weigelt, Limburgerhof (DE); Manuel Daumann, Limburgerhof (DE)

(73) Assignee: BASF SE, Ludwigshafen Am Rhein (DE)

( * ) Notice: Subject to any disclaimer, the term of this patent is extended or adjusted under 35 U.S.C. 154(b) by 360 days.

(21) Appl. No.: 16/630,047

(22) PCT Filed: Jul. 5, 2018

(86) PCT No.: PCT/IB2018/054952
§ 371 (c)(1),
(2) Date: Jan. 10, 2020

(87) PCT Pub. No.: WO2019/012382
PCT Pub. Date: Jan. 17, 2019

(65) Prior Publication Data
US 2020/0288712 A1 Sep. 17, 2020

(30) Foreign Application Priority Data
Jul. 10, 2017 (EP) .................................... 17180513

(51) Int. Cl.
A01N 43/56 (2006.01)
A01N 57/28 (2006.01)
C05G 3/60 (2020.01)
C05G 3/90 (2020.01)

(52) U.S. Cl.
CPC ............. A01N 43/56 (2013.01); A01N 57/28 (2013.01); C05G 3/60 (2020.02); C05G 3/90 (2020.02)

(58) Field of Classification Search
CPC .... C05G 3/90; C05G 3/60; C05C 9/00; C05C 11/00; A01N 57/28; A01N 43/56
See application file for complete search history.

(56) References Cited

U.S. PATENT DOCUMENTS

| 4,530,714 A | 7/1985 | Kolc et al. |
| 5,352,265 A | 10/1994 | Weston et al. |
| 5,422,107 A | 6/1995 | Kubota |
| 5,559,024 A | 9/1996 | Leroux et al. |
| 5,698,003 A | 12/1997 | Omilinsky et al. |
| 6,222,100 B1 | 4/2001 | Anderson et al. |
| 6,955,912 B2 | 10/2005 | Sasaki et al. |
| 9,725,372 B2 | 8/2017 | Barr et al. |
| 9,968,092 B2 | 5/2018 | Nave et al. |
| 10,556,844 B2 | 2/2020 | Nave et al. |
| 2010/0218575 A1 | 9/2010 | Wissemeier et al. |
| 2011/0154874 A1 | 6/2011 | Rahn et al. |
| 2015/0148231 A1* | 5/2015 | Nave ...................... A01N 47/24 504/282 |
| 2016/0052833 A1 | 2/2016 | Gabrielson et al. |
| 2016/0060184 A1 | 3/2016 | Gabrielson et al. |
| 2018/0273557 A1 | 9/2018 | Lang et al. |
| 2019/0026666 A1 | 1/2019 | Zhu |
| 2019/0112241 A1 | 4/2019 | Staal et al. |
| 2019/0276376 A1 | 9/2019 | Schneider et al. |

(Continued)

FOREIGN PATENT DOCUMENTS

| AU | 2015227487 B1 | 12/2015 |
| CN | 1204310 A | 1/1999 |
| CN | 101723753 A | 6/2010 |

(Continued)

OTHER PUBLICATIONS

Colby, "Calculating Synergistic and Antagonistic Responses of Herbicide Combinations", Weeds, Published 1967, pp. 20-22, vol. 15.
Kiss et al., Improving Efficiency of Urea Fertilizers by Inhibition of Soil Urease Activity, Published 2002, ISBN 1-4020-0493-1, Kluwer Academic Publishers, Dordrecht, The Netherlands.
Mollet et al., "Formulation Technology", Published 2001, Wiley VCH, Weinheim. (Table of Contents).
Nelson et al., "Nitrification Inhibitors for Corn Production", National Corn Handbook, Iowa State University, Published Jul. 2001, 6 Pages.
Slangen et al., "Nitrification Inhibitors in Agriculture and Horticulture: A Literature Review", Fertilizer Research, Published Mar. 1984, pp. 1-76, vol. 5, No. 1.

(Continued)

Primary Examiner — Johann R Richter
Assistant Examiner — Danielle Sullivan
(74) Attorney, Agent, or Firm — Armstrong Teasdale LLP

(57) ABSTRACT

Described herein are mixtures including as active components at least one specific nitrification inhibitor (compound I) and at least one urease inhibitor (compound II). Also described herein are a method for improving the nitrification-inhibiting effect, or for increasing the health of a plant using mixtures of at least one compound I and at least one compound II and a method of using the mixtures comprising compounds I and compounds II for increasing the health of a plant. Also described herein are agrochemical compositions including these mixtures. Also described herein is plant propagation material including these mixtures or these agrochemical compositions.

11 Claims, No Drawings

(56) References Cited

U.S. PATENT DOCUMENTS

| | | | |
|---|---|---|---|
| 2020/0002609 A1 | 1/2020 | Mainwaring et al. | |
| 2021/0214285 A1 | 7/2021 | Mannheim et al. | |

FOREIGN PATENT DOCUMENTS

| | | | |
|---|---|---|---|
| CN | 101817712 A | | 9/2010 |
| CN | 101844948 A | | 9/2010 |
| CN | 2012-M25108 | * | 11/2012 |
| CN | 105669332 A | | 6/2016 |
| CN | 106068252 A | | 11/2016 |
| CN | 106083290 A | | 11/2016 |
| CN | 106365927 A | | 2/2017 |
| CN | 106470962 A | | 3/2017 |
| CN | 107207443 A | | 9/2017 |
| CN | 112292366 A | | 1/2021 |
| DE | 102013022031 B3 | | 9/2014 |
| EP | 0119487 A1 | | 9/1984 |
| EP | 0242236 A1 | | 10/1987 |
| EP | 0242246 A1 | | 10/1987 |
| EP | 0374753 A2 | | 6/1990 |
| EP | 0392225 A2 | | 10/1990 |
| EP | 0427529 A1 | | 5/1991 |
| EP | 0451878 A1 | | 10/1991 |
| EP | 0917526 B1 | | 12/2001 |
| EP | 0954213 B1 | | 5/2003 |
| EP | 1124414 B1 | | 8/2003 |
| EP | 2785697 B1 | | 2/2016 |
| EP | 3028573 A1 | | 6/2016 |
| EP | 3109223 A1 | | 12/2016 |
| WO | 9200377 A1 | | 1/1992 |
| WO | 9307278 A1 | | 4/1993 |
| WO | 9534656 A1 | | 12/1995 |
| WO | 9741218 A1 | | 11/1997 |
| WO | 9802526 A1 | | 1/1998 |
| WO | 9802527 A1 | | 1/1998 |
| WO | 0026390 A2 | | 5/2000 |
| WO | 0182685 A1 | | 11/2001 |
| WO | 0215701 A2 | | 2/2002 |
| WO | 03013225 A2 | | 2/2003 |
| WO | 03014356 A1 | | 2/2003 |
| WO | 03014357 A1 | | 2/2003 |
| WO | 03018810 A2 | | 3/2003 |
| WO | 03052073 A2 | | 6/2003 |
| WO | 2004016073 A2 | | 2/2004 |
| WO | 2004106529 A2 | | 12/2004 |
| WO | 2005007636 A1 | | 1/2005 |
| WO | 2005020673 A1 | | 3/2005 |
| WO | 2005120226 A2 | | 12/2005 |
| WO | 2006112700 A1 | | 10/2006 |
| WO | 2007067042 A1 | | 6/2007 |
| WO | 2007067044 A2 | | 6/2007 |
| WO | 2008002371 A1 | | 1/2008 |
| WO | 2013121384 A2 | | 8/2013 |
| WO | 2015086823 A2 | | 6/2015 |
| WO | 2015104698 A2 | | 7/2015 |
| WO | 2016113727 A2 | | 7/2016 |
| WO | 2016124769 A1 | | 8/2016 |
| WO | 2017011288 A1 | | 1/2017 |
| WO | 2017019526 A2 | | 2/2017 |
| WO | 2017198693 A1 | | 11/2017 |
| WO | 2018116046 A1 | | 6/2018 |
| WO | 2018158675 A1 | | 9/2018 |
| WO | 2019012377 A1 | | 1/2019 |
| WO | 2019012378 A1 | | 1/2019 |
| WO | 2019012379 A1 | | 1/2019 |
| WO | 2019012380 A1 | | 1/2019 |
| WO | 2019012381 A1 | | 1/2019 |
| WO | 2019012383 A1 | | 1/2019 |

OTHER PUBLICATIONS

Subbarao et al., "Biological Nitrification Inhibition—A Novel Strategy to Regulate Nitrification in Agricultural Systems", Advances in Agronomy, Published 2012, pp. 249-302, vol. 114.

International Search Report and Written Opinion for International Application No. PCT/IB2018/054952, dated Sep. 29, 2018, 8 pages.

Kiss, et al., "Improving Efficiency of Urea Fertilizers by Inhibition of Soil Urease Activity", 2002, 93 pages.

Ding, et al., "Current State of research and development tendency of Nitrogen Fertilizer synergism technology", Modern Agricultural Science, vol. 16, Issue 2, Feb. 20, 2009, pp. 24-29. Cited in Office Action of corresponding CN Application No. 201880045932.4, no English translation available.

Zhou Xiaoyun, "Principles of Enzymology and Enzyme Engineering", Ed. Zhou Xiaoyun, Aug. 2005, pp. 235-236. Cited in Office Action of corresponding CN Application No. 201880045932.4, appended with English translation.

* cited by examiner

MIXTURES COMPRISING AN UREASE INHIBITOR (UI) AND A NITRIFICATION INHIBITOR SUCH AS 2-(3,4-DIMETHYL-1H-PYRAZOL-1-YL)SUCCINIC ACID (DMPSA) OR 3,4-DIMETHYL PYRAZOLIUM GLYCOLATE (DMPG)

CROSS-REFERENCE TO RELATED APPLICATIONS

This application is a U.S. National Phase Application of PCT/IB2018/054952, filed on Jul. 5, 2018, which claims the benefit of priority to European Patent Application Number 17180513.8, filed Jul. 10, 2017, the entire contents of which are hereby incorporated by reference herein.

The present invention relates to the mixture comprising nitrification inhibitors (compound I) and urease inhibitors (compound II). Moreover, the invention relates to the use of this combination comprising nitrification inhibitors (compound I) and urease inhibitors (compound II) for increasing $NH_4$—N/$NO_3$—N ratios in soil ("$NH_4$—N" is ammonium nitrogen, "$NO_3$—N" is nitrate nitrogen), decreasing nitrification, and increasing the health of a plant, and/or for providing better crop yields and/or a better quality of the plants or crops, and/or for contributing to a better resistance to stress, and/or for reducing the emission of ammonia and nitrous oxide. Furthermore, the present invention relates to methods for increasing the health of a plant comprising the treatment of plants, soil and/or loci with said mixture comprising the nitrification inhibitor (compound I) and an urease inhibitor (compound II).

Worldwide, the predominant and further-increasing amount of the nitrogen used for fertilizing is employed in the form of urea or urea-containing fertilizers. Urea itself, however, is a form of nitrogen which is absorbed very little if at all, being hydrolyzed relatively rapidly by the enzyme urease, which is present ubiquitously in the soil, to form ammonia and carbon dioxide. In this process, in certain circumstances, gaseous ammonia is emitted to the atmosphere, and is then no longer available in the soil for the plants, thereby lowering the efficiency of fertilization.

It is known that the degree of utilization of the nitrogen when using urea-containing fertilizers can be improved by spreading urea-containing fertilizers together with substances which are able to inhibit or decrease the enzymatic cleavage of urea (for a general review, see Kiss, S. Simihäian, M. (2002) Improving Efficiency of Urea Fertilizers by Inhibition of Soil Urease Activity, ISBN 1-4020-0493-1, Kluwer Academic Publishers, Dordrecht, The Netherlands). Among the most potent known urease inhibitors are N-alkylthiophosphoric acid triamides and N-alkylphosphoric acid triamides, which are described in EP 0 119 487, for example.

Additionally, mixtures of N-alkylthiophosphoric acid triamides such as N-(n-butyl)thiophosphoric acid triamide (NBPT) and N-(n-propyl)thiophosphoric acid triamide (NPPT) can be used. The mixtures and their preparation are described in US 2010/218575 A1, for example.

These urease inhibitors are described in U.S. Pat. No. 4,530,714, for example. In order for this class of compound to be able to act as a urease inhibitor, there must first be a conversion to the corresponding oxo form. That form reacts subsequently with the urease, causing its inhibition.

It is advisable to apply the urease inhibitors together with the urea onto or into the soil, since this ensures that the inhibitor comes into contact, together with the fertilizer, with the soil. The urease inhibitor may be incorporated in the urea by, for example, dissolving it into the melt prior to urea granulation or prilling. A process of this kind is described in U.S. Pat. No. 5,352,265, for example. A further option is to apply the urease inhibitor to the urea granules or prills, in the form of a solution, for example.

Corresponding processes for application, and suitable solvents, are described in US 2010/218575 A1, for example. Other suitable additives, for example amines selected from methyldiethanolamine, tetrahydroxypropylethylenediamine, trimethylaminoethylethanolamine, N,N,N',N'-tetramethyl-1, 6-hexanediamine, N,N',N''-tris(dimethylaminopropyl)hexahydrotriazine, and 2,2'-dimorpholinyldiethyl ether, are described in US 2011/0154874 A1.

The storage life of the urease inhibitor is limited. The higher the temperature, the shorter the storage life. If, for example, urea is stored under tropical conditions, a major part of the urease inhibitor has undergone decomposition, generally, after about four weeks of storage. If the urease inhibitor is introduced into the urea melt, the decomposition is less. For the commercialization of the urea stabilized with the urease inhibitor, however, it is often vital to apply the urease inhibitor to urea and to store the treated fertilizer until the time of its spreading to the soil.

Nitrogen is an essential element for plant growth, plant health and reproduction. About 25% of the plant available nitrogen in soils (ammonium and nitrate) originate from decomposition processes (mineralization) of organic nitrogen compounds such as humus, plant and animal residues and organic fertilizers. Approximately 5% derive from rainfall. On a global basis, the biggest part (70%), however, are supplied to the plant by inorganic nitrogen fertilizers. The mainly used nitrogen fertilizers comprise ammonium compounds or derivatives thereof, i.e. nearly 90% of the nitrogen fertilizers applied worldwide is in the $NH_4^+$ form (Subbarao et al., 2012, Advances in Agronomy, 114, 249-302) or are based on neem-extract, including various compounds such as neemoil-coated fertilizers, neem-coated fertilizers, nimincoated fertilizers and fertilizers with neem cake from the Indian neem tree (Azadirachta indica). This is, inter alia, due to the fact that $NH_4^+$ assimilation is energetically more efficient than assimilation of other nitrogen sources such as $NO_3^-$.

Moreover, being a cation, $NH_4^+$ is held electrostatically by the negatively charged clay surfaces and functional groups of soil organic matter. This binding is strong enough to limit $NH_4^+$-loss by leaching to groundwater. By contrast, $NO_3^-$, being negatively charged, does not bind to the soil and is liable to be leached out of the plants' root zone. In addition, nitrate may be lost by denitrification which is the microbiological conversion of nitrate and nitrite ($NO_2^-$) to gaseous forms of nitrogen such as nitrous oxide ($N_2O$) and molecular nitrogen ($N_2$).

However, ammonium ($NH_4^+$) compounds are converted by soil microorganisms to nitrates ($NO_3^-$) in a relatively short time in a process known as nitrification. The nitrification is carried out primarily by two groups of chemolithotrophic bacteria, ammonia-oxidizing bacteria (AOB) of the genus *Nitrosomonas* and *Nitrobacter*, which are ubiquitous component of soil bacteria populations. The enzyme, which is essentially responsible for nitrification is ammonia monooxygenase (AMO), which was also found in ammoniaoxidizing archaea (Subbarao et al., 2012, Advances in Agronomy, 114, 249-302).

The nitrification process typically leads to nitrogen losses and environmental pollution. As a result of the various losses, approximately 50% of the applied nitrogen fertilizers is lost during the year following fertilizer addition (see Nelson and Huber; Nitrification inhibitors for corn production (2001), National Corn Handbook, Iowa State University).

As countermeasures, the use of nitrification inhibitors, mostly together with fertilizers, was suggested. Suitable nitrification inhibitors include biological nitrification inhibitors (BNIs) such as linoleic acid, alpha-linolenic acid, methyl p-coumarate, methyl ferulate, MHPP, Karanjin, brachialacton or the p-benzoquinone sorgoleone (Subbarao et al., 2012, Advances in Agronomy, 114, 249-302). Further suitable nitrification inhibitors are synthetic chemical inhibitors such as Nitrapyrin, dicyandiamide (DCD), 3,4-dimethyl pyrazole phosphate (DMPP), 4-amino-1,2,4-triazole hydrochloride (ATC), 1-amido-2-thiourea (ASU), 2-amino-4-chloro-6-methylpyrimidine (AM), 5-ethoxy-3-trichloromethyl-1,2,4-thiodiazole (terrazole), or 2-sulfanilamidothiazole (ST) (Slangen and Kerkhoff, 1984, Fertilizer research, 5(1), 1-76).

EP 0 917 526 further mentions the use of polyacids to treat mineral fertilizers containing a nitrification inhibitor in order to improve the fixation of the nitrification inhibitors in the inorganic fertilizer. Moreover, the volatility of the nitrification inhibitor can be reduced.

However, many of these inhibitors only work sub-optimal or have undesirable side effects.

In view of this situation there is a continuous need for compositions or mixtures that increase the health of plants. Healthier plants are desirable since they result among other in better crop yields and/or a better quality of the plants or crops. Healthier plants also better resist to biotic and abiotic stress. A better resistance to stress in turn allows reducing the quantity of pesticides, which also helps avoiding the development of resistances against the respective pesticides.

One object of the present invention is to provide a composition or mixture containing a nitrification inhibitor and/or an urease inhibitor (compound II) which increases the health of plants, and/or provides better crop yields and/or a better quality of the plants or crops, and/or shows a better resistance to stress, and/or allows the reduction of the quantity of pesticides used, and/or helps avoiding the development of resistances against the respective pesticides.

Another object of the present invention is to provide a composition or mixture containing the nitrification inhibitor (compound I) and/or an urease inhibitor (compound II) which—each preferably through a synergistic action—
(i) enhances the stability of compound I, and/or
(ii) enhances the nitrification-inhibiting effect of compound I, and/or
(iii) enhances the yield increase effect of the compound I, and/or
(iv) has a relatively long storage life, particularly before being applied to or coated on nitrogen-containing fertilizers, and/or
(v) reduces the emission of nitrous oxide from soils, and/or
(vi) reduces the ammonia emission from soils, and/or
(vii) reduces nitrate leaching, and/or
(viii) does not adversely affect the nitrification-inhibiting effect and/or the nitrification-inhibiting activity of the compound I, and/or
(ix) can be easily and safely packaged, transported and shipped, even in large quantities, and/or
(x) can be easily and safely handled and applied for soil treatment, even in large quantities, and/or
(xi) improves the nutrient use efficiency, and/or
(xii) enhances the stability of compound II, and/or
(xiii) improves the plant growth (e.g. biomass, yield, root branching and length; compact growth in case of ornamental plants), and/or
(xiv) enables a better developed root system, a larger leaf area, greener leaves, stronger shoots and/or
(xv) improves the plant defense of the plants, and/or
(xvi) improves the plant health of the plants, and/or
(xvii) improves the quality of the plants, and/or
(xviii) improves the storage of the urease inhibitor (compound II) and/or prolongs the availability of urease inhibitor (compound II) in the soil, and/or
(xix) enhances the urease-inhibiting effect of the urease inhibitor (compound II), and/or (xx) allows the reduction of the quantity of urease inhibitor (compound II) used, and/or (xxi) increase the survivability rate of seedlings, for example transplanted seedlings, and/or (xxii) reduce or avoid unfavorable environmental or toxicological effects whilst still allowing effective pest control, and/or
(xxiii) enable earlier seed germination and/or blooming, and/or
(xxiv) is toxicologically unobjectionable, and/or
(xxv) enables simple handling and application of compound I and compound II.

The objects (xiii), (xiv), (xv), (xvi), (xvii) and (xxi) particularly pertains to such plants or seedlings wherein such plants or seedlings were treated with the mixture or composition, or the soil in which the such plants or seedlings were placed was subject to the application of the mixture or composition of the present invention.

The preferred objects of the present invention are (i), (ii), (v), (vi), (vii), (xi), (xii), (xiii), (xiv), (xv), (xvi), (xvii), (xviii), (xix), (xx), (xxii), (xxiv), (xxv), the more preferred objects of the present invention are (i), (ii), (v), (vi), (vii), (xii), (xiii), (xv), (xvi), (xix), (xx), and/or (xxii), the most preferred objects of the present invention are (i), (ii), (v), (vii), (xvi), (xix), and/or (xxii), the particularly preferred objects of the present invention are (ii), (v), (vii), (xvi) and/or (xix).

The term "urease inhibitor" is also referred to as "UI" in the following.

The term "in a synergistic way" means that the composition or mixture comprising the nitrification inhibitor (compound I) and the urease inhibitor (compound II) can fulfil one or more of the objects (i) to (xxiv) significantly better than the individual compounds—i.e. compound I or compound II—alone can do, and preferably, this better fulfillment of the objects by said composition or mixture compared to the individual compounds is evidenced by calculations according to Colby's formula, see Colby, S. R. (Calculating synergistic and antagonistic responses of herbicide Combinations", Weeds, 15, pp. 20-22, 1967).

The present invention relates to a mixture comprising as active components
1) at least one active compound I (nitrification inhibitor) selected from the group consisting of:
   a) 2-(3,4-dimethyl-1H-pyrazol-1-yl)succinic acid (referred to as "DMPSA1" in the following) and/or 2-(4,5-dimethyl-1H-pyrazol-1-yl)succinic acid (referred to as "DMPSA2" in the following; "DMPSA1" and/or "DMPSA2" is referred to as "DMPSA" in the following), and/or a derivative thereof, and/or a salt thereof,
   b) glycolic acid addition salt of 3,4-dimethyl pyrazole (3,4-dimethyl pyrazolium glycolate, referred to as "DMPG" in the following), and/or an isomer thereof, and/or a derivative thereof, c) citric acid addition salt of 3,4-dimethyl pyrazole (3,4-dimethyl pyrazolium citrate, referred to as "DMPC" in the following), and/or an isomer thereof, and/or a derivative thereof,
d) lactic acid addition salt of 3,4-dimethyl pyrazole (3,4-dimethyl pyrazolium lactate, referred to as "DMPL" in the following), and/or an isomer thereof, and/or a derivative thereof,
e) mandelic acid addition salt of 3,4-dimethyl pyrazole (3,4-dimethyl pyrazolium mandelate, referred to as "DMPM" in the following), and/or an isomer thereof, and/or a derivative thereof,
f) 1,2,4-triazole (referred to as "TZ" in the following), and/or a derivative thereof, and/or a salt thereof,
g) 4-Chloro-3-methylpyrazole (referred to as "CIMP" in the following), and/or an isomer thereof, and/or a derivative thereof, and/or a salt thereof,
h) N-((3(5)-methyl-1H-pyrazole-1-yl)methyl)acetamide, and/or an isomer thereof, and/or a derivative thereof, and/or a salt thereof,
i) N-((3(5)-methyl-1H-pyrazole-1-yl)methyl)formamide, and/or an isomer thereof, and/or a derivative thereof, and/or a salt thereof,
j) N-((3(5),4-dimethylpyrazole-1-yl)methyl)formamide, and/or an isomer thereof, and/or a derivative thereof, and/or a salt thereof,
k) N-((4-chloro-3(5)-methyl-pyrazole-1-yl)methyl)formamide, and/or an isomer thereof, and/or a derivative thereof, and/or a salt thereof,
l) a reaction adduct of dicyandiamide, urea and formaldehyde, or a triazonyl-formaldehyde-dicyandiamide adduct,
m) 2-cyano-1-((4-oxo-1,3,5-triazinan-1-yl)methyl)guanidine,
n) 1-((2-cyanoguanidino)methyl)urea,
o) 2-cyano-1-((2-cyanoguanidino)methyl)guanidine,
p) 2-chloro-6-(trichloromethyl)-pyridine (nitrapyrin or N-serve),
q) dicyandiamide (DCD, DIDIN),
r) 3,4-dimethyl pyrazole phosphate, and/or 4,5-dimethyl pyrazole phosphate (DMPP, ENTEC), and/or an isomer thereof, and/or a derivative thereof,
s) 3,4-dimethylpyrazole, and/or 4,5-dimethylpyrazole (DM P), and/or an isomer thereof, and/or a derivative thereof, and/or a salt thereof, and/or an acid addition salt thereof,
t) ammoniumthiosulfate (ATU),
u) neem, and/or products based on ingredients of neem,
v) linoleic acid,
w) alpha-linolenic acid,
x) methyl p-coumarate,
y) methyl ferulate,
z) methyl 3-(4-hydroxyphenyl) propionate (MHPP),
aa) Karanjin,
bb) brachialacton,
cc) p-benzoquinone sorgoleone,
dd)-4-amino-1,2,4-triazole hydrochloride (ATC),
ee)-1-amido-2-thiourea (ASU),
ff) 2-amino-4-chloro-6-methylpyrimidine (AM),
gg)-2-mercapto-benzothiazole (MBT),
hh)-5-ethoxy-3-trichloromethyl-1,2,4-thiodiazole (terrazole, etridiazole),
ii) 2-sulfanilamidothiazole (ST),
jj) 3-methylpyrazol (3-MP),
kk) 1,2,4-triazol thiourea (TU),
ll) cyan amide,
mm) melamine,
nn) zeolite powder,
oo) catechol,
pp) benzoquinone,
qq) sodium tetra borate,
rr) allylthiourea,
ss) chlorate salts, and
tt) zinc sulfate;
and
2) at least one active compound II (urease inhibitor) selected from the group consisting of P.1 to P.61:
p-benzoquinone (P.1), polyphenols (P.2), heterocyclic mercaptans (P.3), polyacrylamides and derivatives thereof (P.4), dihydroxamic acids (P.5), aminocresols (P.6), aminophenols (P.7), bromo-nitro compounds (P.8), thiourea (P.9), hydroxamates (P.10), sodium chloride (P.11), sodium carbonate (P.12), urea phosphate (P.13), urea nitrate (P.14), ammonium thiosulfate (P.15), calcium chloride (P.16), fluoride salts (P.17), O-diaminophosphinyl oximes (P.18), phosphinyl sulfamides (P.19), phosphorodiamidates (P.20), polyphosphorodiamides (P.21), cyclotriphosphazatrienes (P.22), N-acylphosphoric triamides (P.23), metal phosphorylesters (P.24), S-aryl(alkyl) diamidophosphorothiolates (P.25), N-(n-butyl)thiophosphoric acid triamide (NBPT) (P.26), N-(n-propyl)thiophosphoric acid triamide (NPPT) (P.27), mixtures comprising N-(n-butyl) thiophosphoric acid triamide (NBPT) and N-(n-propyl) thiophosphoric acid triamide (NPPT) (P.28), mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), phenylphosphorodiamidate (PPD/PPDA) (P.30), 2-nitrophenyl phosphoric triamide (2-NPT) (P.31), 2,5-dimethyl-1,4-benzoquinone (P.32), hydroquinone (P.33), thymol (P.34), pyrocatechol (P.35), triacontanyl palmitate (P.36), barturic acid (P.37), thiobarbituric acid (P.38), triazoles (P.39), 3-substitute-4-amino-5-thioxo-1H,4H-1,2,4-triazoles (P.40), alpha-hydroxyketones (P.41), alpha-diketones (P.42), hydroxyurea (P.43), tri ketone oximes (P.44), boric acid or salts or derivatives thereof (P.45), sodium or other salts of sulfate (P.46), sodium or other salts of benzenesulfinate (P.47), sodium or other salts of benzenesulfonate (P.48), sodium or other salts of sulfite (P.49), iodoacetic acid (P.50), N-ethylmaleimide (P.51), p-hydroxymercuribenzoate (P.52), p-chloromercuribenzoate (P.53), biscoumarin (P.54), a 1,2,4-thiadiazol-5-thio compound or derivatives thereof (P.55),
a thiophosphoric acid triamide according to the general formula (Ia) (P.56)

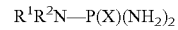
$$R^1R^2N-P(X)(NH_2)_2 \qquad (Ia)$$

wherein
X is sulfur;
$R^1$ and $R^2$ are—independent from each other—H, substituted or unsubstituted 2-Nitrophenyl, $C_1$ to $C_{20}$ alkyl, $C_3$ to $C_{20}$ cycloalkyl, $C_6$ to $C_{20}$ heterocycloaryl, $C_6$ to $C_{20}$ aryl, or dialkylaminocarbonyl group, wherein $R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur;

a phosphoric acid triamide according to the general formula (Ib) (P.57)

$$R^1R^2N\text{—}P(Y)(NH_2)_2 \quad (Ib)$$

wherein
Y is oxygen;
$R^1$ and $R^2$ are—independent from each other—H, substituted or unsubstituted 2-Nitrophenyl, $C_1$ to $C_{20}$ alkyl, $C_3$ to $C_{20}$ cycloalkyl, $C_6$ to $C_{20}$ heterocycloaryl, $C_6$ to $C_{20}$ aryl, or dialkylaminocarbonyl group, wherein $R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
an adduct of N-(n-butyl) thiophosphoric acid triamide (NBPT), urea and formaldehyde (P.58),
an adduct of N-(n-butyl) thiophosphoric acid triamide (NBPT), urea and formaldehyde according to the formula (Ic) (P.59),

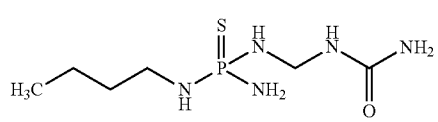

an adduct of N-(n-butyl) thiophosphoric acid triamide (NBPT), urea and formaldehyde according to the formula (Id) (P.60),

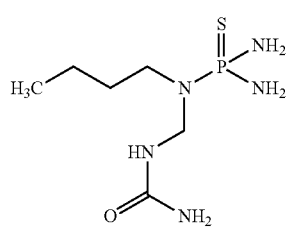

an adduct of N-(n-butyl) thiophosphoric acid triamide (NBPT), urea and formaldehyde according to the formula (Ie) (P.61),

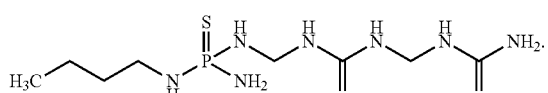

The present invention also relates to a mixture comprising as active components
1) at least one active compound I (nitrification inhibitor) being:
   2-(3,4-dimethyl-1H-pyrazol-1-yl)succinic acid (referred to as "DMPSA1" in the following) and/or 2-(4,5-dimethyl-1H-pyrazol-1-yl)succinic acid (referred to as "DMPSA2" in the following), and/or a derivative thereof, and/or a salt thereof, and
2) at least one active compound II (urease inhibitor) selected from the group consisting of P.1 to P.61:
   p-benzoquinone (P.1), polyphenols (P.2), heterocyclic mercaptans (P.3), polyacrylamides and derivatives thereof (P.4), dihydroxamic acids (P.5), aminocresols (P.6), aminophenols (P.7), bromo-nitro compounds (P.8), thiourea (P.9), hydroxamates (P.10), sodium chloride (P.11), sodium carbonate (P.12), urea phosphate (P.13), urea nitrate (P.14), ammonium thiosulfate (P.15), calcium chloride (P.16), fluoride salts (P.17), O-diaminophosphinyl oximes (P.18), phosphinyl sulfamides (P.19), phosphorodiamidates (P.20), polyphosphorodiamides (P.21), cyclotriphosphazatrienes (P.22), N-acylphosphoric triamides (P.23), metal phosphorylesters (P.24), S-aryl(alkyl) diamidophosphorothiolates (P.25), N-(n-butyl)thiophosphoric acid triamide (NBPT) (P.26), N-(n-propyl)thiophosphoric acid triamide (NPPT) (P.27), mixtures comprising N-(n-butyl) thiophosphoric acid triamide (NBPT) and N-(n-propyl) thiophosphoric acid triamide (NPPT) (P.28), mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), phenylphosphorodiamidate (PPD/PPDA) (P.30), 2-nitrophenyl phosphoric triamide (2-NPT) (P.31), 2,5-dimethyl-1,4-benzoquinone (P.32), hydroquinone (P.33), thymol (P.34), pyrocatechol (P.35), triacontanyl palmitate (P.36), barturic acid (P.37), thiobarbituric acid (P.38), triazoles (P.39), 3-substitute-4-amino-5-thioxo-1H,4H-1,2,4-triazoles (P.40), alpha-hydroxyketones (P.41), alpha-diketones (P.42), hydroxyurea (P.43), triketone oximes (P.44), boric acid or salts or derivatives thereof (P.45), sodium or other salts of sulfate (P.46), sodium or other salts of benzenesulfinate (P.47), sodium or other salts of benzenesulfonate (P.48), sodium or other salts of sulfite (P.49), iodoacetic acid (P.50), N-ethylmaleimide (P.51), p-hydroxymercuribenzoate (P.52), p-chloromercuribenzoate (P.53), biscoumarin (P.54), a 1,2,4-thiadiazol-5-thio compound or derivatives thereof (P.55),
a thiophosphoric acid triamide according to the general formula (Ia) (P.56)

$$R^1R^2N\text{—}P(X)(NH_2)_2 \quad (Ia)$$

wherein
X is sulfur;
$R^1$ and $R^2$ are—independent from each other—H, substituted or unsubstituted 2-Nitrophenyl, $C_1$ to $C_{20}$ alkyl, $C_3$ to $C_{20}$ cycloalkyl, $C_6$ to $C_{20}$ heterocycloaryl, $C_6$ to $C_{20}$ aryl, or dialkylaminocarbonyl group, wherein $R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur;
a phosphoric acid triamide according to the general formula (Ib) (P.57)

$$R^1R^2N\text{—}P(Y)(NH_2)_2 \quad (Ib)$$

wherein
Y is oxygen;
$R^1$ and $R^2$ are—independent from each other—H, substituted or unsubstituted 2-Nitrophenyl, $C_1$ to $C_{20}$ alkyl, $C_3$ to $C_{20}$ cycloalkyl, $C_6$ to $C_{20}$ heterocycloaryl, $C_6$ to $C_{20}$ aryl, or dialkylaminocarbonyl group, wherein $R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur, an adduct of N-(n-butyl) thiophosphoric acid triamide (NBPT), urea and formaldehyde (P.58), an adduct of N-(n-butyl) thiophosphoric acid triamide (NBPT), urea and formaldehyde according to the formula (Ic) (P.59),

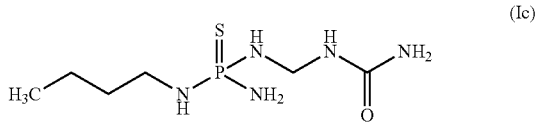

(Ic)

an adduct of N-(n-butyl) thiophosphoric acid triamide (NBPT), urea and formaldehyde according to the formula (Id) (P.60),

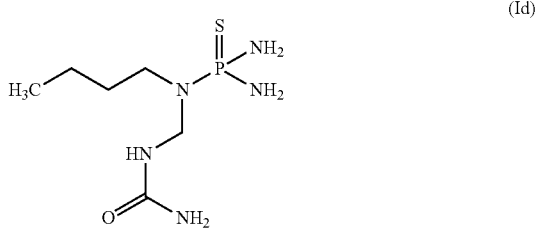

(Id)

an adduct of N-(n-butyl) thiophosphoric acid triamide (NBPT), urea and formaldehyde according to the formula (Ie) (P.61),

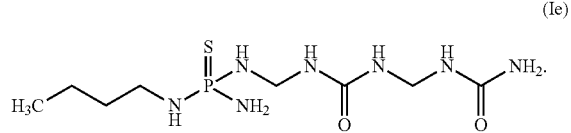

(Ie)

The 1,2,4-thiadiazol-5-thio compound or a derivatives thereof has been disclosed in WO05/007636 A1.

An adduct of N-(n-butyl) thiophosphoric acid triamide (NBPT), urea and formaldehyde, as well as the adducts according to the formulae (Ic), (Id) and (Ie) have been disclosed in WO17/019528.

The above mixture of the present invention also includes kit-of-parts comprising a nitrification inhibitor (compound I) and a urease inhibitor (compound II). Here, the term "kit-of-parts" is to be understood to denote a kit comprising at least two separate parts wherein each of the parts can be independently removed from the kit. A kit includes a box, a tool, a vessel, a container, a bag or any kit-like equipment. Also a kit whose separate parts are only together in this one kit for a extremely short period of time are regarded as kit-of-parts. Kit-of-parts are useful for the combined application (of the contents) of the separate parts of the kit.

The present invention also relates to an agrochemical composition, comprising an auxiliary and a mixture comprising as active components at least one compound I and at least one compound II.

The present invention also relates to the use of a mixture or an agrochemical composition according to the invention for nitrification inhibition and/or for increasing the health of a plant and/or for urease inhibition.

The present invention also relates to a method for enhancing the use efficiency of urea-containing fertilizer or for urease inhibition with an effective amount of a mixture or of an agrochemical composition according to the invention.

The present invention also relates to a method for enhancing the efficiency of urea-containing fertilizer or for urease inhibition comprising treating the the seed, or the soil, or the plants with an effective amount of a mixture or of an agrochemical composition according to the invention.

The present invention also relates to a method for increasing the health of a plant, comprising treating the plant or the plant propagation material or the soil where the plants are to grow with an effective amount of the mixture or of an agrochemical composition according to the invention.

The present invention also relates to plant propagation material, comprising a mixture or an agrochemical composition according to the invention in an amount of from 0.1 to 10 kg active substances per 100 kg of seed.

In addition, a process for treating the soil comprising applying the compositions of the invention into the soil in-furrow and/or as side dress and/or as broadcast was found.

Moreover, the use of the compositions of the invention as additive or coating material for nitrogen-containing fertilizers has been found.

The term "soil" is to be understood as a natural body comprised of living (e.g. microorganisms (such as bacteria and fungi), animals and plants) and non-living matter (e.g. minerals and organic matter (e.g. organic compounds in varying degrees of decomposition), liquid, and gases) that occurs on the land surface, and is characterized by soil horizons that are distinguishable from the initial material as a result of various physical, chemical, biological, and anthropogenic processes. From an agricultural point of view, soils are predominantly regarded as the anchor and primary nutrient base for plants (plant habitat).

The term "fertilizer" is to be understood as chemical compounds applied to promote plant and fruit growth. Fertilizers are typically applied either through the soil (for uptake by plant roots) or by foliar feeding (for uptake through leaves). The term "fertilizer" can be subdivided into two major categories: a) organic fertilizers (composed of decayed plant/animal matter) and b) inorganic fertilizers (composed of chemicals and minerals). Organic fertilizers include manure, slurry, worm castings, peat, seaweed, sewage, and guano. Green manure crops are also regularly grown to add nutrients (especially nitrogen) to the soil. Manufactured organic fertilizers include compost, blood meal, bone meal and seaweed extracts. Further examples are enzymatically digested proteins, fish meal, and feather meal. The decomposing crop residue from prior years is another source of fertility. In addition, naturally occurring minerals such as mine rock phosphate, sulfate of potash and limestone are also considered inorganic fertilizers. Inorganic fertilizers are usually manufactured through chemical processes (such as the Haber-Bosch process), also using naturally occurring deposits, while chemically altering them (e.g. concentrated triple superphosphate). Naturally occurring inorganic fertilizers include Chilean sodium nitrate, mine rock phosphate, and limestone.

"Manure" is organic matter used as organic fertilizer in agriculture. Depending on its structure, manure can be divided into liquid manure, semi-liquid manure, stable or solid manure and straw manure. Depending on its origin, manure can be divided into manure derived from animals or plants. Common forms of animal manure include feces, urine, farm slurry (liquid manure) or farmyard manure (FYM) whereas FYM also contains a certain amount of plant material (typically straw), which may have been used as bedding for animals. Animals from which manure can be used comprise horses, cattle, pigs, sheep, chickens, turkeys, rabbits, and guano from seabirds and bats. The application rates of animal manure when used as fertilizer highly depends on the origin (type of animals). Plant manures may derive from any kind of plant whereas the plant may also be grown explicitly for the purpose of plowing them in (e.g. leguminous plants), thus improving the structure and fertility of the soil. Furthermore, plant matter used as manure may include the contents of the rumens of slaughtered ruminants, spent hops (left over from brewing beer) or seaweed.

A "pesticide" is generally a chemical or biological agent (such as a virus, bacterium, antimicrobial or disinfectant) that through its effect deters, incapacitates, kills or otherwise discourages pests. Target pests can include insects, plant pathogens, weeds, mollusks, birds, mammals, fish, nematodes (roundworms), and microbes that destroy property, cause nuisance, spread disease or are vectors for disease. The term "pesticide" includes also plant growth regulators that alter the expected growth, flowering, or reproduction rate of plants; defoliants that cause leaves or other foliage to drop from a plant, usually to facilitate harvest; desiccants that promote drying of living tissues, such as unwanted plant tops; plant activators that activate plant physiology for defense of against certain pests; safeners that reduce unwanted herbicidal action of pesticides on crop plants; and plant growth promoters that affect plant physiology e.g. to increase plant growth, biomass, yield or any other quality parameter of the harvestable goods of a crop plant.

The term "plant health" or "health of a plant" as used herein is intended to mean a condition of the plant which is determined by several aspects alone or in combination with each other. One indicator (indicator 1) for the condition of the plant is the crop yield. "Crop" and "fruit" are to be understood as any plant product which is further utilized after harvesting, e.g. fruits in the proper sense, vegetables, nuts, grains, seeds, wood (e.g. in the case of silviculture plants), flowers (e.g. in the case of gardening plants, ornamentals) etc., that is anything of economic value that is produced by the plant. Another indicator (indicator 2) for the condition of the plant is the plant vigor. The plant vigor becomes manifest in several aspects, too, some of which are visual appearance, e.g. leaf color, fruit color and aspect, amount of dead basal leaves and/or extent of leaf blades, plant weight, plant height, extent of plant verse (lodging), number, strong ness and productivity of tillers, panicles' length, extent of root system, strongness of roots, extent of nodulation, in particular of rhizobial nodulation, point of time of germination, emergence, flowering, grain maturity and/or senescence, protein content, sugar content and the like. Another indicator (indicator 3) for an increase of a plant's health is the reduction of biotic or abiotic stress factors. The three above mentioned indicators for the health condition of a plant may be interdependent and may result from each other. For example, a reduction of biotic or abiotic stress may lead to a better plant vigor, e.g. to better and bigger crops, and thus to an increased yield. Biotic stress, especially over longer terms, can have harmful effects on plants. The term "biotic stress" as used in the context of the present invention refers in particular to stress caused by living organisms. As a result, the quantity and the quality of the stressed plants, their crops and fruits decrease. As far as quality is concerned, reproductive development is usually severely affected with consequences on the crops which are important for fruits or seeds. Growth may be slowed by the stresses; polysaccharide synthesis, both structural and storage, may be reduced or modified: these effects may lead to a decrease in biomass and to changes in the nutritional value of the product. Abiotic stress includes drought, cold, increased UV, increased heat, or other changes in the environment of the plant, that leads to sub-optimal growth conditions. The term "increased yield" of a plant as used herein means that the yield of a product of the respective plant is increased by a measurable amount over the yield of the same product of the plant produced under the same conditions, but without the application of the composition of the invention. According to the present invention, it is preferred that the yield is increased by at least 2%, more preferably by at least 4%, most preferably at least 7%, particularly preferably at least 10%, more particularly preferably by at least 15%, most particularly preferably by at least 20%, particularly more preferably by at least 25%, particularly most preferably by at least 30%, particularly by at least 35%, especially more preferably by at least 40%, especially most preferably by at least 45%, especially by at least 50%, in particular preferably by at least 55%, in particular more preferably by at least 60%, in particular most preferably by at least 65%, in particular by at least 70%, for example by at least 75%. According to the present invention, it is preferred that the yield is increased—compared to the situation in which only the individual compound I or the individual compound II is used—by at least 1%, more preferably by at least 2%, most preferably at least 3%, particularly preferably at least 4%, more particularly preferably by at least 5%, most particularly preferably by at least 6%, particularly more preferably by at least 7%, particularly most preferably by at least 8%, particularly by at least 10%, especially more preferably by at least 12%, especially most preferably by at least 14%, especially by at least 16%, in particular preferably by at least 18%. An increased yield may, for example, be due to a reduction of nitrification and a corresponding improvement of uptake of nitrogen nutrients. The term "improved plant vigor" as used herein means that certain crop characteristics are increased or improved by a measurable or noticeable amount over the same factor of the plant produced under the same conditions, but without the application of the composition of the present invention. Improved plant vigor can be characterized, among others, by following improved properties of a plant:
- (a) improved vitality of the plant,
- (b) improved quality of the plant and/or of the plant products, e.g.
- (b) enhanced protein content,
- (c) improved visual appearance,
- (d) delay of senescence,
- (e) enhanced root growth and/or more developed root system (e.g. determined by the dry mass of the root),
- (f) enhanced nodulation, in particular rhizobial nodulation,
- (g) longer panicles,
- (h) bigger leaf blade,
- (i) less dead basal leaves,
- (j) increased chlorophyll content
- (k) prolonged photosynthetically active period
- (l) improved nitrogen-supply within the plant
- (m) improved water use efficiency The improvement of the plant vigor according to the present invention particularly means that the improvement of anyone or several or all of the above mentioned plant characteristics are improved. It further means that if not all of the above characteristics are improved, those which are not improved are not worsened as compared to plants which were not treated according to the invention or are at least not worsened to such an extent that the negative effect exceeds the positive effect of the improved characteristic (i.e. there is always an overall positive effect which preferably results in an improved crop yield). An improved plant vigor may, for example, be due to a reduction of nitrification and, e.g. a regulation of plant growth.

Another typical problem arising in the field of pest control lies in the need to reduce the dosage rates of the active ingredient to reduce or avoid unfavorable environmental or toxicological effects whilst still allowing effective pest control.

It is an object of the present invention to overcome the abovementioned disadvantages and to provide, with a view to effective resistance management or to effective plant growth regulation, at application rates which are as low as possible, compositions which, at a reduced total amount of active compounds applied, have improved plant-growth-regulating activity (synergistic mixtures) and a broadened activity spectrum, in particular for certain indications.

This is particularly visible if application rates for the beforementioned mixtures are used where the individual components show no or virtually no activity. The invention can also result in an advantageous behavior during formulation or during use, for example during grinding, sieving, emulsifying, dissolving or dispensing; improved storage stability and light stability, advantageous residue formation, improved toxicological or ecotoxicological behaviour, improved properties of the plant, for example better growth, increased harvest yields, a better developed root system, a larger leaf area, greener leaves, stronger shoots, less seed required, lower phytotoxicity, mobilization of the defense system of the plant, good compatibility with plants. Moreover, even an enhanced systemic action of the pesticides as defined herein and/or a persistency of the herbicidal, fungicidal, insecticidal, acaricidal, nematicidal action and/or plant growth regulating activity are expected.

It was therefore also an object of the present invention to provide mixtures which solve the problems of reducing the dosage rate, and/or enhancing the spectrum of activity, and/or improving resistance management and/or promoting (increasing) the health of plants, and/or facilitating application on the plants or on the soil.

We have accordingly found that this object is achieved by the mixtures and compositions defined herein.

Any reference to "compound I" refers to compound I as such, or an agriculturally useful salt thereof.

Any reference to "compound II" refers to compound II as such, or an agriculturally useful salt thereof.

Any reference to "compound III" refers to compound III as such, or an agriculturally useful salt thereof.

Agriculturally useful salts of the active compounds I, II and III encompass especially the salts of those cations or the acid addition salts of those acids whose cations and anions, respectively, have no adverse effect on the nitrification-inhibiting, urease-inhibiting or pesticidal action of the active compounds. Suitable cations are thus in particular the ions of the alkali metals, preferably sodium and potassium, of the alkaline earth metals, preferably calcium, magnesium and barium, of the transition metals, preferably manganese, copper, zinc and iron, and also the ammonium ion which, if desired, may carry 1 to 4 $C_1$-$C_4$-alkyl substituents and/or one phenyl or benzyl substituent, preferably diisopropylammonium, tetramethylammonium, tetrabutylammonium, trimethylbenzylammonium, furthermore phosphonium ions, sulfonium ions, preferably tri($C_1$-$C_4$-alkyl)sulfonium, and sulfoxonium ions, preferably tri($C_1$-$C_4$-alkyl)sulfoxonium. Anions of useful acid addition salts are primarily chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of $C_1$-$C_4$-alkanoic acids, preferably formate, acetate, propionate and butyrate. They can be formed by reacting a compound I with an acid of the corresponding anion, preferably of hydrochloric acid, hydrobromic acid, sulfuric acid, phosphoric acid or nitric acid.

The scope of the present invention includes mixtures of the (R)- and (S)-isomers and the racemates of compounds I and/or II and/or III having one or more chiral centers. As a result of hindered rotation of asymmetrically substituted groups, atrope isomers of active compounds I and/or II and/or III may be present. They also form part of the subject matter of the invention.

The active compounds I and/or II and/or III of the present invention may be present in the form of their N-oxides. The term "N-oxide" includes any compound of the present invention which has at least one tertiary nitrogen atom that is oxidized to an N-oxide moiety. N-oxides of compounds of the mixtures of the present invention can in particular be prepared by oxidizing the ring nitrogen atom(s) of the pyridine ring and/or the pyrazole ring with a suitable oxidizing agent, such as peroxo carboxylic acids or other peroxides. The person skilled in the art knows if and in which positions compounds of the mixtures of the present invention, i.e. of the compounds I and/or II and/or III, may form N-oxides.

The compounds II and/or the mixtures or compositions according to the invention, respectively, are suitable as urease inhibitors. They are suitable as such or as an appropriately formulated composition (agrochemical composition).

The mixtures or compositions according to the invention preferably have urease-inhibiting effect.

In one embodiment, the mixtures or compositions according to the invention are applied or sprayed into or onto soil, and are preferably applied together with at least one fertilizer, one nitrogen-containing fertilizer or one urea-containing fertilizer into the soil in-furrow and/or as side-dress and/or as broadcast.

In another embodiment, the mixtures or compositions according to the invention are applied to the plants preferably by spraying the leaves. Here, the application can be carried out using, for example, water as carrier by customary spraying techniques using spray liquor amounts of from about 50 to 1000 l/ha (for example from 300 to 400 l/ha). The mixtures or compositions may also be applied by the low-volume or the ultra-low-volume method, or in the form of microgranules. The mixtures or compositions according to the present invention can be applied pre- or post-emergence or together with the seed of a crop plant. It is also possible to apply the individual compounds and mixtures or compositions by applying seed, pretreated with a composition of the invention, of a crop plant. If the active compounds I and II and, if appropriate are less well tolerated by certain crop plants, application techniques may be used in which the mixture or compositions of the invention are sprayed, with the aid of the spraying equipment, in such a way that as far as possible they do not come into contact with the leaves of the sensitive crop plants, while the active compounds reach the leaves of undesirable plants growing underneath, or the bare soil surface (post-directed, lay-by).

Application of the mixtures or compositions according to the present invention can be done before, during and/or after, preferably during and/or after, the emergence of the undesirable plants.

In a further embodiment, the mixtures or compositions according to the invention can be applied by treating seed. The treatment of seed comprises essentially all procedures familiar to the person skilled in the art (seed dressing, seed coating, seed dusting, seed soaking, seed film coating, seed multilayer coating, seed encrusting, seed dripping and seed pelleting) based on the compounds II of the mixtures of the invention or the compositions prepared therefrom. Here, the mixtures or compositions can be applied diluted or undiluted.

The term "seed" comprises seed of all types, such as, for example, corns, seeds, fruits, tubers, seedlings and similar forms. Here, preferably, the term seed describes corns and seeds. The seed used can be seed of the useful plants mentioned above, but also the seed of transgenic plants or plants obtained by customary breeding methods.

Moreover, it may be advantageous to apply the mixtures or compositions of the present invention on their own or jointly in combination with other crop protection agents, for example with agents for controlling weeds, pests or phytopathogenic fungi or bacteria. Also of interest is the miscibility with mineral salt solutions which are employed for treating nutritional and trace element deficiencies. Non-phytotoxic oils and oil concentrates can also be added.

As used herein, the term "metabolite" refers to any component, compound, substance or byproduct (including but not limited to small molecule secondary metabolites, polyketides, fatty acid synthase products, non-ribosomal peptides, ribosomal peptides, proteins and enzymes) produced by a microorganism (such as fungi and bacteria, in particular the strains of the invention) that has any beneficial effect as described herein such as plant-growth-regulating activity or improvement of plant growth, water use efficiency of the plant, plant health, plant appearance, nitrification-inhibiting effect etc.

In the present application, "wt. %" refers to "percent by weight".

Generally, the compound I (nitrification inhibitor) can be contained in varying amounts in the mixture of the invention. Preferably, the amount of the compound I (nitrification inhibitor) is not more than 95 wt. %, more preferably not more than 90 wt. %, most preferably not more than 85 wt. %, more particularly preferably not more than 75 wt. %, most particularly preferably not more than 65 wt. %, particularly not more than 55 wt. %, especially not more than 45 wt. % for example not more than 35 wt. %, based on the total weight of the mixture of the invention. Preferably, the amount of the compound I (nitrification inhibitor) is at least 1 wt. %, more preferably at least 4 wt. %, most preferably at least 14 wt. %, more particularly preferably at least 24 wt. %, most particularly preferably at least 34 wt. %, particularly at least 44 wt. %, especially at least 54 wt. %, for example at least 64 wt. %, based on the total weight of the mixture of the invention.

Generally, the compound II (urease inhibitor) can be contained in varying amounts in the mixture of the invention. Preferably, the amount of the compound II (urease inhibitor) is not more than 95 wt. %, more preferably not more than 90 wt. %, most preferably not more than 85 wt. %, more particularly preferably not more than 75 wt. %, most particularly preferably not more than 65 wt. %, particularly not more than 55 wt. %, especially not more than 45 wt. % for example not more than 35 wt. %, based on the total weight of the mixture of the invention. Preferably, the amount of the compound II (urease inhibitor) is at least 1 wt. %, more preferably at least 4 wt. %, most preferably at least 14 wt. %, more particularly preferably at least 24 wt. %, most particularly preferably at least 34 wt. %, particularly at least 44 wt. %, especially at least 54 wt. %, for example at least 64 wt. %, based on the total weight of the mixture of the invention.

Particularly preferably, the mixture of the invention comprises a nitrification inhibitor, NBPT and NPPT, wherein NBPT is present in amounts of from 1 to 99.99 wt. %, more preferably from 10 to 99.9 wt. %, most preferably from 20 to 99 wt. %, particularly preferably from 30 to 98 wt. %, more particularly preferably from 40 to 95 wt. %, most particularly preferably from 50 to 90 wt. %, especially from 60 to 85 wt. %, especially preferably from 72 to 80 wt. %, for example from 74 to 77 wt. %, in each case based on the total weight of the thiophosphoric acid triamides (i.e. NBPT and NPPT if no further thiophosphoric acid triamides are present in the mixture) contained in the mixture of the invention.

In another preferred embodiment, the compound II (UI) is selected from the group consisting of N-(n-butyl)thiophosphoric acid triamide (NBPT) (P.26), N-(n-propyl)thiophosphoric acid triamide (NPPT) (P.27), mixtures comprising N-(n-butyl)thiophosphoric acid triamide (NBPT) and N-(n-propyl)thiophosphoric acid triamide (NPPT) (P.28), mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), phenylphosphorodiamidate (PPD/PPDA) (P.30), and 2-nitrophenyl phosphoric triamide (2-NPT) (P.31).

In another preferred embodiment, the compound II (UI) is p-benzoquinone.

In another preferred embodiment, the compound II (UI) is polyphenols.

In another preferred embodiment, the compound II (UI) is heterocyclic mercaptans.

In another preferred embodiment, the compound II (UI) is polyacrylamides and derivatives thereof.

In another preferred embodiment, the compound II (UI) is dihydroxamic acids.

In another preferred embodiment, the compound II (UI) is aminocresols

In another preferred embodiment, the compound II (UI) is aminophenols.

In another preferred embodiment, the compound II (UI) is bromo-nitro compounds.

In another preferred embodiment, the compound II (UI) is thiourea.

In another preferred embodiment, the compound II (UI) is hydroxomates.

In another preferred embodiment, the compound II (UI) is sodium chloride.

In another preferred embodiment, the compound II (UI) is sodium carbonate.

In another preferred embodiment, the compound II (UI) is urea phosphate.

In another preferred embodiment, the compound II (UI) is urea nitrate.

In another preferred embodiment, the compound II (UI) is ammonium thiosulfate.

In another preferred embodiment, the compound II (UI) is calcium chloride.

In another preferred embodiment, the compound II (UI) is fluoride salts.

In another preferred embodiment, the compound II (UI) is O-diaminophosphinyl oximes.

In another preferred embodiment, the compound II (UI) is phosphinyl sulfamides.

In another preferred embodiment, the compound II (UI) is phosphorodiamidates.

In another preferred embodiment, the compound II (UI) is polyphosphorodiamides.

In another preferred embodiment, the compound II (UI) is cyclotriphosphazatrienes.

In another preferred embodiment, the compound II (UI) is acylphosphoric triamides.

In another preferred embodiment, the compound II (UI) is metal phosphorylesters.

In another preferred embodiment, the compound II (UI) is S-aryl(alkyl) diamidophosphorothiolates.

In another preferred embodiment, the compound II (UI) is N-(n-butyl)thiophosphoric acid triamide (NBPT).

In another preferred embodiment, the compound II (UI) is N-(n-propyl)thiophosphoric acid triamide (NPPT).

In another preferred embodiment, the compound II (UI) is a mixture comprising N-(n-butyl)thiophosphoric acid triamide (NBPT) and N-(n-propyl)thiophosphoric acid triamide (NPPT).

In another preferred embodiment, the compound II (UI) is mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors.

In another preferred embodiment, the compound II (UI) is phenylphosphorodiamidate (PPD/PPDA).

In another preferred embodiment, the compound II (UI) is 2-nitrophenyl phosphoric triamide.

In another preferred embodiment, the compound II (UI) is 2,5-dimethyl-1,4-benzoquinone.

In another preferred embodiment, the compound II (UI) is hydroquinone

In another preferred embodiment, the compound II (UI) is thymol.

In another preferred embodiment, the compound II (UI) is pyrocatechol.

In another preferred embodiment, the compound II (UI) is triacontanyl palmitate.

In another preferred embodiment, the compound II (UI) is barturic acid.

In another preferred embodiment, the compound II (UI) is thiobarbituric acid.

In another preferred embodiment, the compound II (UI) is triazoles.

In another preferred embodiment, the compound II (UI) is 3-substitute-4-amino-5-thioxo-1H,4H-1,2,4-triazoles.

In another preferred embodiment, the compound II (UI) is alpha-hydroxyketones.

In another preferred embodiment, the compound II (UI) is alpha-diketones.

In another preferred embodiment, the compound II (UI) is hydroxyurea.

In another preferred embodiment, the compound II (UI) is triketone oximes.

In another preferred embodiment, the compound II (UI) is boric acid or salts or derivatives thereof.

In another preferred embodiment, the compound II (UI) is sodium or other salts of sulfate.

In another preferred embodiment, the compound II (UI) is sodium or other salts of benzenesulfinate.

In another preferred embodiment, the compound II (UI) is sodium or other salts of benzenesulfonate.

In another preferred embodiment, the compound II (UI) is sodium or other salts of sulphite.

In another preferred embodiment, the compound II (UI) is iodoacetic acid.

In another preferred embodiment, the compound II (UI) is N-ethylmaleimide.

In another preferred embodiment, the compound II (UI) is p-hydroxymercuribenzoate.

In another preferred embodiment, the compound II (UI) is p-chloromercuribenzoate.

In another preferred embodiment, the compound II (UI) is biscoumarin.

In another preferred embodiment, the compound II (UI) is 1,2,4-thiadiazol-5-thio compound or derivatives thereof.

In another preferred embodiment, the compound II (UI) is a thiophosphoric acid triamide according to the general formula (Ia)

$$R^1R^2N—P(X)(NH_2)_2 \quad (Ia)$$

wherein

X is sulfur;

R$^1$ and R$^2$ are—independent from each other—H, substituted or unsubstituted 2-Nitrophenyl, $C_1$ to $C_{20}$ alkyl, $C_3$ to $C_{20}$ cycloalkyl, $C_6$ to $C_{20}$ heterocycloaryl, $C_6$ to $C_{20}$ aryl, or dialkylaminocarbonyl group, wherein R$^1$ and R$^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur;

In another preferred embodiment, the compound II (UI) is a phosphoric acid triamide according to the general formula (Ib)

$$R^1R^2N—P(Y)(NH_2)_2 \quad (Ib)$$

wherein

Y is oxygen;

R$^1$ and R$^2$ are—independent from each other—H, substituted or unsubstituted 2-Nitrophenyl, $C_1$ to $C_{20}$ alkyl, $C_3$ to $C_{20}$ cycloalkyl, $C_6$ to $C_{20}$ heterocycloaryl, $C_6$ to $C_{20}$ aryl, or dialkylaminocarbonyl group, wherein R$^1$ and R$^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur, In another preferred embodiment, the compound II (UI) is an adduct of N-(n-butyl) thiophosphoric acid triamide (NBPT), urea and formaldehyde.

In another preferred embodiment, the compound II (UI) is an adduct of N-(n-butyl) thiophosphoric acid triamide (NBPT), urea and formaldehyde according to the formula (Ic):

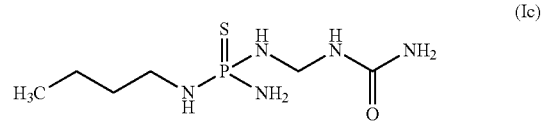

In another preferred embodiment, the compound II (UI) is an adduct of N-(n-butyl) thiophosphoric acid triamide (NBPT), urea and formaldehyde according to the formula (Id):

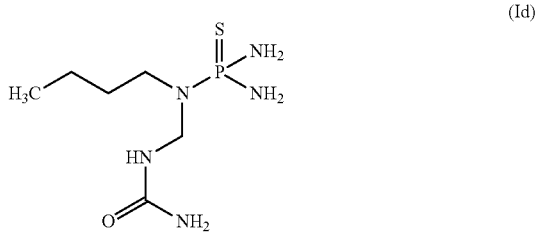

In another preferred embodiment, the compound II (UI) is an adduct of N-(n-butyl) thiophosphoric acid triamide (NBPT), urea and formaldehyde according to the formula (Ie):

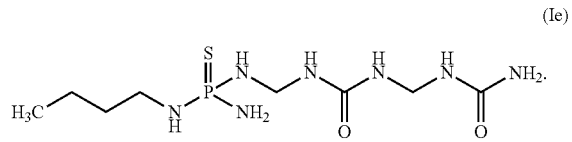 [SMILES: CCCCNP(N)(=S)NCNC(=O)NCNC(N)=O]

In another preferred embodiment, the compound I is DMPSA1 and/or DMPSA2 and/or a salt thereof and/or a derivative thereof, and the compound II (UI) is p-benzoquinone.

In another preferred embodiment, the compound I is DMPSA1 and/or DMPSA2 and/or a salt thereof and/or a derivative thereof, and the compound II (UI) is polyphenols.

In another preferred embodiment, the compound I is DMPSA1 and/or DMPSA2 and/or a salt thereof and/or a derivative thereof, and the compound II (UI) is heterocyclic mercaptans.

In another preferred embodiment, the compound I is DMPSA1 and/or DMPSA2 and/or a salt thereof and/or a derivative thereof, and the compound II (UI) is polyacrylamides and derivatives thereof.

In another preferred embodiment, the compound I is DMPSA1 and/or DMPSA2 and/or a salt thereof and/or a derivative thereof, and the compound II (UI) is dihydroxamic acids.

In another preferred embodiment, the compound I is DMPSA1 and/or DMPSA2 and/or a salt thereof and/or a derivative thereof, and the compound II (UI) is aminocresols.

In another preferred embodiment, the compound I is DMPSA1 and/or DMPSA2 and/or a salt thereof and/or a derivative thereof, and the compound II (UI) is aminophenols.

In another preferred embodiment, the compound I is DMPSA1 and/or DMPSA2 and/or a salt thereof and/or a derivative thereof, and the compound II (UI) is bromo-nitro compounds.

In another preferred embodiment, the compound I is DMPSA1 and/or DMPSA2 and/or a salt thereof and/or a derivative thereof, and the compound II (UI) is thiourea.

In another preferred embodiment, the compound I is DMPSA1 and/or DMPSA2 and/or a salt thereof and/or a derivative thereof, and the compound II (UI) is hydroxomates.

In another preferred embodiment, the compound I is DMPSA1 and/or DMPSA2 and/or a salt thereof and/or a derivative thereof, and the compound II (UI) is sodium chloride.

In another preferred embodiment, the compound I is DMPSA1 and/or DMPSA2 and/or a salt thereof and/or a derivative thereof, and the compound II (UI) is sodium carbonate.

In another preferred embodiment, the compound I is DMPSA1 and/or DMPSA2 and/or a salt thereof and/or a derivative thereof, and the compound II (UI) is urea phosphate.

In another preferred embodiment, the compound I is DMPSA1 and/or DMPSA2 and/or a salt thereof and/or a derivative thereof, and the compound II (UI) is urea nitrate.

In another preferred embodiment, the compound I is DMPSA1 and/or DMPSA2 and/or a salt thereof and/or a derivative thereof, and the compound II (UI) is ammonium thiosulfate.

In another preferred embodiment, the compound I is DMPSA1 and/or DMPSA2 and/or a salt thereof and/or a derivative thereof, and the compound II (UI) is calcium chloride.

In another preferred embodiment, the compound I is DMPSA1 and/or DMPSA2 and/or a salt thereof and/or a derivative thereof, and the compound II (UI) is fluoride salts.

In another preferred embodiment, the compound I is DMPSA1 and/or DMPSA2 and/or a salt thereof and/or a derivative thereof, and the compound II (UI) is O-diaminophosphinyl oximes.

In another preferred embodiment, the compound I is DMPSA1 and/or DMPSA2 and/or a salt thereof and/or a derivative thereof, and the compound II (UI) is phosphinyl sulfamides.

In another preferred embodiment, the compound I is DMPSA1 and/or DMPSA2 and/or a salt thereof and/or a derivative thereof, and the compound II (UI) is phosphorodiamidates.

In another preferred embodiment, the compound I is DMPSA1 and/or DMPSA2 and/or a salt thereof and/or a derivative thereof, and the compound II (UI) is polyphosphorodiamides.

In another preferred embodiment, the compound I is DMPSA1 and/or DMPSA2 and/or a salt thereof and/or a derivative thereof, and the compound II (UI) is cyclotriphosphazatrienes.

In another preferred embodiment, the compound I is DMPSA1 and/or DMPSA2 and/or a salt thereof and/or a derivative thereof, and the compound II (UI) is acylphosphoric triamides.

In another preferred embodiment, the compound I is DMPSA1 and/or DMPSA2 and/or a salt thereof and/or a derivative thereof, and the compound II (UI) is metal phosphorylesters.

In another preferred embodiment, the compound I is DMPSA1 and/or DMPSA2 and/or a salt thereof and/or a derivative thereof, and the compound II (UI) is S-aryl(alkyl)diamidophosphorothiolates.

In another preferred embodiment, the compound I is DMPSA1 and/or DMPSA2 and/or a salt thereof and/or a derivative thereof, and the compound II (UI) is N-(n-butyl) thiophosphoric acid triamide (NBPT).

In another preferred embodiment, the compound I is DMPSA1 and/or DMPSA2 and/or a salt thereof and/or a derivative thereof, and the compound II (UI) is N-(n-propyl) thiophosphoric acid triamide (NPPT).

In another preferred embodiment, the compound I is DMPSA1 and/or DMPSA2 and/or a salt thereof and/or a derivative thereof, and the compound II (UI) is mixtures comprising N-(n-butyl)thiophosphoric acid triamide (NBPT) and N-(n-propyl)thiophosphoric acid triamide (NPPT).

In another preferred embodiment, the compound I is DMPSA1 and/or DMPSA2 and/or a salt thereof and/or a derivative thereof, and the compound II (UI) is a mixture comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors.

In another preferred embodiment, the compound I is DMPSA1 and/or DMPSA2 and/or a salt thereof and/or a derivative thereof, and the compound II (UI) is phenylphosphorodiamidate (PPD/PPDA).

In another preferred embodiment, the compound I is DMPSA1 and/or DMPSA2 and/or a salt thereof and/or a derivative thereof, and the compound II (UI) is 2-nitrophenyl phosphoric triamide.

In another preferred embodiment, the compound I is DMPSA1 and/or DMPSA2 and/or a salt thereof and/or a derivative thereof, and the compound II (UI) is 2,5-dimethyl-1,4-benzoquinone.

In another preferred embodiment, the compound I is DMPSA1 and/or DMPSA2 and/or a salt thereof and/or a derivative thereof, and the compound II (UI) is hydroquinone In another preferred embodiment, the compound I is DMPSA1 and/or DMPSA2 and/or a salt thereof and/or a derivative thereof, and the compound II (UI) is thymol.

In another preferred embodiment, the compound I is DMPSA1 and/or DMPSA2 and/or a salt thereof and/or a derivative thereof, and the compound II (UI) is pyrocatechol.

In another preferred embodiment, the compound I is DMPSA1 and/or DMPSA2 and/or a salt thereof and/or a derivative thereof, and the compound II (UI) is triacontanyl palmitate.

In another preferred embodiment, the compound I is DMPSA1 and/or DMPSA2 and/or a salt thereof and/or a derivative thereof, and the compound II (UI) is barturic acid.

In another preferred embodiment, the compound I is DMPSA1 and/or DMPSA2 and/or a salt thereof and/or a derivative thereof, and the compound II (UI) is thiobarbituric acid.

In another preferred embodiment, the compound I is DMPSA1 and/or DMPSA2 and/or a salt thereof and/or a derivative thereof, and the compound II (UI) is triazoles.

In another preferred embodiment, the compound I is DMPSA1 and/or DMPSA2 and/or a salt thereof and/or a derivative thereof, and the compound II (UI) is 3-substitute-4-amino-5-thioxo-1H,4H-1,2,4-triazoles.

In another preferred embodiment, the compound I is DMPSA1 and/or DMPSA2 and/or a salt thereof and/or a derivative thereof, and the compound II (UI) is alphahydroxyketones.

In another preferred embodiment, the compound I is DMPSA1 and/or DMPSA2 and/or a salt thereof and/or a derivative thereof, and the compound II (UI) is alphadiketones.

In another preferred embodiment, the compound I is DMPSA1 and/or DMPSA2 and/or a salt thereof and/or a derivative thereof, and the compound II (UI) is hydroxyurea.

In another preferred embodiment, the compound I is DMPSA1 and/or DMPSA2 and/or a salt thereof and/or a derivative thereof, and the compound II (UI) is triketone oximes.

In another preferred embodiment, the compound I is DMPSA1 and/or DMPSA2 and/or a salt thereof and/or a derivative thereof, and the compound II (UI) is boric acid or salts or derivatives thereof.

In another preferred embodiment, the compound I is DMPSA1 and/or DMPSA2 and/or a salt thereof and/or a derivative thereof, and the compound II (UI) is sodium or other salts of sulfate.

In another preferred embodiment, the compound I is DMPSA1 and/or DMPSA2 and/or a salt thereof and/or a derivative thereof, and the compound II (UI) is sodium or other salts of benzenesulfinate.

In another preferred embodiment, the compound I is DMPSA1 and/or DMPSA2 and/or a salt thereof and/or a derivative thereof, and the compound II (UI) is sodium or other salts of benzenesulfonate.

In another preferred embodiment, the compound I is DMPSA1 and/or DMPSA2 and/or a salt thereof and/or a derivative thereof, and the compound II (UI) is sodium or other salts of sulphite.

In another preferred embodiment, the compound I is DMPSA1 and/or DMPSA2 and/or a salt thereof and/or a derivative thereof, and the compound II (UI) is iodoacetic acid.

In another preferred embodiment, the compound I is DMPSA1 and/or DMPSA2 and/or a salt thereof and/or a derivative thereof, and the compound II (UI) is N-ethylmaleimide.

In another preferred embodiment, the compound I is DMPSA1 and/or DMPSA2 and/or a salt thereof and/or a derivative thereof, and the compound II (UI) is p-hydroxymercuribenzoate.

In another preferred embodiment, the compound I is DMPSA1 and/or DMPSA2 and/or a salt thereof and/or a derivative thereof, and the compound II (UI) is p-chloromercuribenzoate.

In another preferred embodiment, the compound I is DMPSA1 and/or DMPSA2 and/or a salt thereof and/or a derivative thereof, and the compound II (UI) is biscoumarin.

In another preferred embodiment, the compound I is DMPSA1 and/or DMPSA2 and/or a salt thereof and/or a derivative thereof, and the compound II (UI) is 1,2,4-thiadiazol-5-thio compound or derivatives thereof.

In another preferred embodiment, the compound I is DMPSA1 and/or DMPSA2 and/or a salt thereof and/or a derivative thereof, and the compound II (UI) is a thiophosphoric acid triamide according to the general formula (Ia)

$$R^1R^2N\text{---}P(X)(NH_2)_2 \qquad (Ia)$$

wherein

X is sulfur;

$R^1$ and $R^2$ are—independent from each other—H, substituted or unsubstituted 2-Nitrophenyl, $C_1$ to $C_{20}$ alkyl, $C_3$ to $C_{20}$ cycloalkyl, $C_6$ to $C_{20}$ heterocycloaryl, $C_6$ to $C_{20}$ aryl, or dialkylaminocarbonyl group, wherein $R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur;

In another preferred embodiment, the compound I is DMPSA1 and/or DMPSA2 and/or a salt thereof and/or a derivative thereof, and the compound II (UI) is a phosphoric acid triamide according to the general formula (Ib)

(Ib)

wherein

Y is oxygen;

R$^1$ and R$^2$ are—independent from each other—H, substituted or unsubstituted 2-Nitrophenyl, C$_1$ to C$_{20}$ alkyl, C$_3$ to C$_{20}$ cycloalkyl, C$_6$ to C$_{20}$ heterocycloaryl, C$_6$ to C$_{20}$ aryl, or dialkylaminocarbonyl group, wherein R$^1$ and R$^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur, In another preferred embodiment, the compound I is DMPSA1 and/or DMPSA2 and/or a salt thereof and/or a derivative thereof, and the compound II (UI) is an adduct of N-(n-butyl) thiophosphoric acid triamide (NBPT), urea and formaldehyde.

In another preferred embodiment, the compound I is DMPSA1 and/or DMPSA2 and/or a salt thereof and/or a derivative thereof, and the compound II (UI) is an adduct of N-(n-butyl) thiophosphoric acid triamide (NBPT), urea and formaldehyde according to the formula (Ic):

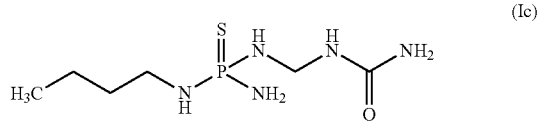
(Ic)

In another preferred embodiment, the compound I is DMPSA1 and/or DMPSA2 and/or a salt thereof and/or a derivative thereof, and the compound II (UI) is an adduct of N-(n-butyl) thiophosphoric acid triamide (NBPT), urea and formaldehyde according to the formula (Id):

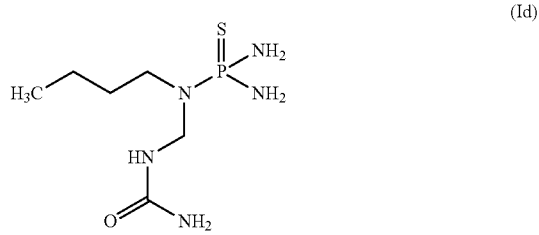
(Id)

In another preferred embodiment, the compound I is DMPSA1 and/or DMPSA2 and/or a salt thereof and/or a derivative thereof, and the compound II (UI) is an adduct of N-(n-butyl) thiophosphoric acid triamide (NBPT), urea and formaldehyde according to the formula (Ie):

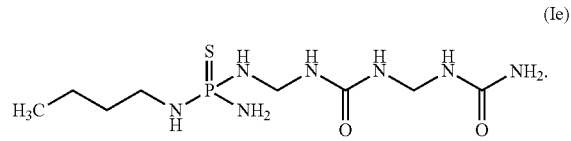 [SMILES: CCCCNP(N)(=S)NCNC(=O)NCNC(N)=O]
(Ie)

Regarding the Compounds I, the compound and preparation of DMPSA1 or DMPSA2 have been described for example in WO 2015/086823 A2. DMPSA1 is described in the formula I below, and DMPSA2 is described in formula II below. The compound and preparation of DMPG, DMPC, DMPL, and DMPM have been described for example in AU 2015/227487 B1. The compound and preparation of N-((3 (5)-methyl-1H-pyrazole-1-yl)methyl)acetamide have been described for example in DE 102013022031 B3, The compound and preparation of N-((3(5)-methyl-1H-pyrazole-1-yl)methyl)formamide, N-((4-chloro-3(5)-methyl-pyrazole-1-yl)methyl)formamide, and N-((3(5),4-dimethylpyrazole-1-yl)methyl)formamide have been described for example in EP 2785697 B1. A reaction adduct of dicyandiamide, urea and formaldehyde, a triazonyl-formaldehyde-dicyandiamide adduct, 2-cyano-1-((4-oxo-1,3,5-triazinan-1-yl)methyl)guanidine, 1-((2-cyanoguanidino)methyl)urea, and 2-cyano-1-((2-cyanoguanidino)methyl)guanidine have been described in US 2016/0060184 A1. 2-cyano-1-((4-oxo-1,3,5-triazinan-1-yl)methyl)guanidine has the structure as described in formula III below, and 1-((2-cyanoguanidino)methyl)urea has the structure as described in formula IV below, and 2-cyano-1-((2-cyanoguanidino)methyl)guanidine has the structure as described in formula V below.

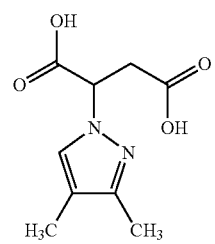
Formula I

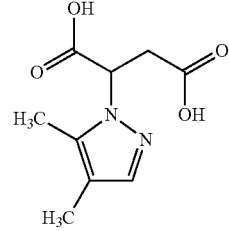
Formula II

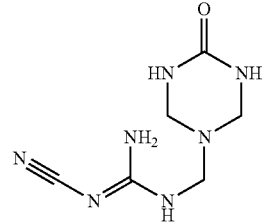
Formula III

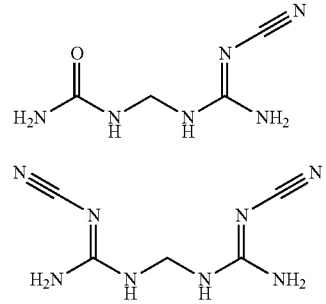
Formula IV

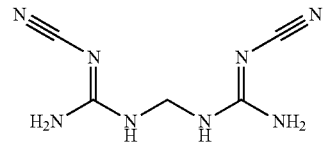
Formula V

In one preferred embodiment, the present invention relates to mixtures comprising at least one active compound I, wherein the active compound I is 2-(3,4-dimethyl-1H-pyrazol-1-yl)succinic acid (DMPSA1) and/or 2-(4,5-dimethyl-1H-pyrazol-1-yl)succinic acid (DMPSA2), and/or a derivative thereof, and/or a salt thereof, more preferably DMPSA1 and/or DMPSA2, most preferably DMPSA1.

In another preferred embodiment, the present invention relates to mixtures comprising at least one active compound I, wherein the active compound I is a salt of DMPSA1 and/or DMPSA2, more preferably an alkali salt, an earth alkali salt, or an ammonium salt of DMPSA1 and/or DMPSA2, most preferably a potassium salt, sodium salt, magnesium salt, or an ammonium salt of DMPSA1 and/or DMPSA2, particularly preferably a potassium salt or an ammonium salt of DMPSA1 and/or DMPSA2, particularly a potassium salt of DMPSA1 and/or DMPSA2.

In another preferred embodiment, the present invention relates to mixtures comprising at least one active compound I, wherein the active compound I is an alkali salt of DMPSA1 and/or DMPSA2.

In another preferred embodiment, the present invention relates to mixtures comprising at least one active compound I, wherein the active compound I is an earth alkali salt of DMPSA1 and/or DMPSA2.

In another preferred embodiment, the present invention relates to mixtures comprising at least one active compound I, wherein the active compound I is an ammonium salt of DMPSA1 and/or DMPSA2.

In another preferred embodiment, the present invention relates to mixtures comprising at least one active compound I, wherein the active compound I is a sodium salt of DMPSA1 and/or DMPSA2.

In another preferred embodiment, the present invention relates to mixtures comprising at least one active compound I, wherein the active compound I is a magnesium salt of DMPSA1 and/or DMPSA2.

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor).

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor).

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor).

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor).

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor).

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor).

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor).

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor).

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor).

In another preferred embodiment, the mixture or composition of the invention comprises
a) an ammonium salt of DMPSA1 and/or DMPSA2, as compound I (nitrification inhibitor), and b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor).

In another preferred embodiment, the mixture or composition of the invention comprises
a) an ammonium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor).

In another preferred embodiment, the mixture or composition of the invention comprises
a) an ammonium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor).

In another preferred embodiment, the mixture or composition of the invention comprises
a) an earth alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor).

In another preferred embodiment, the mixture or composition of the invention comprises
a) an earth alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor).

In another preferred embodiment, the mixture or composition of the invention comprises
a) an earth alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor).

In another preferred embodiment, the mixture or composition of the invention comprises
a) a magnesium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor).

In another preferred embodiment, the mixture or composition of the invention comprises
a) a magnesium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor).

In another preferred embodiment, the mixture or composition of the invention comprises
a) a magnesium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor).

In another preferred embodiment, the present invention relates to mixtures comprising at least one active compound I, wherein the active compound I is a salt of DMPSA1 and/or DMPSA2, more preferably an alkali salt, an earth alkali salt, or an ammonium salt of DMPSA1 and/or DMPSA2, most preferably a potassium salt, sodium salt, magnesium salt, or an ammonium salt of DMPSA1 and/or DMPSA2, particularly a potassium salt of DMPSA1 and/or DMPSA2, wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the present invention relates to mixtures comprising at least one active compound I, wherein the active compound I is an alkali salt of DMPSA1 and/or DMPSA2, wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the present invention relates to mixtures comprising at least one active compound I, wherein the active compound I is an earth alkali salt of DMPSA1 and/or DMPSA2, wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1

In another preferred embodiment, the present invention relates to mixtures comprising at least one active compound I, wherein the active compound I is an ammonium salt of DMPSA1 and/or DMPSA2, wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1

In another preferred embodiment, the present invention relates to mixtures comprising at least one active compound I, wherein the active compound I is a sodium salt of DMPSA1 and/or DMPSA2, wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the present invention relates to mixtures comprising at least one active compound I, wherein the active compound I is a magnesium salt of DMPSA1 and/or DMPSA2, wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1

In another preferred embodiment, the mixture or composition of the invention comprises
a) DMPSA1 and/or DMPSA2, and/or a derivative thereof, and/or a salt thereof, as compound I (nitrification inhibitor), and
b) N-(n-butyl) thiophosphoric acid triamide (NBPT) as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) an ammonium salt and/or a potassium salt of DMPSA1 and/or DMPSA2, as compound I (nitrification inhibitor), and
b) N-(n-butyl) thiophosphoric acid triamide (NBPT) as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor),
wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) an ammonium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor), wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) an ammonium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor), wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the mixture or composition of the invention comprises
a) an ammonium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor), wherein compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, the present invention relates to mixtures comprising at least one active compound I, wherein the active compound I is a salt of DMPSA1 and/or DMPSA2, more preferably an alkali salt, an earth alkali salt, or an ammonium salt of DMPSA1 and/or DMPSA2, most preferably a potassium salt, sodium salt, magnesium salt, or an ammonium salt of DMPSA1 and/or DMPSA2, particularly a potassium salt of DMPSA1 and/or DMPSA2, wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the present invention relates to mixtures comprising at least one active compound I, wherein the active compound I is an alkali salt of DMPSA1 and/or DMPSA2, wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the present invention relates to mixtures comprising at least one active compound I, wherein the active compound I is an earth alkali salt of DMPSA1 and/or DMPSA2, wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the present invention relates to mixtures comprising at least one active compound I, wherein the active compound I is an ammonium salt of DMPSA1 and/or DMPSA2, wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the present invention relates to mixtures comprising at least one active compound I, wherein the active compound I is a sodium salt of DMPSA1 and/or DMPSA2, wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the present invention relates to mixtures comprising at least one active compound I, wherein the active compound I is a magnesium salt of DMPSA1 and/or DMPSA2, wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) DMPSA1 and/or DMPSA2, and/or a derivative thereof, and/or a salt thereof, as compound I (nitrification inhibitor), and
b) N-(n-butyl) thiophosphoric acid triamide (NBPT) as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) an ammonium salt and/or a potassium salt of DMPSA1 and/or DMPSA2, as compound I (nitrification inhibitor), and
b) N-(n-butyl) thiophosphoric acid triamide (NBPT) as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) DMPSA1 and/or DMPSA2, and/or a derivative thereof, and/or a salt thereof, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor), wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) an alkali salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) a potassium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) an ammonium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) an ammonium salt of DMPSA1 and/or DMPSA2, as compound I (nitrification inhibitor), and
b) mixtures comprising N-(n-butyl) thiophosphoric acid triamide (NBPT) and N-(n-propyl) thiophosphoric acid triamide (NPPT) wherein NBPT is contained in amounts of from 65 to 85 wt. % and NPPT is contained in amounts of from 15 to 35 wt. % based on the total amount of active urease inhibitors, as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises
a) an ammonium salt of DMPSA1 and/or DMPSA2, as compound I (nitrification inhibitor), and b) mixtures comprising N-(n-butyl) thiophosphoric acid triamide (NBPT) and N-(n-propyl) thiophosphoric acid triamide (NPPT) wherein NBPT is contained in amounts of from 72 to 78 wt. % and NPPT is contained in amounts of from 22 to 28 wt. % based on the total amount of active urease inhibitors, as compound II (urease inhibitor),
wherein compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1.

In another preferred embodiment, the mixture or composition of the invention comprises DMPSA1 and/or DMPSA2, or a salt thereof as compound I (nitrification inhibitor), wherein DMPSA1 is present in an amount of from 50 wt. % to 99 wt. %, more preferably present in an amount of from 60 wt. % to 95 wt. %, most preferably present in an amount of 70 wt. % to 90 wt. %, particularly present in an amount of from 75 wt. % to 86 wt. %, particularly preferably present in an amount of from 78 wt. % to 82 wt. % or alternatively in an amount of from 82 wt. % to 86 wt. %, based on the total weight of all isomers of DMPSA.

In another preferred embodiment, the mixture or composition of the invention comprises DMPSA1 and/or DMPSA2, or a salt thereof as compound I (nitrification inhibitor), wherein DMPSA2 is present in an amount of from 1 wt. % to 50 wt. %, more preferably present in an amount of from 5 wt. % to 40 wt. %, most preferably present in an amount of 10 wt. % to 30 wt. %, particularly present in an amount of from 14 wt. % to 25 wt. %, particularly preferably present in an amount of from 18 wt. % to 22 wt. % or alternatively present in an amount of from 14 wt. % to 18 wt. %, based on the total weight of all isomers of DMPSA.

In another preferred embodiment, the present invention relates to mixtures comprising at least one active compound I, wherein the active compound I is the glycolic acid addition salt of 3,4-dimethyl pyrazole (3,4-dimethyl pyrazolium glycolate, referred to as "DMPG" in the following), and/or an isomer thereof, and/or a derivative thereof, most preferably DMPG.

In another preferred embodiment, the present invention relates to mixtures comprising at least one active compound I, wherein the active compound I is the citric acid addition salt of 3,4-dimethyl pyrazole (3,4-dimethyl pyrazolium citrate, referred to as "DMPC" in the following), and/or an isomer thereof, and/or a derivative thereof, most preferably DMPC.

In another preferred embodiment, the present invention relates to mixtures comprising at least one active compound I, wherein the active compound I is the lactic acid addition salt of 3,4-dimethyl pyrazole (3,4-dimethyl pyrazolium lactate, referred to as "DMPL" in the following), and/or an isomer thereof, and/or a derivative thereof, most preferably DMPL.

In another preferred embodiment, the present invention relates to mixtures comprising at least one active compound I, wherein the active compound I is the mandelic acid addition salt of 3,4-dimethyl pyrazole (3,4-dimethyl pyrazolium mandelate, referred to as "DMPM" in the following), and/or an isomer thereof, and/or a derivative thereof, most preferably DMPM.

In another preferred embodiment, the present invention relates to mixtures comprising at least one active compound I, wherein the active compound I is 1,2,4-triazole (referred to as "TZ" in the following), and/or a derivative thereof, and/or a salt thereof, most preferably TZ.

In another preferred embodiment, the present invention relates to mixtures comprising at least one active compound I, wherein the active compound I is 4-Chloro-3-methylpyrazole (referred to as "CIMP" in the following), and/or an isomer thereof, and/or a derivative thereof, and/or a salt thereof, most preferably CIMP.

In another preferred embodiment, the present invention relates to mixtures comprising at least one active compound I, wherein the active compound I is N-((3(5)-methyl-1H-pyrazole-1-yl)methyl)acetamide, and/or an isomer thereof, and/or a derivative thereof, and/or a salt thereof, most preferably N-((3-methyl-1H-pyrazole-1-yl)methyl)acetamide, and/or N-((5-methyl-1H-pyrazole-1-yl)methyl)acetamide.

In another preferred embodiment, the present invention relates to mixtures comprising at least one active compound I, wherein the active compound I is N-((3(5)-methyl-1H-pyrazole-1-yl)methyl)formamide, and/or an isomer thereof, and/or a derivative thereof, and/or a salt thereof, most preferably N-((3-methyl-1H-pyrazole-1-yl)methyl)formamide, and/or N-((5-methyl-1H-pyrazole-1-yl)methyl)formamide.

In another preferred embodiment, the present invention relates to mixtures comprising at least one active compound I, wherein the active compound I is N-((3(5),4-dimethylpyrazole-1-yl)methyl)formamide, and/or an isomer thereof, and/or a derivative thereof, and/or a salt thereof, most preferably N-((3,4-dimethyl-1H-pyrazole-1-yl)methyl)formamide, and/or N-((4,5-dimethyl-1H-pyrazole-1-yl)methyl)formamide.

In another preferred embodiment, the present invention relates to mixtures comprising at least one active compound I, wherein the active compound I is N-((4-chloro-3(5)-methyl-pyrazole-1-yl)methyl)formamide, and/or an isomer thereof, and/or a derivative thereof, and/or a salt thereof, most preferably N-((4-chloro-3-methyl-pyrazole-1-yl)methyl)formamide, and/or N-((4-chloro-5-methyl-pyrazole-1-yl)methyl)formamide.

In another preferred embodiment, the present invention relates to mixtures comprising at least one active compound I, wherein the active compound I is a reaction adduct of dicyandiamide, urea and formaldehyde, preferably a reaction adduct of dicyandiamide, urea and formaldehyde as described in US 2016/0060184 A1.

In another preferred embodiment, the present invention relates to mixtures comprising at least one active compound I, wherein the active compound I is a triazonyl-formaldehyde-dicyandiamide adducte, preferably a a triazonyl-formaldehyde-dicyandiamide adduct as described in US 2016/0060184 A1.

In another preferred embodiment, the present invention relates to mixtures comprising at least one active compound I, wherein the active compound I is 2-cyano-1-((4-oxo-1,3,5-triazinan-1-yl)methyl)guanidine.

In another preferred embodiment, the present invention relates to mixtures comprising at least one active compound I, wherein the active compound I is 1-((2-cyanoguanidino)methyl)urea.

In another preferred embodiment, the present invention relates to mixtures comprising one compound I, wherein the compound I is 2-cyano-1-((2-cyanoguanidino)methyl)guanidine.

In another preferred embodiment, the present invention relates to mixtures comprising one compound I, wherein the compound I is 2-chloro-6-(trichloromethyl)-pyridine (nitrapyrin or N-serve).

In another preferred embodiment, the present invention relates to mixtures comprising one compound I, wherein the compound I is dicyandiamide (DCD, DIDIN).

In another preferred embodiment, the present invention relates to mixtures comprising one compound I, wherein the compound I is 3,4-dimethyl pyrazole phosphate, and/or 4,5-dimethyl pyrazole phosphate (DMPP, ENTEC), and/or an isomer thereof, and/or a derivative thereof.

In another preferred embodiment, the present invention relates to mixtures comprising one compound I, wherein the compound I is 3,4-dimethylpyrazole, and/or 4,5-dimethylpyrazole (DMP), and/or an isomer thereof, and/or a derivative thereof, and/or a salt thereof, and/or an acid addition salt thereof.

In another preferred embodiment, the present invention relates to mixtures comprising one compound I, wherein the compound I is dicyandiamide (DCD, DIDIN.

In another preferred embodiment, the present invention relates to mixtures comprising one compound I, wherein the compound I is ammoniumthiosulfate (ATU).

In another preferred embodiment, the present invention relates to mixtures comprising one compound I, wherein the compound I is neem.

In another preferred embodiment, the present invention relates to mixtures comprising one compound I, wherein the compound I is linoleic acid.

In another preferred embodiment, the present invention relates to mixtures comprising one compound I, wherein the compound I is alpha-linolenic acid.

In another preferred embodiment, the present invention relates to mixtures comprising one compound I, wherein the compound I is methyl p-coumarate.

In another preferred embodiment, the present invention relates to mixtures comprising one compound I, wherein the compound I is methyl ferulate.

In another preferred embodiment, the present invention relates to mixtures comprising one compound I, wherein the compound I is methyl 3-(4-hydroxyphenyl) propionate (MHPP).

In another preferred embodiment, the present invention relates to mixtures comprising one compound I, wherein the compound I is brachialacton.

In another preferred embodiment, the present invention relates to mixtures comprising one compound I, wherein the compound I is p-benzoquinone sorgoleone.

In another preferred embodiment, the present invention relates to mixtures comprising one compound I, wherein the compound I is 4-amino-1,2,4-triazole hydrochloride (ATC).

In another preferred embodiment, the present invention relates to mixtures comprising one compound I, wherein the compound I is 1-amido-2-thiourea (ASU).

In another preferred embodiment, the present invention relates to mixtures comprising one compound I, wherein the compound I is 2-amino-4-chloro-6-methylpyrimidine (AM).

In another preferred embodiment, the present invention relates to mixtures comprising one compound I, wherein the compound I is 2-mercapto-benzothiazole (MBT).

In another preferred embodiment, the present invention relates to mixtures comprising one compound I, wherein the compound I is 5-ethoxy-3-trichloromethyl-1,2,4-thiodiazole (terrazole, etridiazole).

In another preferred embodiment, the present invention relates to mixtures comprising one compound I, wherein the compound I is 2-sulfanilamidothiazole (ST).

In another preferred embodiment, the present invention relates to mixtures comprising one compound I, wherein the compound I is 3-methylpyrazol (3-MP).

In another preferred embodiment, the present invention relates to mixtures comprising one compound I, wherein the compound I is 1,2,4-triazol thiourea (TU).

In another preferred embodiment, the present invention relates to mixtures comprising one compound I, wherein the compound I is cyan amide.

In another preferred embodiment, the present invention relates to mixtures comprising one compound I, wherein the compound I is melamine.

In another preferred embodiment, the present invention relates to mixtures comprising one compound I, wherein the compound I is zeolite powder.

In another preferred embodiment, the present invention relates to mixtures comprising one compound I, wherein the compound I is catechol.

In another preferred embodiment, the present invention relates to mixtures comprising one compound I, wherein the compound I is benzoquinone.

In another preferred embodiment, the present invention relates to mixtures comprising one compound I, wherein the compound I is sodium tetra borate.

In another preferred embodiment, the present invention relates to mixtures comprising one compound I, wherein the compound I is allylthiourea.

In another preferred embodiment, the present invention relates to mixtures comprising one compound I, wherein the compound I is chlorate salts.

In another preferred embodiment, the present invention relates to mixtures comprising one compound I, wherein the compound I is zinc sulfate.

Particularly preferred are mixtures wherein compound I is selected from the group consisting of compounds I.A to I.AX:
I.A: 2-(3,4-dimethyl-1H-pyrazol-1-yl)succinic acid (DMPSA1) and/or 2-(4,5-dimethyl-1H-pyrazol-1-yl)succinic acid (DMPSA2),
I.B: a salt of DMPSA1 and/or DMPSA2,
I.C: a potassium salt of DMPSA1 and/or DMPSA2,
I.D: an ammonium salt of DMPSA1 and/or DMPSA2,
I.E a sodium salt of DMPSA1 and/or DMPSA2,
I.F: 3,4-dimethyl pyrazolium glycolate (DMPG),
I.G: 3,4-dimethyl pyrazolium citrate (DMPC),
I.H: 3,4-dimethyl pyrazolium lactate (DMPL),
I.J: 3,4-dimethyl pyrazolium lactate (DMPM),
I.K: 1,2,4-triazole (TZ),
I.L: 4-Chloro-3-methylpyrazole (CIMP),
I.M N-((3(5)-methyl-1H-pyrazole-1-yl)methyl)acetamide,
I.N N-((3(5)-methyl-1H-pyrazole-1-yl)methyl)formamide,
I.O N-((3(5),4-dimethylpyrazole-1-yl)methyl)formamide,
I.P N-((4-chloro-3(5)-methyl-pyrazole-1-yl)methyl)formamide,
I.Q reaction adduct of dicyandiamide, urea and formaldehyde, or a triazonyl-formaldehyde-dicyandiamide adduct
I.R 2-cyano-1-((4-oxo-1,3,5-triazinan-1-yl)methyl)guanidine,
I.S 1-((2-cyanoguanidino)methyl)urea,
I.T 2-cyano-1-((2-cyanoguanidino)methyl)guanidine,
I.U 2-chloro-6-(trichloromethyl)-pyridine (nitrapyrin or N-serve),
I.V dicyandiamide (DCD, DIDIN), I.W 3,4-dimethyl pyrazole phosphate, and/or 4,5-dimethyl pyrazole phosphate (DMPP, ENTEC), and/or an isomer thereof, and/or a derivative thereof, I.X 3,4-dimethylpyrazole, and/or 4,5-dimethylpyrazole (DM P), and/or an isomer thereof, and/or a derivative thereof, and/or a salt thereof, and/or an acid addition salt thereof, I.Y ammoniumthiosulfate (ATU), I.Z neem, I.AA linoleic acid, I.AB alpha-linolenic acid, I.AC methyl p-coumarate, I.AD methyl ferulate, I.AE methyl 3-(4-hydroxyphenyl) propionate (MHPP), I.AF brachialacton, I.AG p-benzoquinone sorgoleone, I.AH 4-amino-1,2,4-triazole hydrochloride (ATC), I.AI 1-amido-2-thiourea (ASU), I.AJ 2-amino-4-chloro-6-methylpyrimidine (AM), I.AK 2-mercapto-benzothiazole (MBT), I.AL 5-ethoxy-3-trichloromethyl-1,2,4-thiodiazole (terrazole, etridiazole), I.AM 2-sulfanilamidothiazole (ST), I.AN 3-methylpyrazol (3-MP), I.AO 1,2,4-triazol thiourea (TU), I.AP cyan amide, I.AQ melamine, I.AR zeolite powder, I.AS catechol, I.AT benzoquinone, I.AU sodium tetra borate, I.AV allylthiourea, I.AW chlorate salts, or I.AX zinc sulfate.

In one aspect of the invention, compound I is selected from the group of compounds consisting of I.A, I.B, I.C, I.D, I.E, I.L, I.M, I.N, I.O, I.P, I.Q, I.R, I.S., I.T, I.U, I.V, I.W, I.X, I.Y, I.Z, I.AA, I.AB, I.AC, I.AD, I.AE, I.AF, I.AG, I.AH, I.AI, I.AJ, I.AK, I.AL, I.AM, I.AN, I.AO, I.AP, I.AQ, I.AR, I.AS, I.AT, I.AU, I.AV, I.AW, or I.AX, more preferably selected from the group of compounds consisting of I.A, I.B, I.C, I.D, I.E, I.L, I.M, I.N, I.O, I.P, I.Q, I.R, I.S., I.T, I.U, I.V, I.W, I.X, I.Y, I.AX, most preferably selected from the group of compounds consisting of I.A, I.B, I.C, I.D, I.E, I.L, I.M, I.N, I.O, I.P, I.Q, I.R, I.S.

With respect to their intended use in the methods of the present invention, the following binary mixtures (A) listed in tables 1 to 49 comprising one compound (I) and one compound (II) are a preferred embodiment of the present invention.

According to the present invention and/or with respect to their intended use in the methods of the present invention, the following binary mixtures (B) listed in tables 1 to 49 comprising one compound (I) and one compound (II) are a preferred embodiment of the present invention.

TABLE 1

| B | I | II |
|---|---|---|
| B1 | (I.A) | P.1 |
| B2 | (I.A) | P.2 |
| B3 | (I.A) | P.3 |
| B4 | (I.A) | P.4 |
| B5 | (I.A) | P.5 |
| B6 | (I.A) | P.6 |
| B7 | (I.A) | P.7 |
| B8 | (I.A) | P.8 |

TABLE 1-continued

| B | I | II |
|---|---|---|
| B9 | (I.A) | P.9 |
| B10 | (I.A) | P.10 |
| B11 | (I.A) | P.11 |
| B12 | (I.A) | P.12 |
| B13 | (I.A) | P.13 |
| B14 | (I.A) | P.14 |
| B15 | (I.A) | P.15 |
| B16 | (I.A) | P.16 |
| B17 | (I.A) | P.17 |
| B18 | (I.A) | P.18 |
| B19 | (I.A) | P.19 |
| B20 | (I.A) | P.20 |
| B21 | (I.A) | P.21 |
| B22 | (I.A) | P.22 |
| B23 | (I.A) | P.23 |
| B24 | (I.A) | P.24 |
| B25 | (I.A) | P.25 |
| B26 | (I.A) | P.26 |
| B27 | (I.A) | P.27 |
| B28 | (I.A) | P.28 |
| B29 | (I.A) | P.29 |
| B30 | (I.A) | P.30 |
| B31 | (I.A) | P.31 |
| B32 | (I.A) | P.32 |
| B33 | (I.A) | P.33 |
| B34 | (I.A) | P.34 |
| B35 | (I.A) | P.35 |
| B36 | (I.A) | P.36 |
| B37 | (I.A) | P.37 |
| B38 | (I.A) | P.38 |
| B39 | (I.A) | P.39 |
| B40 | (I.A) | P.40 |
| B41 | (I.A) | P.41 |
| B42 | (I.A) | P.42 |
| B43 | (I.A) | P.43 |
| B44 | (I.A) | P.44 |
| B45 | (I.A) | P.45 |
| B46 | (I.A) | P.46 |
| B47 | (I.A) | P.47 |
| B48 | (I.A) | P.48 |
| B49 | (I.A) | P.49 |
| B50 | (I.A) | P.50 |
| B51 | (I.A) | P.51 |
| B52 | (I.A) | P.52 |
| B53 | (I.A) | P.53 |
| B54 | (I.A) | P.54 |
| B55 | (I.A) | P.55 |
| B56 | (I.A) | P.56 |
| B57 | (I.A) | P.57 |
| B58 | (I.A) | P.58 |
| B59 | (I.A) | P.59 |
| B60 | (I.A) | P.60 |
| B61 | (I.A) | P.61 |

B = Mixture;
I = compound I;
II = compound II

TABLE 2

| B | I | II |
|---|---|---|
| B62 | (I.B) | P.1 |
| B63 | (I.B) | P.2 |
| B64 | (I.B) | P.3 |
| B65 | (I.B) | P.4 |
| B66 | (I.B) | P.5 |
| B67 | (I.B) | P.6 |
| B68 | (I.B) | P.7 |
| B69 | (I.B) | P.8 |
| B70 | (I.B) | P.9 |
| B71 | (I.B) | P.10 |
| B72 | (I.B) | P.11 |
| B73 | (I.B) | P.12 |
| B74 | (I.B) | P.13 |
| B75 | (I.B) | P.14 |

TABLE 2-continued

| B | I | II |
|---|---|---|
| B76 | (I.B) | P.15 |
| B77 | (I.B) | P.16 |
| B78 | (I.B) | P.17 |
| B79 | (I.B) | P.18 |
| B80 | (I.B) | P.19 |
| B81 | (I.B) | P.20 |
| B82 | (I.B) | P.21 |
| B83 | (I.B) | P.22 |
| B84 | (I.B) | P.23 |
| B85 | (I.B) | P.24 |
| B86 | (I.B) | P.25 |
| B87 | (I.B) | P.26 |
| B88 | (I.B) | P.27 |
| B89 | (I.B) | P.28 |
| B90 | (I.B) | P.29 |
| B91 | (I.B) | P.30 |
| B92 | (I.B) | P.31 |
| B93 | (I.B) | P.32 |
| B94 | (I.B) | P.33 |
| B95 | (I.B) | P.34 |
| B96 | (I.B) | P.35 |
| B97 | (I.B) | P.36 |
| B98 | (I.B) | P.37 |
| B99 | (I.B) | P.38 |
| B100 | (I.B) | P.39 |
| B101 | (I.B) | P.40 |
| B102 | (I.B) | P.41 |
| B103 | (I.B) | P.42 |
| B104 | (I.B) | P.43 |
| B105 | (I.B) | P.44 |
| B106 | (I.B) | P.45 |
| B107 | (I.B) | P.46 |
| B108 | (I.B) | P.47 |
| B109 | (I.B) | P.48 |
| B110 | (I.B) | P.49 |
| B111 | (I.B) | P.50 |
| B112 | (I.B) | P.51 |
| B113 | (I.B) | P.52 |
| B114 | (I.B) | P.53 |
| B115 | (I.B) | P.54 |
| B116 | (I.B) | P.55 |
| B117 | (I.B) | P.56 |
| B118 | (I.B) | P.57 |
| B119 | (I.B) | P.58 |
| B120 | (I.B) | P.59 |
| B121 | (I.B) | P.60 |
| B122 | (I.B) | P.61 |

B = Mixture;
I = compound I;
II = compound II

TABLE 3

| B | I | II |
|---|---|---|
| B123 | (I.C) | P.1 |
| B124 | (I.C) | P.2 |
| B125 | (I.C) | P.3 |
| B126 | (I.C) | P.4 |
| B127 | (I.C) | P.5 |
| B128 | (I.C) | P.6 |
| B129 | (I.C) | P.7 |
| B130 | (I.C) | P.8 |
| B131 | (I.C) | P.9 |
| B132 | (I.C) | P.10 |
| B133 | (I.C) | P.11 |
| B134 | (I.C) | P.12 |
| B135 | (I.C) | P.13 |
| B136 | (I.C) | P.14 |
| B137 | (I.C) | P.15 |
| B138 | (I.C) | P.16 |
| B139 | (I.C) | P.17 |
| B140 | (I.C) | P.18 |
| B141 | (I.C) | P.19 |
| B142 | (I.C) | P.20 |

TABLE 3-continued

| B | I | II |
|---|---|---|
| B143 | (I.C) | P.21 |
| B144 | (I.C) | P.22 |
| B145 | (I.C) | P.23 |
| B146 | (I.C) | P.24 |
| B147 | (I.C) | P.25 |
| B148 | (I.C) | P.26 |
| B149 | (I.C) | P.27 |
| B150 | (I.C) | P.28 |
| B151 | (I.C) | P.29 |
| B152 | (I.C) | P.30 |
| B153 | (I.C) | P.31 |
| B154 | (I.C) | P.32 |
| B155 | (I.C) | P.33 |
| B156 | (I.C) | P.34 |
| B157 | (I.C) | P.35 |
| B158 | (I.C) | P.36 |
| B159 | (I.C) | P.37 |
| B160 | (I.C) | P.38 |
| B161 | (I.C) | P.39 |
| B162 | (I.C) | P.40 |
| B163 | (I.C) | P.41 |
| B164 | (I.C) | P.42 |
| B165 | (I.C) | P.43 |
| B166 | (I.C) | P.44 |
| B167 | (I.C) | P.45 |
| B168 | (I.C) | P.46 |
| B169 | (I.C) | P.47 |
| B170 | (I.C) | P.48 |
| B171 | (I.C) | P.49 |
| B172 | (I.C) | P.50 |
| B173 | (I.C) | P.51 |
| B174 | (I.C) | P.52 |
| B175 | (I.C) | P.53 |
| B176 | (I.C) | P.54 |
| B177 | (I.C) | P.55 |
| B178 | (I.C) | P.56 |
| B179 | (I.C) | P.57 |
| B180 | (I.C) | P.58 |
| B181 | (I.C) | P.59 |
| B182 | (I.C) | P.60 |
| B183 | (I.C) | P.61 |

B = Mixture;
I = compound I;
II = compound II

TABLE 4

| B | I | II |
|---|---|---|
| B184 | (I.D) | P.1 |
| B185 | (I.D) | P.2 |
| B186 | (I.D) | P.3 |
| B187 | (I.D) | P.4 |
| B188 | (I.D) | P.5 |
| B189 | (I.D) | P.6 |
| B190 | (I.D) | P.7 |
| B191 | (I.D) | P.8 |
| B192 | (I.D) | P.9 |
| B193 | (I.D) | P.10 |
| B194 | (I.D) | P.11 |
| B195 | (I.D) | P.12 |
| B196 | (I.D) | P.13 |
| B197 | (I.D) | P.14 |
| B198 | (I.D) | P.15 |
| B199 | (I.D) | P.16 |
| B200 | (I.D) | P.17 |
| B201 | (I.D) | P.18 |
| B202 | (I.D) | P.19 |
| B203 | (I.D) | P.20 |
| B204 | (I.D) | P.21 |
| B205 | (I.D) | P.22 |
| B206 | (I.D) | P.23 |
| B207 | (I.D) | P.24 |
| B208 | (I.D) | P.25 |
| B209 | (I.D) | P.26 |

TABLE 4-continued

| B | I | II |
|---|---|---|
| B210 | (I.D) | P.27 |
| B211 | (I.D) | P.28 |
| B212 | (I.D) | P.29 |
| B213 | (I.D) | P.30 |
| B214 | (I.D) | P.31 |
| B215 | (I.D) | P.32 |
| B216 | (I.D) | P.33 |
| B217 | (I.D) | P.34 |
| B218 | (I.D) | P.35 |
| B219 | (I.D) | P.36 |
| B220 | (I.D) | P.37 |
| B221 | (I.D) | P.38 |
| B222 | (I.D) | P.39 |
| B223 | (I.D) | P.40 |
| B224 | (I.D) | P.41 |
| B225 | (I.D) | P.42 |
| B226 | (I.D) | P.43 |
| B227 | (I.D) | P.44 |
| B228 | (I.D) | P.45 |
| B229 | (I.D) | P.46 |
| B230 | (I.D) | P.47 |
| B231 | (I.D) | P.48 |
| B232 | (I.D) | P.49 |
| B233 | (I.D) | P.50 |
| B234 | (I.D) | P.51 |
| B235 | (I.D) | P.52 |
| B236 | (I.D) | P.53 |
| B237 | (I.D) | P.54 |
| B238 | (I.D) | P.55 |
| B239 | (I.D) | P.56 |
| B240 | (I.D) | P.57 |
| B241 | (I.D) | P.58 |
| B242 | (I.D) | P.59 |
| B243 | (I.D) | P.60 |
| B244 | (I.D) | P.61 |

B = Mixture;
I = compound I;
II = compound II

TABLE 5

| B | I | II |
|---|---|---|
| B245 | (I.E) | P.1 |
| B246 | (I.E) | P.2 |
| B247 | (I.E) | P.3 |
| B248 | (I.E) | P.4 |
| B249 | (I.E) | P.5 |
| B250 | (I.E) | P.6 |
| B251 | (I.E) | P.7 |
| B252 | (I.E) | P.8 |
| B253 | (I.E) | P.9 |
| B254 | (I.E) | P.10 |
| B255 | (I.E) | P.11 |
| B256 | (I.E) | P.12 |
| B257 | (I.E) | P.13 |
| B258 | (I.E) | P.14 |
| B259 | (I.E) | P.15 |
| B260 | (I.E) | P.16 |
| B261 | (I.E) | P.17 |
| B262 | (I.E) | P.18 |
| B263 | (I.E) | P.19 |
| B264 | (I.E) | P.20 |
| B265 | (I.E) | P.21 |
| B266 | (I.E) | P.22 |
| B267 | (I.E) | P.23 |
| B268 | (I.E) | P.24 |
| B269 | (I.E) | P.25 |
| B270 | (I.E) | P.26 |
| B271 | (I.E) | P.27 |
| B272 | (I.E) | P.28 |
| B273 | (I.E) | P.29 |
| B274 | (I.E) | P.30 |
| B275 | (I.E) | P.31 |
| B276 | (I.E) | P.32 |

TABLE 5-continued

| B | I | II |
|---|---|---|
| B277 | (I.E) | P.33 |
| B278 | (I.E) | P.34 |
| B279 | (I.E) | P.35 |
| B280 | (I.E) | P.36 |
| B281 | (I.E) | P.37 |
| B282 | (I.E) | P.38 |
| B283 | (I.E) | P.39 |
| B284 | (I.E) | P.40 |
| B285 | (I.E) | P.41 |
| B286 | (I.E) | P.42 |
| B287 | (I.E) | P.43 |
| B288 | (I.E) | P.44 |
| B289 | (I.E) | P.45 |
| B290 | (I.E) | P.46 |
| B291 | (I.E) | P.47 |
| B292 | (I.E) | P.48 |
| B293 | (I.E) | P.49 |
| B294 | (I.E) | P.50 |
| B295 | (I.E) | P.51 |
| B296 | (I.E) | P.52 |
| B297 | (I.E) | P.53 |
| B298 | (I.E) | P.54 |
| B299 | (I.E) | P.55 |
| B300 | (I.E) | P.56 |
| B301 | (I.E) | P.57 |
| B302 | (I.E) | P.58 |
| B303 | (I.E) | P.59 |
| B304 | (I.E) | P.60 |
| B305 | (I.E) | P.61 |

B = Mixture;
I = compound I;
II = compound II

TABLE 6

| B | I | II |
|---|---|---|
| B306 | (I.F) | P.1 |
| B307 | (I.F) | P.2 |
| B308 | (I.F) | P.3 |
| B309 | (I.F) | P.4 |
| B310 | (I.F) | P.5 |
| B311 | (I.F) | P.6 |
| B312 | (I.F) | P.7 |
| B313 | (I.F) | P.8 |
| B314 | (I.F) | P.9 |
| B315 | (I.F) | P.10 |
| B316 | (I.F) | P.11 |
| B317 | (I.F) | P.12 |
| B318 | (I.F) | P.13 |
| B319 | (I.F) | P.14 |
| B320 | (I.F) | P.15 |
| B321 | (I.F) | P.16 |
| B322 | (I.F) | P.17 |
| B323 | (I.F) | P.18 |
| B324 | (I.F) | P.19 |
| B325 | (I.F) | P.20 |
| B326 | (I.F) | P.21 |
| B327 | (I.F) | P.22 |
| B328 | (I.F) | P.23 |
| B329 | (I.F) | P.24 |
| B330 | (I.F) | P.25 |
| B331 | (I.F) | P.26 |
| B332 | (I.F) | P.27 |
| B333 | (I.F) | P.28 |
| B334 | (I.F) | P.29 |
| B335 | (I.F) | P.30 |
| B336 | (I.F) | P.31 |
| B337 | (I.F) | P.32 |
| B338 | (I.F) | P.33 |
| B339 | (I.F) | P.34 |
| B340 | (I.F) | P.35 |
| B341 | (I.F) | P.36 |
| B342 | (I.F) | P.37 |
| B343 | (I.F) | P.38 |

TABLE 6-continued

| B | I | II |
|---|---|---|
| B344 | (I.F) | P.39 |
| B345 | (I.F) | P.40 |
| B346 | (I.F) | P.41 |
| B347 | (I.F) | P.42 |
| B348 | (I.F) | P.43 |
| B349 | (I.F) | P.44 |
| B350 | (I.F) | P.45 |
| B351 | (I.F) | P.46 |
| B352 | (I.F) | P.47 |
| B353 | (I.F) | P.48 |
| B354 | (I.F) | P.49 |
| B355 | (I.F) | P.50 |
| B356 | (I.F) | P.51 |
| B357 | (I.F) | P.52 |
| B358 | (I.F) | P.53 |
| B359 | (I.F) | P.54 |
| B360 | (I.F) | P.55 |
| B361 | (I.F) | P.56 |
| B362 | (I.F) | P.57 |
| B363 | (I.F) | P.58 |
| B364 | (I.F) | P.59 |
| B365 | (I.F) | P.60 |
| B366 | (I.F) | P.61 |

B = Mixture;
I = compound I;
II = compound II

TABLE 7

| B | I | II |
|---|---|---|
| B367 | (I.G) | P.1 |
| B368 | (I.G) | P.2 |
| B369 | (I.G) | P.3 |
| B370 | (I.G) | P.4 |
| B371 | (I.G) | P.5 |
| B372 | (I.G) | P.6 |
| B373 | (I.G) | P.7 |
| B374 | (I.G) | P.8 |
| B375 | (I.G) | P.9 |
| B376 | (I.G) | P.10 |
| B377 | (I.G) | P.11 |
| B378 | (I.G) | P.12 |
| B379 | (I.G) | P.13 |
| B380 | (I.G) | P.14 |
| B381 | (I.G) | P.15 |
| B382 | (I.G) | P.16 |
| B383 | (I.G) | P.17 |
| B384 | (I.G) | P.18 |
| B385 | (I.G) | P.19 |
| B386 | (I.G) | P.20 |
| B387 | (I.G) | P.21 |
| B388 | (I.G) | P.22 |
| B389 | (I.G) | P.23 |
| B390 | (I.G) | P.24 |
| B391 | (I.G) | P.25 |
| B392 | (I.G) | P.26 |
| B393 | (I.G) | P.27 |
| B394 | (I.G) | P.28 |
| B395 | (I.G) | P.29 |
| B396 | (I.G) | P.30 |
| B397 | (I.G) | P.31 |
| B398 | (I.G) | P.32 |
| B399 | (I.G) | P.33 |
| B400 | (I.G) | P.34 |
| B401 | (I.G) | P.35 |
| B402 | (I.G) | P.36 |
| B403 | (I.G) | P.37 |
| B404 | (I.G) | P.38 |
| B405 | (I.G) | P.39 |
| B406 | (I.G) | P.40 |
| B407 | (I.G) | P.41 |
| B408 | (I.G) | P.42 |
| B409 | (I.G) | P.43 |
| B410 | (I.G) | P.44 |

TABLE 7-continued

| B | I | II |
|---|---|---|
| B411 | (I.G) | P.45 |
| B412 | (I.G) | P.46 |
| B413 | (I.G) | P.47 |
| B414 | (I.G) | P.48 |
| B415 | (I.G) | P.49 |
| B416 | (I.G) | P.50 |
| B417 | (I.G) | P.51 |
| B418 | (I.G) | P.52 |
| B419 | (I.G) | P.53 |
| B420 | (I.G) | P.54 |
| B421 | (I.G) | P.55 |
| B422 | (I.G) | P.56 |
| B423 | (I.G) | P.57 |
| B424 | (I.G) | P.58 |
| B425 | (I.G) | P.59 |
| B426 | (I.G) | P.60 |
| B427 | (I.G) | P.61 |

B = Mixture;
I = compound I;
II = compound II

TABLE 8

| B | I | II |
|---|---|---|
| B428 | (I.H) | P.1 |
| B429 | (I.H) | P.2 |
| B430 | (I.H) | P.3 |
| B431 | (I.H) | P.4 |
| B432 | (I.H) | P.5 |
| B433 | (I.H) | P.6 |
| B434 | (I.H) | P.7 |
| B435 | (I.H) | P.8 |
| B436 | (I.H) | P.9 |
| B437 | (I.H) | P.10 |
| B438 | (I.H) | P.11 |
| B439 | (I.H) | P.12 |
| B440 | (I.H) | P.13 |
| B441 | (I.H) | P.14 |
| B442 | (I.H) | P.15 |
| B443 | (I.H) | P.16 |
| B444 | (I.H) | P.17 |
| B445 | (I.H) | P.18 |
| B446 | (I.H) | P.19 |
| B447 | (I.H) | P.20 |
| B448 | (I.H) | P.21 |
| B449 | (I.H) | P.22 |
| B450 | (I.H) | P.23 |
| B451 | (I.H) | P.24 |
| B452 | (I.H) | P.25 |
| B453 | (I.H) | P.26 |
| B454 | (I.H) | P.27 |
| B455 | (I.H) | P.28 |
| B456 | (I.H) | P.29 |
| B457 | (I.H) | P.30 |
| B458 | (I.H) | P.31 |
| B459 | (I.H) | P.32 |
| B460 | (I.H) | P.33 |
| B461 | (I.H) | P.34 |
| B462 | (I.H) | P.35 |
| B463 | (I.H) | P.36 |
| B464 | (I.H) | P.37 |
| B465 | (I.H) | P.38 |
| B466 | (I.H) | P.39 |
| B467 | (I.H) | P.40 |
| B468 | (I.H) | P.41 |
| B469 | (I.H) | P.42 |
| B470 | (I.H) | P.43 |
| B471 | (I.H) | P.44 |
| B472 | (I.H) | P.45 |
| B473 | (I.H) | P.46 |
| B474 | (I.H) | P.47 |
| B475 | (I.H) | P.48 |
| B476 | (I.H) | P.49 |
| B477 | (I.H) | P.50 |

TABLE 8-continued

| B | I | II |
|---|---|---|
| B478 | (I.H) | P.51 |
| B479 | (I.H) | P.52 |
| B480 | (I.H) | P.53 |
| B481 | (I.H) | P.54 |
| B482 | (I.H) | P.55 |
| B483 | (I.H) | P.56 |
| B484 | (I.H) | P.57 |
| B485 | (I.H) | P.58 |
| B486 | (I.H) | P.59 |
| B487 | (I.H) | P.60 |
| B488 | (I.H) | P.61 |

B = Mixture;
I = compound I;
II = compound II

TABLE 9

| B | I | II |
|---|---|---|
| B489 | (I.J) | P.1 |
| B490 | (I.J) | P.2 |
| B491 | (I.J) | P.3 |
| B492 | (I.J) | P.4 |
| B493 | (I.J) | P.5 |
| B494 | (I.J) | P.6 |
| B495 | (I.J) | P.7 |
| B496 | (I.J) | P.8 |
| B497 | (I.J) | P.9 |
| B498 | (I.J) | P.10 |
| B499 | (I.J) | P.11 |
| B500 | (I.J) | P.12 |
| B501 | (I.J) | P.13 |
| B502 | (I.J) | P.14 |
| B503 | (I.J) | P.15 |
| B504 | (I.J) | P.16 |
| B505 | (I.J) | P.17 |
| B506 | (I.J) | P.18 |
| B507 | (I.J) | P.19 |
| B508 | (I.J) | P.20 |
| B509 | (I.J) | P.21 |
| B510 | (I.J) | P.22 |
| B511 | (I.J) | P.23 |
| B512 | (I.J) | P.24 |
| B513 | (I.J) | P.25 |
| B514 | (I.J) | P.26 |
| B515 | (I.J) | P.27 |
| B516 | (I.J) | P.28 |
| B517 | (I.J) | P.29 |
| B518 | (I.J) | P.30 |
| B519 | (I.J) | P.31 |
| B520 | (I.J) | P.32 |
| B521 | (I.J) | P.33 |
| B522 | (I.J) | P.34 |
| B523 | (I.J) | P.35 |
| B524 | (I.J) | P.36 |
| B525 | (I.J) | P.37 |
| B526 | (I.J) | P.38 |
| B527 | (I.J) | P.39 |
| B528 | (I.J) | P.40 |
| B529 | (I.J) | P.41 |
| B530 | (I.J) | P.42 |
| B531 | (I.J) | P.43 |
| B532 | (I.J) | P.44 |
| B533 | (I.J) | P.45 |
| B534 | (I.J) | P.46 |
| B535 | (I.J) | P.47 |
| B536 | (I.J) | P.48 |
| B537 | (I.J) | P.49 |
| B538 | (I.J) | P.50 |
| B539 | (I.J) | P.51 |
| B540 | (I.J) | P.52 |
| B541 | (I.J) | P.53 |
| B542 | (I.J) | P.54 |
| B543 | (I.J) | P.55 |
| B544 | (I.J) | P.56 |

TABLE 9-continued

| B | I | II |
|---|---|---|
| B545 | (I.J) | P.57 |
| B546 | (I.J) | P.58 |
| B547 | (I.J) | P.59 |
| B548 | (I.J) | P.60 |
| B549 | (I.J) | P.61 |

B = Mixture;
I = compound I;
II = compound II

TABLE 10

| B | I | II |
|---|---|---|
| B550 | (I.K) | P.1 |
| B551 | (I.K) | P.2 |
| B552 | (I.K) | P.3 |
| B553 | (I.K) | P.4 |
| B554 | (I.K) | P.5 |
| B555 | (I.K) | P.6 |
| B556 | (I.K) | P.7 |
| B557 | (I.K) | P.8 |
| B558 | (I.K) | P.9 |
| B559 | (I.K) | P.10 |
| B560 | (I.K) | P.11 |
| B561 | (I.K) | P.12 |
| B562 | (I.K) | P.13 |
| B563 | (I.K) | P.14 |
| B564 | (I.K) | P.15 |
| B565 | (I.K) | P.16 |
| B566 | (I.K) | P.17 |
| B567 | (I.K) | P.18 |
| B568 | (I.K) | P.19 |
| B569 | (I.K) | P.20 |
| B570 | (I.K) | P.21 |
| B571 | (I.K) | P.22 |
| B572 | (I.K) | P.23 |
| B573 | (I.K) | P.24 |
| B574 | (I.K) | P.25 |
| B575 | (I.K) | P.26 |
| B576 | (I.K) | P.27 |
| B577 | (I.K) | P.28 |
| B578 | (I.K) | P.29 |
| B579 | (I.K) | P.30 |
| B580 | (I.K) | P.31 |
| B581 | (I.K) | P.32 |
| B582 | (I.K) | P.33 |
| B583 | (I.K) | P.34 |
| B584 | (I.K) | P.35 |
| B585 | (I.K) | P.36 |
| B586 | (I.K) | P.37 |
| B587 | (I.K) | P.38 |
| B588 | (I.K) | P.39 |
| B589 | (I.K) | P.40 |
| B590 | (I.K) | P.41 |
| B591 | (I.K) | P.42 |
| B592 | (I.K) | P.43 |
| B593 | (I.K) | P.44 |
| B594 | (I.K) | P.45 |
| B595 | (I.K) | P.46 |
| B596 | (I.K) | P.47 |
| B597 | (I.K) | P.48 |
| B598 | (I.K) | P.49 |
| B599 | (I.K) | P.50 |
| B600 | (I.K) | P.51 |
| B601 | (I.K) | P.52 |
| B602 | (I.K) | P.53 |
| B603 | (I.K) | P.54 |
| B604 | (I.K) | P.55 |
| B605 | (I.K) | P.56 |
| B606 | (I.K) | P.57 |
| B607 | (I.K) | P.58 |
| B608 | (I.K) | P.59 |

TABLE 10-continued

| B | I | II |
|---|---|---|
| B609 | (I.K) | P.60 |
| B610 | (I.K) | P.61 |

B = Mixture;
I = compound I;
II = compound II

TABLE 11

| B | I | II |
|---|---|---|
| B611 | (I.L) | P.1 |
| B612 | (I.L) | P.2 |
| B613 | (I.L) | P.3 |
| B614 | (I.L) | P.4 |
| B615 | (I.L) | P.5 |
| B616 | (I.L) | P.6 |
| B617 | (I.L) | P.7 |
| B618 | (I.L) | P.8 |
| B619 | (I.L) | P.9 |
| B620 | (I.L) | P.10 |
| B621 | (I.L) | P.11 |
| B622 | (I.L) | P.12 |
| B623 | (I.L) | P.13 |
| B624 | (I.L) | P.14 |
| B625 | (I.L) | P.15 |
| B626 | (I.L) | P.16 |
| B627 | (I.L) | P.17 |
| B628 | (I.L) | P.18 |
| B629 | (I.L) | P.19 |
| B630 | (I.L) | P.20 |
| B631 | (I.L) | P.21 |
| B632 | (I.L) | P.22 |
| B633 | (I.L) | P.23 |
| B634 | (I.L) | P.24 |
| B635 | (I.L) | P.25 |
| B636 | (I.L) | P.26 |
| B637 | (I.L) | P.27 |
| B638 | (I.L) | P.28 |
| B639 | (I.L) | P.29 |
| B640 | (I.L) | P.30 |
| B641 | (I.L) | P.31 |
| B642 | (I.L) | P.32 |
| B643 | (I.L) | P.33 |
| B644 | (I.L) | P.34 |
| B645 | (I.L) | P.35 |
| B646 | (I.L) | P.36 |
| B647 | (I.L) | P.37 |
| B648 | (I.L) | P.38 |
| B649 | (I.L) | P.39 |
| B650 | (I.L) | P.40 |
| B651 | (I.L) | P.41 |
| B652 | (I.L) | P.42 |
| B653 | (I.L) | P.43 |
| B654 | (I.L) | P.44 |
| B655 | (I.L) | P.45 |
| B656 | (I.L) | P.46 |
| B657 | (I.L) | P.47 |
| B658 | (I.L) | P.48 |
| B659 | (I.L) | P.49 |
| B660 | (I.L) | P.50 |
| B661 | (I.L) | P.51 |
| B662 | (I.L) | P.52 |
| B663 | (I.L) | P.53 |
| B664 | (I.L) | P.54 |
| B665 | (I.L) | P.55 |
| B666 | (I.L) | P.56 |
| B667 | (I.L) | P.57 |
| B668 | (I.L) | P.58 |
| B669 | (I.L) | P.59 |
| B670 | (I.L) | P.60 |
| B671 | (I.L) | P.61 |

B = Mixture;
I = compound I;
II = compound II

TABLE 12

| B | I | II |
|---|---|---|
| B672 | (I.M) | P.1 |
| B673 | (I.M) | P.2 |
| B674 | (I.M) | P.3 |
| B675 | (I.M) | P.4 |
| B676 | (I.M) | P.5 |
| B677 | (I.M) | P.6 |
| B678 | (I.M) | P.7 |
| B679 | (I.M) | P.8 |
| B680 | (I.M) | P.9 |
| B681 | (I.M) | P.10 |
| B682 | (I.M) | P.11 |
| B683 | (I.M) | P.12 |
| B684 | (I.M) | P.13 |
| B685 | (I.M) | P.14 |
| B686 | (I.M) | P.15 |
| B687 | (I.M) | P.16 |
| B688 | (I.M) | P.17 |
| B689 | (I.M) | P.18 |
| B690 | (I.M) | P.19 |
| B691 | (I.M) | P.20 |
| B692 | (I.M) | P.21 |
| B693 | (I.M) | P.22 |
| B694 | (I.M) | P.23 |
| B695 | (I.M) | P.24 |
| B696 | (I.M) | P.25 |
| B697 | (I.M) | P.26 |
| B698 | (I.M) | P.27 |
| B699 | (I.M) | P.28 |
| B700 | (I.M) | P.29 |
| B701 | (I.M) | P.30 |
| B702 | (I.M) | P.31 |
| B703 | (I.M) | P.32 |
| B704 | (I.M) | P.33 |
| B705 | (I.M) | P.34 |
| B706 | (I.M) | P.35 |
| B707 | (I.M) | P.36 |
| B708 | (I.M) | P.37 |
| B709 | (I.M) | P.38 |
| B710 | (I.M) | P.39 |
| B711 | (I.M) | P.40 |
| B712 | (I.M) | P.41 |
| B713 | (I.M) | P.42 |
| B714 | (I.M) | P.43 |
| B715 | (I.M) | P.44 |
| B716 | (I.M) | P.45 |
| B717 | (I.M) | P.46 |
| B718 | (I.M) | P.47 |
| B719 | (I.M) | P.48 |
| B720 | (I.M) | P.49 |
| B721 | (I.M) | P.50 |
| B722 | (I.M) | P.51 |
| B723 | (I.M) | P.52 |
| B724 | (I.M) | P.53 |
| B725 | (I.M) | P.54 |
| B726 | (I.M) | P.55 |
| B727 | (I.M) | P.56 |
| B728 | (I.M) | P.57 |
| B729 | (I.M) | P.58 |
| B730 | (I.M) | P.59 |
| B731 | (I.M) | P.60 |
| B732 | (I.M) | P.61 |

B = Mixture;
I = compound I;
II = compound II

TABLE 13

| B | I | II |
|---|---|---|
| B733 | (I.N) | P.1 |
| B734 | (I.N) | P.2 |
| B735 | (I.N) | P.3 |
| B736 | (I.N) | P.4 |
| B737 | (I.N) | P.5 |
| B738 | (I.N) | P.6 |

TABLE 13-continued

| B | I | II |
|---|---|---|
| B739 | (I.N) | P.7 |
| B740 | (I.N) | P.8 |
| B741 | (I.N) | P.9 |
| B742 | (I.N) | P.10 |
| B743 | (I.N) | P.11 |
| B744 | (I.N) | P.12 |
| B745 | (I.N) | P.13 |
| B746 | (I.N) | P.14 |
| B747 | (I.N) | P.15 |
| B748 | (I.N) | P.16 |
| B749 | (I.N) | P.17 |
| B750 | (I.N) | P.18 |
| B751 | (I.N) | P.19 |
| B752 | (I.N) | P.20 |
| B753 | (I.N) | P.21 |
| B754 | (I.N) | P.22 |
| B755 | (I.N) | P.23 |
| B756 | (I.N) | P.24 |
| B757 | (I.N) | P.25 |
| B758 | (I.N) | P.26 |
| B759 | (I.N) | P.27 |
| B760 | (I.N) | P.28 |
| B761 | (I.N) | P.29 |
| B762 | (I.N) | P.30 |
| B763 | (I.N) | P.31 |
| B764 | (I.N) | P.32 |
| B765 | (I.N) | P.33 |
| B766 | (I.N) | P.34 |
| B767 | (I.N) | P.35 |
| B768 | (I.N) | P.36 |
| B769 | (I.N) | P.37 |
| B770 | (I.N) | P.38 |
| B771 | (I.N) | P.39 |
| B772 | (I.N) | P.40 |
| B773 | (I.N) | P.41 |
| B774 | (I.N) | P.42 |
| B775 | (I.N) | P.43 |
| B776 | (I.N) | P.44 |
| B777 | (I.N) | P.45 |
| B778 | (I.N) | P.46 |
| B779 | (I.N) | P.47 |
| B780 | (I.N) | P.48 |
| B781 | (I.N) | P.49 |
| B782 | (I.N) | P.50 |
| B783 | (I.N) | P.51 |
| B784 | (I.N) | P.52 |
| B785 | (I.N) | P.53 |
| B786 | (I.N) | P.54 |
| B787 | (I.N) | P.55 |
| B788 | (I.N) | P.56 |
| B789 | (I.N) | P.57 |
| B790 | (I.N) | P.58 |
| B791 | (I.N) | P.59 |
| B792 | (I.N) | P.60 |
| B793 | (I.N) | P.61 |

B = Mixture;
I = compound I;
II = compound II

TABLE 14

| B | I | II |
|---|---|---|
| B794 | (I.O) | P.1 |
| B795 | (I.O) | P.2 |
| B796 | (I.O) | P.3 |
| B797 | (I.O) | P.4 |
| B798 | (I.O) | P.5 |
| B799 | (I.O) | P.6 |
| B800 | (I.O) | P.7 |
| B801 | (I.O) | P.8 |
| B802 | (I.O) | P.9 |
| B803 | (I.O) | P.10 |
| B804 | (I.O) | P.11 |
| B805 | (I.O) | P.12 |

TABLE 14-continued

| B | I | II |
|---|---|---|
| B806 | (I.O) | P.13 |
| B807 | (I.O) | P.14 |
| B808 | (I.O) | P.15 |
| B809 | (I.O) | P.16 |
| B810 | (I.O) | P.17 |
| B811 | (I.O) | P.18 |
| B812 | (I.O) | P.19 |
| B813 | (I.O) | P.20 |
| B814 | (I.O) | P.21 |
| B815 | (I.O) | P.22 |
| B816 | (I.O) | P.23 |
| B817 | (I.O) | P.24 |
| B818 | (I.O) | P.25 |
| B819 | (I.O) | P.26 |
| B820 | (I.O) | P.27 |
| B821 | (I.O) | P.28 |
| B822 | (I.O) | P.29 |
| B823 | (I.O) | P.30 |
| B824 | (I.O) | P.31 |
| B825 | (I.O) | P.32 |
| B826 | (I.O) | P.33 |
| B827 | (I.O) | P.34 |
| B828 | (I.O) | P.35 |
| B829 | (I.O) | P.36 |
| B830 | (I.O) | P.37 |
| B831 | (I.O) | P.38 |
| B832 | (I.O) | P.39 |
| B833 | (I.O) | P.40 |
| B834 | (I.O) | P.41 |
| B835 | (I.O) | P.42 |
| B836 | (I.O) | P.43 |
| B837 | (I.O) | P.44 |
| B838 | (I.O) | P.45 |
| B839 | (I.O) | P.46 |
| B840 | (I.O) | P.47 |
| B841 | (I.O) | P.48 |
| B842 | (I.O) | P.49 |
| B843 | (I.O) | P.50 |
| B844 | (I.O) | P.51 |
| B845 | (I.O) | P.52 |
| B846 | (I.O) | P.53 |
| B847 | (I.O) | P.54 |
| B848 | (I.O) | P.55 |
| B849 | (I.O) | P.56 |
| B850 | (I.O) | P.57 |
| B851 | (I.O) | P.58 |
| B852 | (I.O) | P.59 |
| B853 | (I.O) | P.60 |
| B854 | (I.O) | P.61 |

B = Mixture;
I = compound I;
II = compound II

TABLE 15

| B | I | II |
|---|---|---|
| B855 | (I.P) | P.1 |
| B856 | (I.P) | P.2 |
| B857 | (I.P) | P.3 |
| B858 | (I.P) | P.4 |
| B859 | (I.P) | P.5 |
| B860 | (I.P) | P.6 |
| B861 | (I.P) | P.7 |
| B862 | (I.P) | P.8 |
| B863 | (I.P) | P.9 |
| B864 | (I.P) | P.10 |
| B865 | (I.P) | P.11 |
| B866 | (I.P) | P.12 |
| B867 | (I.P) | P.13 |
| B868 | (I.P) | P.14 |
| B869 | (I.P) | P.15 |
| B870 | (I.P) | P.16 |
| B871 | (I.P) | P.17 |
| B872 | (I.P) | P.18 |

TABLE 15-continued

| B | I | II |
|---|---|---|
| B873 | (I.P) | P.19 |
| B874 | (I.P) | P.20 |
| B875 | (I.P) | P.21 |
| B876 | (I.P) | P.22 |
| B877 | (I.P) | P.23 |
| B878 | (I.P) | P.24 |
| B879 | (I.P) | P.25 |
| B880 | (I.P) | P.26 |
| B881 | (I.P) | P.27 |
| B882 | (I.P) | P.28 |
| B883 | (I.P) | P.29 |
| B884 | (I.P) | P.30 |
| B885 | (I.P) | P.31 |
| B886 | (I.P) | P.32 |
| B887 | (I.P) | P.33 |
| B888 | (I.P) | P.34 |
| B889 | (I.P) | P.35 |
| B890 | (I.P) | P.36 |
| B891 | (I.P) | P.37 |
| B892 | (I.P) | P.38 |
| B893 | (I.P) | P.39 |
| B894 | (I.P) | P.40 |
| B895 | (I.P) | P.41 |
| B896 | (I.P) | P.42 |
| B897 | (I.P) | P.43 |
| B898 | (I.P) | P.44 |
| B899 | (I.P) | P.45 |
| B900 | (I.P) | P.46 |
| B901 | (I.P) | P.47 |
| B902 | (I.P) | P.48 |
| B903 | (I.P) | P.49 |
| B904 | (I.P) | P.50 |
| B905 | (I.P) | P.51 |
| B906 | (I.P) | P.52 |
| B907 | (I.P) | P.53 |
| B908 | (I.P) | P.54 |
| B909 | (I.P) | P.55 |
| B910 | (I.P) | P.56 |
| B911 | (I.P) | P.57 |
| B912 | (I.P) | P.58 |
| B913 | (I.P) | P.59 |
| B914 | (I.P) | P.60 |
| B915 | (I.P) | P.61 |

B = Mixture;
I = compound I;
II = compound II

TABLE 16

| B | I | II |
|---|---|---|
| B916 | (I.Q) | P.1 |
| B917 | (I.Q) | P.2 |
| B918 | (I.Q) | P.3 |
| B919 | (I.Q) | P.4 |
| B920 | (I.Q) | P.5 |
| B921 | (I.Q) | P.6 |
| B922 | (I.Q) | P.7 |
| B923 | (I.Q) | P.8 |
| B924 | (I.Q) | P.9 |
| B925 | (I.Q) | P.10 |
| B926 | (I.Q) | P.11 |
| B927 | (I.Q) | P.12 |
| B928 | (I.Q) | P.13 |
| B929 | (I.Q) | P.14 |
| B930 | (I.Q) | P.15 |
| B931 | (I.Q) | P.16 |
| B932 | (I.Q) | P.17 |
| B933 | (I.Q) | P.18 |
| B934 | (I.Q) | P.19 |
| B935 | (I.Q) | P.20 |
| B936 | (I.Q) | P.21 |
| B937 | (I.Q) | P.22 |
| B938 | (I.Q) | P.23 |
| B939 | (I.Q) | P.24 |

TABLE 16-continued

| B | I | II |
|---|---|---|
| B940 | (I.Q) | P.25 |
| B941 | (I.Q) | P.26 |
| B942 | (I.Q) | P.27 |
| B943 | (I.Q) | P.28 |
| B944 | (I.Q) | P.29 |
| B945 | (I.Q) | P.30 |
| B946 | (I.Q) | P.31 |
| B947 | (I.Q) | P.32 |
| B948 | (I.Q) | P.33 |
| B949 | (I.Q) | P.34 |
| B950 | (I.Q) | P.35 |
| B951 | (I.Q) | P.36 |
| B952 | (I.Q) | P.37 |
| B953 | (I.Q) | P.38 |
| B954 | (I.Q) | P.39 |
| B955 | (I.Q) | P.40 |
| B956 | (I.Q) | P.41 |
| B957 | (I.Q) | P.42 |
| B958 | (I.Q) | P.43 |
| B959 | (I.Q) | P.44 |
| B960 | (I.Q) | P.45 |
| B961 | (I.Q) | P.46 |
| B962 | (I.Q) | P.47 |
| B963 | (I.Q) | P.48 |
| B964 | (I.Q) | P.49 |
| B965 | (I.Q) | P.50 |
| B966 | (I.Q) | P.51 |
| B967 | (I.Q) | P.52 |
| B968 | (I.Q) | P.53 |
| B969 | (I.Q) | P.54 |
| B970 | (I.Q) | P.55 |
| B971 | (I.Q) | P.56 |
| B972 | (I.Q) | P.57 |
| B973 | (I.Q) | P.58 |
| B974 | (I.Q) | P.59 |
| B975 | (I.Q) | P.60 |
| B976 | (I.Q) | P.61 |

B = Mixture;
I = compound I;
II = compound II

TABLE 17

| B | I | II |
|---|---|---|
| B977 | (I.R) | P.1 |
| B978 | (I.R) | P.2 |
| B979 | (I.R) | P.3 |
| B980 | (I.R) | P.4 |
| B981 | (I.R) | P.5 |
| B982 | (I.R) | P.6 |
| B983 | (I.R) | P.7 |
| B984 | (I.R) | P.8 |
| B985 | (I.R) | P.9 |
| B986 | (I.R) | P.10 |
| B987 | (I.R) | P.11 |
| B988 | (I.R) | P.12 |
| B989 | (I.R) | P.13 |
| B990 | (I.R) | P.14 |
| B991 | (I.R) | P.15 |
| B992 | (I.R) | P.16 |
| B993 | (I.R) | P.17 |
| B994 | (I.R) | P.18 |
| B995 | (I.R) | P.19 |
| B996 | (I.R) | P.20 |
| B997 | (I.R) | P.21 |
| B998 | (I.R) | P.22 |
| B999 | (I.R) | P.23 |
| B1000 | (I.R) | P.24 |
| B1001 | (I.R) | P.25 |
| B1002 | (I.R) | P.26 |
| B1003 | (I.R) | P.27 |
| B1004 | (I.R) | P.28 |
| B1005 | (I.R) | P.29 |
| B1006 | (I.R) | P.30 |

TABLE 17-continued

| B | I | II |
|---|---|---|
| B1007 | (I.R) | P.31 |
| B1008 | (I.R) | P.32 |
| B1009 | (I.R) | P.33 |
| B1010 | (I.R) | P.34 |
| B1011 | (I.R) | P.35 |
| B1012 | (I.R) | P.36 |
| B1013 | (I.R) | P.37 |
| B1014 | (I.R) | P.38 |
| B1015 | (I.R) | P.39 |
| B1016 | (I.R) | P.40 |
| B1017 | (I.R) | P.41 |
| B1018 | (I.R) | P.42 |
| B1019 | (I.R) | P.43 |
| B1020 | (I.R) | P.44 |
| B1021 | (I.R) | P.45 |
| B1022 | (I.R) | P.46 |
| B1023 | (I.R) | P.47 |
| B1024 | (I.R) | P.48 |
| B1025 | (I.R) | P.49 |
| B1026 | (I.R) | P.50 |
| B1027 | (I.R) | P.51 |
| B1028 | (I.R) | P.52 |
| B1029 | (I.R) | P.53 |
| B1030 | (I.R) | P.54 |
| B1031 | (I.R) | P.55 |
| B1032 | (I.R) | P.56 |
| B1033 | (I.R) | P.57 |
| B1034 | (I.R) | P.58 |
| B1035 | (I.R) | P.59 |
| B1036 | (I.R) | P.60 |
| B1037 | (I.R) | P.61 |

B = Mixture;
I = compound I;
II = compound II

TABLE 18

| B | I | II |
|---|---|---|
| B1038 | (I.S) | P.1 |
| B1039 | (I.S) | P.2 |
| B1040 | (I.S) | P.3 |
| B1041 | (I.S) | P.4 |
| B1042 | (I.S) | P.5 |
| B1043 | (I.S) | P.6 |
| B1044 | (I.S) | P.7 |
| B1045 | (I.S) | P.8 |
| B1046 | (I.S) | P.9 |
| B1047 | (I.S) | P.10 |
| B1048 | (I.S) | P.11 |
| B1049 | (I.S) | P.12 |
| B1050 | (I.S) | P.13 |
| B1051 | (I.S) | P.14 |
| B1052 | (I.S) | P.15 |
| B1053 | (I.S) | P.16 |
| B1054 | (I.S) | P.17 |
| B1055 | (I.S) | P.18 |
| B1056 | (I.S) | P.19 |
| B1057 | (I.S) | P.20 |
| B1058 | (I.S) | P.21 |
| B1059 | (I.S) | P.22 |
| B1060 | (I.S) | P.23 |
| B1061 | (I.S) | P.24 |
| B1062 | (I.S) | P.25 |
| B1063 | (I.S) | P.26 |
| B1064 | (I.S) | P.27 |
| B1065 | (I.S) | P.28 |
| B1066 | (I.S) | P.29 |
| B1067 | (I.S) | P.30 |
| B1068 | (I.S) | P.31 |
| B1069 | (I.S) | P.32 |
| B1070 | (I.S) | P.33 |
| B1071 | (I.S) | P.34 |
| B1072 | (I.S) | P.35 |
| B1073 | (I.S) | P.36 |

TABLE 18-continued

| B | I | II |
|---|---|---|
| B1074 | (I.S) | P.37 |
| B1075 | (I.S) | P.38 |
| B1076 | (I.S) | P.39 |
| B1077 | (I.S) | P.40 |
| B1078 | (I.S) | P.41 |
| B1079 | (I.S) | P.42 |
| B1080 | (I.S) | P.43 |
| B1081 | (I.S) | P.44 |
| B1082 | (I.S) | P.45 |
| B1083 | (I.S) | P.46 |
| B1084 | (I.S) | P.47 |
| B1085 | (I.S) | P.48 |
| B1086 | (I.S) | P.49 |
| B1087 | (I.S) | P.50 |
| B1088 | (I.S) | P.51 |
| B1089 | (I.S) | P.52 |
| B1090 | (I.S) | P.53 |
| B1091 | (I.S) | P.54 |
| B1092 | (I.S) | P.55 |
| B1093 | (I.S) | P.56 |
| B1094 | (I.S) | P.57 |
| B1095 | (I.S) | P.58 |
| B1096 | (I.S) | P.59 |
| B1097 | (I.S) | P.60 |
| B1098 | (I.S) | P.61 |

B = Mixture;
I = compound I;
II = compound II

TABLE 19

| B | I | II |
|---|---|---|
| B1099 | (I.T) | P.1 |
| B1100 | (I.T) | P.2 |
| B1101 | (I.T) | P.3 |
| B1102 | (I.T) | P.4 |
| B1103 | (I.T) | P.5 |
| B1104 | (I.T) | P.6 |
| B1105 | (I.T) | P.7 |
| B1106 | (I.T) | P.8 |
| B1107 | (I.T) | P.9 |
| B1108 | (I.T) | P.10 |
| B1109 | (I.T) | P.11 |
| B1110 | (I.T) | P.12 |
| B1111 | (I.T) | P.13 |
| B1112 | (I.T) | P.14 |
| B1113 | (I.T) | P.15 |
| B1114 | (I.T) | P.16 |
| B1115 | (I.T) | P.17 |
| B1116 | (I.T) | P.18 |
| B1117 | (I.T) | P.19 |
| B1118 | (I.T) | P.20 |
| B1119 | (I.T) | P.21 |
| B1120 | (I.T) | P.22 |
| B1121 | (I.T) | P.23 |
| B1122 | (I.T) | P.24 |
| B1123 | (I.T) | P.25 |
| B1124 | (I.T) | P.26 |
| B1125 | (I.T) | P.27 |
| B1126 | (I.T) | P.28 |
| B1127 | (I.T) | P.29 |
| B1128 | (I.T) | P.30 |
| B1129 | (I.T) | P.31 |
| B1130 | (I.T) | P.32 |
| B1131 | (I.T) | P.33 |
| B1132 | (I.T) | P.34 |
| B1133 | (I.T) | P.35 |
| B1134 | (I.T) | P.36 |
| B1135 | (I.T) | P.37 |
| B1136 | (I.T) | P.38 |
| B1137 | (I.T) | P.39 |
| B1138 | (I.T) | P.40 |
| B1139 | (I.T) | P.41 |
| B1140 | (I.T) | P.42 |

TABLE 19-continued

| B | I | II |
|---|---|---|
| B1141 | (I.T) | P.43 |
| B1142 | (I.T) | P.44 |
| B1143 | (I.T) | P.45 |
| B1144 | (I.T) | P.46 |
| B1145 | (I.T) | P.47 |
| B1146 | (I.T) | P.48 |
| B1147 | (I.T) | P.49 |
| B1148 | (I.T) | P.50 |
| B1149 | (I.T) | P.51 |
| B1150 | (I.T) | P.52 |
| B1151 | (I.T) | P.53 |
| B1152 | (I.T) | P.54 |
| B1153 | (I.T) | P.55 |
| B1154 | (I.T) | P.56 |
| B1155 | (I.T) | P.57 |
| B1156 | (I.T) | P.58 |
| B1157 | (I.T) | P.59 |
| B1158 | (I.T) | P.60 |
| B1159 | (I.T) | P.61 |

B = Mixture;
I = compound I;
II = compound II

TABLE 20

| B | I | II |
|---|---|---|
| B1160 | (I.U) | P.1 |
| B1161 | (I.U) | P.2 |
| B1162 | (I.U) | P.3 |
| B1163 | (I.U) | P.4 |
| B1164 | (I.U) | P.5 |
| B1165 | (I.U) | P.6 |
| B1166 | (I.U) | P.7 |
| B1167 | (I.U) | P.8 |
| B1168 | (I.U) | P.9 |
| B1169 | (I.U) | P.10 |
| B1170 | (I.U) | P.11 |
| B1171 | (I.U) | P.12 |
| B1172 | (I.U) | P.13 |
| B1173 | (I.U) | P.14 |
| B1174 | (I.U) | P.15 |
| B1175 | (I.U) | P.16 |
| B1176 | (I.U) | P.17 |
| B1177 | (I.U) | P.18 |
| B1178 | (I.U) | P.19 |
| B1179 | (I.U) | P.20 |
| B1180 | (I.U) | P.21 |
| B1181 | (I.U) | P.22 |
| B1182 | (I.U) | P.23 |
| B1183 | (I.U) | P.24 |
| B1184 | (I.U) | P.25 |
| B1185 | (I.U) | P.26 |
| B1186 | (I.U) | P.27 |
| B1187 | (I.U) | P.28 |
| B1188 | (I.U) | P.29 |
| B1189 | (I.U) | P.30 |
| B1190 | (I.U) | P.31 |
| B1191 | (I.U) | P.32 |
| B1192 | (I.U) | P.33 |
| B1193 | (I.U) | P.34 |
| B1194 | (I.U) | P.35 |
| B1195 | (I.U) | P.36 |
| B1196 | (I.U) | P.37 |
| B1197 | (I.U) | P.38 |
| B1198 | (I.U) | P.39 |
| B1199 | (I.U) | P.40 |
| B1200 | (I.U) | P.41 |
| B1201 | (I.U) | P.42 |
| B1202 | (I.U) | P.43 |
| B1203 | (I.U) | P.44 |
| B1204 | (I.U) | P.45 |
| B1205 | (I.U) | P.46 |
| B1206 | (I.U) | P.47 |
| B1207 | (I.U) | P.48 |
| B1208 | (I.U) | P.49 |
| B1209 | (I.U) | P.50 |
| B1210 | (I.U) | P.51 |
| B1211 | (I.U) | P.52 |
| B1212 | (I.U) | P.53 |
| B1213 | (I.U) | P.54 |
| B1214 | (I.U) | P.55 |
| B1215 | (I.U) | P.56 |
| B1216 | (I.U) | P.57 |
| B1217 | (I.U) | P.58 |
| B1218 | (I.U) | P.59 |
| B1219 | (I.U) | P.60 |
| B1220 | (I.U) | P.61 |

B = Mixture;
I = compound I;
II = compound II

TABLE 21

| B | I | II |
|---|---|---|
| B1221 | (I.V) | P.1 |
| B1222 | (I.V) | P.2 |
| B1223 | (I.V) | P.3 |
| B1224 | (I.V) | P.4 |
| B1225 | (I.V) | P.5 |
| B1226 | (I.V) | P.6 |
| B1227 | (I.V) | P.7 |
| B1228 | (I.V) | P.8 |
| B1229 | (I.V) | P.9 |
| B1230 | (I.V) | P.10 |
| B1231 | (I.V) | P.11 |
| B1232 | (I.V) | P.12 |
| B1233 | (I.V) | P.13 |
| B1234 | (I.V) | P.14 |
| B1235 | (I.V) | P.15 |
| B1236 | (I.V) | P.16 |
| B1237 | (I.V) | P.17 |
| B1238 | (I.V) | P.18 |
| B1239 | (I.V) | P.19 |
| B1240 | (I.V) | P.20 |
| B1241 | (I.V) | P.21 |
| B1242 | (I.V) | P.22 |
| B1243 | (I.V) | P.23 |
| B1244 | (I.V) | P.24 |
| B1245 | (I.V) | P.25 |
| B1246 | (I.V) | P.26 |
| B1247 | (I.V) | P.27 |
| B1248 | (I.V) | P.28 |
| B1249 | (I.V) | P.29 |
| B1250 | (I.V) | P.30 |
| B1251 | (I.V) | P.31 |
| B1252 | (I.V) | P.32 |
| B1253 | (I.V) | P.33 |
| B1254 | (I.V) | P.34 |
| B1255 | (I.V) | P.35 |
| B1256 | (I.V) | P.36 |
| B1257 | (I.V) | P.37 |
| B1258 | (I.V) | P.38 |
| B1259 | (I.V) | P.39 |
| B1260 | (I.V) | P.40 |
| B1261 | (I.V) | P.41 |
| B1262 | (I.V) | P.42 |
| B1263 | (I.V) | P.43 |
| B1264 | (I.V) | P.44 |
| B1265 | (I.V) | P.45 |
| B1266 | (I.V) | P.46 |
| B1267 | (I.V) | P.47 |
| B1268 | (I.V) | P.48 |
| B1269 | (I.V) | P.49 |
| B1270 | (I.V) | P.50 |
| B1271 | (I.V) | P.51 |
| B1272 | (I.V) | P.52 |
| B1273 | (I.V) | P.53 |
| B1274 | (I.V) | P.54 |

TABLE 21-continued

| B | I | II |
|---|---|---|
| B1275 | (I.V) | P.55 |
| B1276 | (I.V) | P.56 |
| B1277 | (I.V) | P.57 |
| B1278 | (I.V) | P.58 |
| B1279 | (I.V) | P.59 |
| B1280 | (I.V) | P.60 |
| B1281 | (I.V) | P.61 |

B = Mixture;
I = compound I;
II = compound II

TABLE 22

| B | I | II |
|---|---|---|
| B1282 | (I.W) | P.1 |
| B1283 | (I.W) | P.2 |
| B1284 | (I.W) | P.3 |
| B1285 | (I.W) | P.4 |
| B1286 | (I.W) | P.5 |
| B1287 | (I.W) | P.6 |
| B1288 | (I.W) | P.7 |
| B1289 | (I.W) | P.8 |
| B1290 | (I.W) | P.9 |
| B1291 | (I.W) | P.10 |
| B1292 | (I.W) | P.11 |
| B1293 | (I.W) | P.12 |
| B1294 | (I.W) | P.13 |
| B1295 | (I.W) | P.14 |
| B1296 | (I.W) | P.15 |
| B1297 | (I.W) | P.16 |
| B1298 | (I.W) | P.17 |
| B1299 | (I.W) | P.18 |
| B1300 | (I.W) | P.19 |
| B1301 | (I.W) | P.20 |
| B1302 | (I.W) | P.21 |
| B1303 | (I.W) | P.22 |
| B1304 | (I.W) | P.23 |
| B1305 | (I.W) | P.24 |
| B1306 | (I.W) | P.25 |
| B1307 | (I.W) | P.26 |
| B1308 | (I.W) | P.27 |
| B1309 | (I.W) | P.28 |
| B1310 | (I.W) | P.29 |
| B1311 | (I.W) | P.30 |
| B1312 | (I.W) | P.31 |
| B1313 | (I.W) | P.32 |
| B1314 | (I.W) | P.33 |
| B1315 | (I.W) | P.34 |
| B1316 | (I.W) | P.35 |
| B1317 | (I.W) | P.36 |
| B1318 | (I.W) | P.37 |
| B1319 | (I.W) | P.38 |
| B1320 | (I.W) | P.39 |
| B1321 | (I.W) | P.40 |
| B1322 | (I.W) | P.41 |
| B1323 | (I.W) | P.42 |
| B1324 | (I.W) | P.43 |
| B1325 | (I.W) | P.44 |
| B1326 | (I.W) | P.45 |
| B1327 | (I.W) | P.46 |
| B1328 | (I.W) | P.47 |
| B1329 | (I.W) | P.48 |
| B1330 | (I.W) | P.49 |
| B1331 | (I.W) | P.50 |
| B1332 | (I.W) | P.51 |
| B1333 | (I.W) | P.52 |
| B1334 | (I.W) | P.53 |
| B1335 | (I.W) | P.54 |
| B1336 | (I.W) | P.55 |
| B1337 | (I.W) | P.56 |
| B1338 | (I.W) | P.57 |
| B1339 | (I.W) | P.58 |
| B1340 | (I.W) | P.59 |

TABLE 22-continued

| B | I | II |
|---|---|---|
| B1341 | (I.W) | P.60 |
| B1342 | (I.W) | P.61 |

B = Mixture;
I = compound I;
II = compound II

TABLE 23

| B | I | II |
|---|---|---|
| B1343 | (I.X) | P.1 |
| B1344 | (I.X) | P.2 |
| B1345 | (I.X) | P.3 |
| B1346 | (I.X) | P.4 |
| B1347 | (I.X) | P.5 |
| B1348 | (I.X) | P.6 |
| B1349 | (I.X) | P.7 |
| B1350 | (I.X) | P.8 |
| B1351 | (I.X) | P.9 |
| B1352 | (I.X) | P.10 |
| B1353 | (I.X) | P.11 |
| B1354 | (I.X) | P.12 |
| B1355 | (I.X) | P.13 |
| B1356 | (I.X) | P.14 |
| B1357 | (I.X) | P.15 |
| B1358 | (I.X) | P.16 |
| B1359 | (I.X) | P.17 |
| B1360 | (I.X) | P.18 |
| B1361 | (I.X) | P.19 |
| B1362 | (I.X) | P.20 |
| B1363 | (I.X) | P.21 |
| B1364 | (I.X) | P.22 |
| B1365 | (I.X) | P.23 |
| B1366 | (I.X) | P.24 |
| B1367 | (I.X) | P.25 |
| B1368 | (I.X) | P.26 |
| B1369 | (I.X) | P.27 |
| B1370 | (I.X) | P.28 |
| B1371 | (I.X) | P.29 |
| B1372 | (I.X) | P.30 |
| B1373 | (I.X) | P.31 |
| B1374 | (I.X) | P.32 |
| B1375 | (I.X) | P.33 |
| B1376 | (I.X) | P.34 |
| B1377 | (I.X) | P.35 |
| B1378 | (I.X) | P.36 |
| B1379 | (I.X) | P.37 |
| B1380 | (I.X) | P.38 |
| B1381 | (I.X) | P.39 |
| B1382 | (I.X) | P.40 |
| B1383 | (I.X) | P.41 |
| B1384 | (I.X) | P.42 |
| B1385 | (I.X) | P.43 |
| B1386 | (I.X) | P.44 |
| B1387 | (I.X) | P.45 |
| B1388 | (I.X) | P.46 |
| B1389 | (I.X) | P.47 |
| B1390 | (I.X) | P.48 |
| B1391 | (I.X) | P.49 |
| B1392 | (I.X) | P.50 |
| B1393 | (I.X) | P.51 |
| B1394 | (I.X) | P.52 |
| B1395 | (I.X) | P.53 |
| B1396 | (I.X) | P.54 |
| B1397 | (I.X) | P.55 |
| B1398 | (I.X) | P.56 |
| B1399 | (I.X) | P.57 |
| B1400 | (I.X) | P.58 |
| B1401 | (I.X) | P.59 |
| B1402 | (I.X) | P.60 |
| B1403 | (I.X) | P.61 |

B = Mixture;
I = compound I;
II = compound II

TABLE 24

| B | I | II |
|---|---|---|
| B1404 | (I.Y) | P.1 |
| B1405 | (I.Y) | P.2 |
| B1406 | (I.Y) | P.3 |
| B1407 | (I.Y) | P.4 |
| B1408 | (I.Y) | P.5 |
| B1409 | (I.Y) | P.6 |
| B1410 | (I.Y) | P.7 |
| B1411 | (I.Y) | P.8 |
| B1412 | (I.Y) | P.9 |
| B1413 | (I.Y) | P.10 |
| B1414 | (I.Y) | P.11 |
| B1415 | (I.Y) | P.12 |
| B1416 | (I.Y) | P.13 |
| B1417 | (I.Y) | P.14 |
| B1418 | (I.Y) | P.15 |
| B1419 | (I.Y) | P.16 |
| B1420 | (I.Y) | P.17 |
| B1421 | (I.Y) | P.18 |
| B1422 | (I.Y) | P.19 |
| B1423 | (I.Y) | P.20 |
| B1424 | (I.Y) | P.21 |
| B1425 | (I.Y) | P.22 |
| B1426 | (I.Y) | P.23 |
| B1427 | (I.Y) | P.24 |
| B1428 | (I.Y) | P.25 |
| B1429 | (I.Y) | P.26 |
| B1430 | (I.Y) | P.27 |
| B1431 | (I.Y) | P.28 |
| B1432 | (I.Y) | P.29 |
| B1433 | (I.Y) | P.30 |
| B1434 | (I.Y) | P.31 |
| B1435 | (I.Y) | P.32 |
| B1436 | (I.Y) | P.33 |
| B1437 | (I.Y) | P.34 |
| B1438 | (I.Y) | P.35 |
| B1439 | (I.Y) | P.36 |
| B1440 | (I.Y) | P.37 |
| B1441 | (I.Y) | P.38 |
| B1442 | (I.Y) | P.39 |
| B1443 | (I.Y) | P.40 |
| B1444 | (I.Y) | P.41 |
| B1445 | (I.Y) | P.42 |
| B1446 | (I.Y) | P.43 |
| B1447 | (I.Y) | P.44 |
| B1448 | (I.Y) | P.45 |
| B1449 | (I.Y) | P.46 |
| B1450 | (I.Y) | P.47 |
| B1451 | (I.Y) | P.48 |
| B1452 | (I.Y) | P.49 |
| B1453 | (I.Y) | P.50 |
| B1454 | (I.Y) | P.51 |
| B1455 | (I.Y) | P.52 |
| B1456 | (I.Y) | P.53 |
| B1457 | (I.Y) | P.54 |
| B1458 | (I.Y) | P.55 |
| B1459 | (I.Y) | P.56 |
| B1460 | (I.Y) | P.57 |
| B1461 | (I.Y) | P.58 |
| B1462 | (I.Y) | P.59 |
| B1463 | (I.Y) | P.60 |
| B1464 | (I.Y) | P.61 |

B = Mixture;
I = compound I;
II = compound II

TABLE 25

| B | I | II |
|---|---|---|
| B1465 | (I.Z) | P.1 |
| B1466 | (I.Z) | P.2 |
| B1467 | (I.Z) | P.3 |
| B1468 | (I.Z) | P.4 |
| B1469 | (I.Z) | P.5 |
| B1470 | (I.Z) | P.6 |
| B1471 | (I.Z) | P.7 |
| B1472 | (I.Z) | P.8 |
| B1473 | (I.Z) | P.9 |
| B1474 | (I.Z) | P.10 |
| B1475 | (I.Z) | P.11 |
| B1476 | (I.Z) | P.12 |
| B1477 | (I.Z) | P.13 |
| B1478 | (I.Z) | P.14 |
| B1479 | (I.Z) | P.15 |
| B1480 | (I.Z) | P.16 |
| B1481 | (I.Z) | P.17 |
| B1482 | (I.Z) | P.18 |
| B1483 | (I.Z) | P.19 |
| B1484 | (I.Z) | P.20 |
| B1485 | (I.Z) | P.21 |
| B1486 | (I.Z) | P.22 |
| B1487 | (I.Z) | P.23 |
| B1488 | (I.Z) | P.24 |
| B1489 | (I.Z) | P.25 |
| B1490 | (I.Z) | P.26 |
| B1491 | (I.Z) | P.27 |
| B1492 | (I.Z) | P.28 |
| B1493 | (I.Z) | P.29 |
| B1494 | (I.Z) | P.30 |
| B1495 | (I.Z) | P.31 |
| B1496 | (I.Z) | P.32 |
| B1497 | (I.Z) | P.33 |
| B1498 | (I.Z) | P.34 |
| B1499 | (I.Z) | P.35 |
| B1500 | (I.Z) | P.36 |
| B1501 | (I.Z) | P.37 |
| B1502 | (I.Z) | P.38 |
| B1503 | (I.Z) | P.39 |
| B1504 | (I.Z) | P.40 |
| B1505 | (I.Z) | P.41 |
| B1506 | (I.Z) | P.42 |
| B1507 | (I.Z) | P.43 |
| B1508 | (I.Z) | P.44 |
| B1509 | (I.Z) | P.45 |
| B1510 | (I.Z) | P.46 |
| B1511 | (I.Z) | P.47 |
| B1512 | (I.Z) | P.48 |
| B1513 | (I.Z) | P.49 |
| B1514 | (I.Z) | P.50 |
| B1515 | (I.Z) | P.51 |
| B1516 | (I.Z) | P.52 |
| B1517 | (I.Z) | P.53 |
| B1518 | (I.Z) | P.54 |
| B1519 | (I.Z) | P.55 |
| B1520 | (I.Z) | P.56 |
| B1521 | (I.Z) | P.57 |
| B1522 | (I.Z) | P.58 |
| B1523 | (I.Z) | P.59 |
| B1524 | (I.Z) | P.60 |
| B1525 | (I.Z) | P.61 |

B = Mixture;
I = compound I;
II = compound II

TABLE 26

| B | I | II |
|---|---|---|
| B1526 | (I.AA) | P.1 |
| B1527 | (I.AA) | P.2 |
| B1528 | (I.AA) | P.3 |
| B1529 | (I.AA) | P.4 |
| B1530 | (I.AA) | P.5 |
| B1531 | (I.AA) | P.6 |
| B1532 | (I.AA) | P.7 |
| B1533 | (I.AA) | P.8 |
| B1534 | (I.AA) | P.9 |
| B1535 | (I.AA) | P.10 |
| B1536 | (I.AA) | P.11 |
| B1537 | (I.AA) | P.12 |

TABLE 26-continued

| B | I | II |
|---|---|---|
| B1538 | (I.AA) | P.13 |
| B1539 | (I.AA) | P.14 |
| B1540 | (I.AA) | P.15 |
| B1541 | (I.AA) | P.16 |
| B1542 | (I.AA) | P.17 |
| B1543 | (I.AA) | P.18 |
| B1544 | (I.AA) | P.19 |
| B1545 | (I.AA) | P.20 |
| B1546 | (I.AA) | P.21 |
| B1547 | (I.AA) | P.22 |
| B1548 | (I.AA) | P.23 |
| B1549 | (I.AA) | P.24 |
| B1550 | (I.AA) | P.25 |
| B1551 | (I.AA) | P.26 |
| B1552 | (I.AA) | P.27 |
| B1553 | (I.AA) | P.28 |
| B1554 | (I.AA) | P.29 |
| B1555 | (I.AA) | P.30 |
| B1556 | (I.AA) | P.31 |
| B1557 | (I.AA) | P.32 |
| B1558 | (I.AA) | P.33 |
| B1559 | (I.AA) | P.34 |
| B1560 | (I.AA) | P.35 |
| B1561 | (I.AA) | P.36 |
| B1562 | (I.AA) | P.37 |
| B1563 | (I.AA) | P.38 |
| B1564 | (I.AA) | P.39 |
| B1565 | (I.AA) | P.40 |
| B1566 | (I.AA) | P.41 |
| B1567 | (I.AA) | P.42 |
| B1568 | (I.AA) | P.43 |
| B1569 | (I.AA) | P.44 |
| B1570 | (I.AA) | P.45 |
| B1571 | (I.AA) | P.46 |
| B1572 | (I.AA) | P.47 |
| B1573 | (I.AA) | P.48 |
| B1574 | (I.AA) | P.49 |
| B1575 | (I.AA) | P.50 |
| B1576 | (I.AA) | P.51 |
| B1577 | (I.AA) | P.52 |
| B1578 | (I.AA) | P.53 |
| B1579 | (I.AA) | P.54 |
| B1580 | (I.AA) | P.55 |
| B1581 | (I.AA) | P.56 |
| B1582 | (I.AA) | P.57 |
| B1583 | (I.AA) | P.58 |
| B1584 | (I.AA) | P.59 |
| B1585 | (I.AA) | P.60 |
| B1586 | (I.AA) | P.61 |

B = Mixture;
I = compound I;
II = compound II

TABLE 27

| B | I | II |
|---|---|---|
| B1587 | (I.AB) | P.1 |
| B1588 | (I.AB) | P.2 |
| B1589 | (I.AB) | P.3 |
| B1590 | (I.AB) | P.4 |
| B1591 | (I.AB) | P.5 |
| B1592 | (I.AB) | P.6 |
| B1593 | (I.AB) | P.7 |
| B1594 | (I.AB) | P.8 |
| B1595 | (I.AB) | P.9 |
| B1596 | (I.AB) | P.10 |
| B1597 | (I.AB) | P.11 |
| B1598 | (I.AB) | P.12 |
| B1599 | (I.AB) | P.13 |
| B1600 | (I.AB) | P.14 |
| B1601 | (I.AB) | P.15 |
| B1602 | (I.AB) | P.16 |
| B1603 | (I.AB) | P.17 |
| B1604 | (I.AB) | P.18 |
| B1605 | (I.AB) | P.19 |
| B1606 | (I.AB) | P.20 |
| B1607 | (I.AB) | P.21 |
| B1608 | (I.AB) | P.22 |
| B1609 | (I.AB) | P.23 |
| B1610 | (I.AB) | P.24 |
| B1611 | (I.AB) | P.25 |
| B1612 | (I.AB) | P.26 |
| B1613 | (I.AB) | P.27 |
| B1614 | (I.AB) | P.28 |
| B1615 | (I.AB) | P.29 |
| B1616 | (I.AB) | P.30 |
| B1617 | (I.AB) | P.31 |
| B1618 | (I.AB) | P.32 |
| B1619 | (I.AB) | P.33 |
| B1620 | (I.AB) | P.34 |
| B1621 | (I.AB) | P.35 |
| B1622 | (I.AB) | P.36 |
| B1623 | (I.AB) | P.37 |
| B1624 | (I.AB) | P.38 |
| B1625 | (I.AB) | P.39 |
| B1626 | (I.AB) | P.40 |
| B1627 | (I.AB) | P.41 |
| B1628 | (I.AB) | P.42 |
| B1629 | (I.AB) | P.43 |
| B1630 | (I.AB) | P.44 |
| B1631 | (I.AB) | P.45 |
| B1632 | (I.AB) | P.46 |
| B1633 | (I.AB) | P.47 |
| B1634 | (I.AB) | P.48 |
| B1635 | (I.AB) | P.49 |
| B1636 | (I.AB) | P.50 |
| B1637 | (I.AB) | P.51 |
| B1638 | (I.AB) | P.52 |
| B1639 | (I.AB) | P.53 |
| B1640 | (I.AB) | P.54 |
| B1641 | (I.AB) | P.55 |
| B1642 | (I.AB) | P.56 |
| B1643 | (I.AB) | P.57 |
| B1644 | (I.AB) | P.58 |
| B1645 | (I.AB) | P.59 |
| B1646 | (I.AB) | P.60 |
| B1647 | (I.AB) | P.61 |

B = Mixture;
I = compound I;
II = compound II

TABLE 28

| B | I | II |
|---|---|---|
| B1648 | (I.AC) | P.1 |
| B1649 | (I.AC) | P.2 |
| B1650 | (I.AC) | P.3 |
| B1651 | (I.AC) | P.4 |
| B1652 | (I.AC) | P.5 |
| B1653 | (I.AC) | P.6 |
| B1654 | (I.AC) | P.7 |
| B1655 | (I.AC) | P.8 |
| B1656 | (I.AC) | P.9 |
| B1657 | (I.AC) | P.10 |
| B1658 | (I.AC) | P.11 |
| B1659 | (I.AC) | P.12 |
| B1660 | (I.AC) | P.13 |
| B1661 | (I.AC) | P.14 |
| B1662 | (I.AC) | P.15 |
| B1663 | (I.AC) | P.16 |
| B1664 | (I.AC) | P.17 |
| B1665 | (I.AC) | P.18 |
| B1666 | (I.AC) | P.19 |
| B1667 | (I.AC) | P.20 |
| B1668 | (I.AC) | P.21 |
| B1669 | (I.AC) | P.22 |
| B1670 | (I.AC) | P.23 |
| B1671 | (I.AC) | P.24 |

TABLE 28-continued

| B | I | II |
|---|---|---|
| B1672 | (I.AC) | P.25 |
| B1673 | (I.AC) | P.26 |
| B1674 | (I.AC) | P.27 |
| B1675 | (I.AC) | P.28 |
| B1676 | (I.AC) | P.29 |
| B1677 | (I.AC) | P.30 |
| B1678 | (I.AC) | P.31 |
| B1679 | (I.AC) | P.32 |
| B1680 | (I.AC) | P.33 |
| B1681 | (I.AC) | P.34 |
| B1682 | (I.AC) | P.35 |
| B1683 | (I.AC) | P.36 |
| B1684 | (I.AC) | P.37 |
| B1685 | (I.AC) | P.38 |
| B1686 | (I.AC) | P.39 |
| B1687 | (I.AC) | P.40 |
| B1688 | (I.AC) | P.41 |
| B1689 | (I.AC) | P.42 |
| B1690 | (I.AC) | P.43 |
| B1691 | (I.AC) | P.44 |
| B1692 | (I.AC) | P.45 |
| B1693 | (I.AC) | P.46 |
| B1694 | (I.AC) | P.47 |
| B1695 | (I.AC) | P.48 |
| B1696 | (I.AC) | P.49 |
| B1697 | (I.AC) | P.50 |
| B1698 | (I.AC) | P.51 |
| B1699 | (I.AC) | P.52 |
| B1700 | (I.AC) | P.53 |
| B1701 | (I.AC) | P.54 |
| B1702 | (I.AC) | P.55 |
| B1703 | (I.AC) | P.56 |
| B1704 | (I.AC) | P.57 |
| B1705 | (I.AC) | P.58 |
| B1706 | (I.AC) | P.59 |
| B1707 | (I.AC) | P.60 |
| B1708 | (I.AC) | P.61 |

B = Mixture;
I = compound I;
II = compound II

TABLE 29

| B | I | II |
|---|---|---|
| B1709 | (I.AD) | P.1 |
| B1710 | (I.AD) | P.2 |
| B1711 | (I.AD) | P.3 |
| B1712 | (I.AD) | P.4 |
| B1713 | (I.AD) | P.5 |
| B1714 | (I.AD) | P.6 |
| B1715 | (I.AD) | P.7 |
| B1716 | (I.AD) | P.8 |
| B1717 | (I.AD) | P.9 |
| B1718 | (I.AD) | P.10 |
| B1719 | (I.AD) | P.11 |
| B1720 | (I.AD) | P.12 |
| B1721 | (I.AD) | P.13 |
| B1722 | (I.AD) | P.14 |
| B1723 | (I.AD) | P.15 |
| B1724 | (I.AD) | P.16 |
| B1725 | (I.AD) | P.17 |
| B1726 | (I.AD) | P.18 |
| B1727 | (I.AD) | P.19 |
| B1728 | (I.AD) | P.20 |
| B1729 | (I.AD) | P.21 |
| B1730 | (I.AD) | P.22 |
| B1731 | (I.AD) | P.23 |
| B1732 | (I.AD) | P.24 |
| B1733 | (I.AD) | P.25 |
| B1734 | (I.AD) | P.26 |
| B1735 | (I.AD) | P.27 |
| B1736 | (I.AD) | P.28 |
| B1737 | (I.AD) | P.29 |
| B1738 | (I.AD) | P.30 |

TABLE 29-continued

| B | I | II |
|---|---|---|
| B1739 | (I.AD) | P.31 |
| B1740 | (I.AD) | P.32 |
| B1741 | (I.AD) | P.33 |
| B1742 | (I.AD) | P.34 |
| B1743 | (I.AD) | P.35 |
| B1744 | (I.AD) | P.36 |
| B1745 | (I.AD) | P.37 |
| B1746 | (I.AD) | P.38 |
| B1747 | (I.AD) | P.39 |
| B1748 | (I.AD) | P.40 |
| B1749 | (I.AD) | P.41 |
| B1750 | (I.AD) | P.42 |
| B1751 | (I.AD) | P.43 |
| B1752 | (I.AD) | P.44 |
| B1753 | (I.AD) | P.45 |
| B1754 | (I.AD) | P.46 |
| B1755 | (I.AD) | P.47 |
| B1756 | (I.AD) | P.48 |
| B1757 | (I.AD) | P.49 |
| B1758 | (I.AD) | P.50 |
| B1759 | (I.AD) | P.51 |
| B1760 | (I.AD) | P.52 |
| B1761 | (I.AD) | P.53 |
| B1762 | (I.AD) | P.54 |
| B1763 | (I.AD) | P.55 |
| B1764 | (I.AD) | P.56 |
| B1765 | (I.AD) | P.57 |
| B1766 | (I.AD) | P.58 |
| B1767 | (I.AD) | P.59 |
| B1768 | (I.AD) | P.60 |
| B1769 | (I.AD) | P.61 |

B = Mixture;
I = compound I;
II = compound II

TABLE 30

| B | I | II |
|---|---|---|
| B1770 | (I.AE) | P.1 |
| B1771 | (I.AE) | P.2 |
| B1772 | (I.AE) | P.3 |
| B1773 | (I.AE) | P.4 |
| B1774 | (I.AE) | P.5 |
| B1775 | (I.AE) | P.6 |
| B1776 | (I.AE) | P.7 |
| B1777 | (I.AE) | P.8 |
| B1778 | (I.AE) | P.9 |
| B1779 | (I.AE) | P.10 |
| B1780 | (I.AE) | P.11 |
| B1781 | (I.AE) | P.12 |
| B1782 | (I.AE) | P.13 |
| B1783 | (I.AE) | P.14 |
| B1784 | (I.AE) | P.15 |
| B1785 | (I.AE) | P.16 |
| B1786 | (I.AE) | P.17 |
| B1787 | (I.AE) | P.18 |
| B1788 | (I.AE) | P.19 |
| B1789 | (I.AE) | P.20 |
| B1790 | (I.AE) | P.21 |
| B1791 | (I.AE) | P.22 |
| B1792 | (I.AE) | P.23 |
| B1793 | (I.AE) | P.24 |
| B1794 | (I.AE) | P.25 |
| B1795 | (I.AE) | P.26 |
| B1796 | (I.AE) | P.27 |
| B1797 | (I.AE) | P.28 |
| B1798 | (I.AE) | P.29 |
| B1799 | (I.AE) | P.30 |
| B1800 | (I.AE) | P.31 |
| B1801 | (I.AE) | P.32 |
| B1802 | (I.AE) | P.33 |
| B1803 | (I.AE) | P.34 |
| B1804 | (I.AE) | P.35 |
| B1805 | (I.AE) | P.36 |

TABLE 30-continued

| B | I | II |
|---|---|---|
| B1806 | (I.AE) | P.37 |
| B1807 | (I.AE) | P.38 |
| B1808 | (I.AE) | P.39 |
| B1809 | (I.AE) | P.40 |
| B1810 | (I.AE) | P.41 |
| B1811 | (I.AE) | P.42 |
| B1812 | (I.AE) | P.43 |
| B1813 | (I.AE) | P.44 |
| B1814 | (I.AE) | P.45 |
| B1815 | (I.AE) | P.46 |
| B1816 | (I.AE) | P.47 |
| B1817 | (I.AE) | P.48 |
| B1818 | (I.AE) | P.49 |
| B1819 | (I.AE) | P.50 |
| B1820 | (I.AE) | P.51 |
| B1821 | (I.AE) | P.52 |
| B1822 | (I.AE) | P.53 |
| B1823 | (I.AE) | P.54 |
| B1824 | (I.AE) | P.55 |
| B1825 | (I.AE) | P.56 |
| B1826 | (I.AE) | P.57 |
| B1827 | (I.AE) | P.58 |
| B1828 | (I.AE) | P.59 |
| B1829 | (I.AE) | P.60 |
| B1830 | (I.AE) | P.61 |

B = Mixture;
I = compound I;
II = compound II

TABLE 31

| B | I | II |
|---|---|---|
| B1831 | (I.AF) | P.1 |
| B1832 | (I.AF) | P.2 |
| B1833 | (I.AF) | P.3 |
| B1834 | (I.AF) | P.4 |
| B1835 | (I.AF) | P.5 |
| B1836 | (I.AF) | P.6 |
| B1837 | (I.AF) | P.7 |
| B1838 | (I.AF) | P.8 |
| B1839 | (I.AF) | P.9 |
| B1840 | (I.AF) | P.10 |
| B1841 | (I.AF) | P.11 |
| B1842 | (I.AF) | P.12 |
| B1843 | (I.AF) | P.13 |
| B1844 | (I.AF) | P.14 |
| B1845 | (I.AF) | P.15 |
| B1846 | (I.AF) | P.16 |
| B1847 | (I.AF) | P.17 |
| B1848 | (I.AF) | P.18 |
| B1849 | (I.AF) | P.19 |
| B1850 | (I.AF) | P.20 |
| B1851 | (I.AF) | P.21 |
| B1852 | (I.AF) | P.22 |
| B1853 | (I.AF) | P.23 |
| B1854 | (I.AF) | P.24 |
| B1855 | (I.AF) | P.25 |
| B1856 | (I.AF) | P.26 |
| B1857 | (I.AF) | P.27 |
| B1858 | (I.AF) | P.28 |
| B1859 | (I.AF) | P.29 |
| B1860 | (I.AF) | P.30 |
| B1861 | (I.AF) | P.31 |
| B1862 | (I.AF) | P.32 |
| B1863 | (I.AF) | P.33 |
| B1864 | (I.AF) | P.34 |
| B1865 | (I.AF) | P.35 |
| B1866 | (I.AF) | P.36 |
| B1867 | (I.AF) | P.37 |
| B1868 | (I.AF) | P.38 |
| B1869 | (I.AF) | P.39 |
| B1870 | (I.AF) | P.40 |
| B1871 | (I.AF) | P.41 |
| B1872 | (I.AF) | P.42 |

TABLE 31-continued

| B | I | II |
|---|---|---|
| B1873 | (I.AF) | P.43 |
| B1874 | (I.AF) | P.44 |
| B1875 | (I.AF) | P.45 |
| B1876 | (I.AF) | P.46 |
| B1877 | (I.AF) | P.47 |
| B1878 | (I.AF) | P.48 |
| B1879 | (I.AF) | P.49 |
| B1880 | (I.AF) | P.50 |
| B1881 | (I.AF) | P.51 |
| B1882 | (I.AF) | P.52 |
| B1883 | (I.AF) | P.53 |
| B1884 | (I.AF) | P.54 |
| B1885 | (I.AF) | P.55 |
| B1886 | (I.AF) | P.56 |
| B1887 | (I.AF) | P.57 |
| B1888 | (I.AF) | P.58 |
| B1889 | (I.AF) | P.59 |
| B1890 | (I.AF) | P.60 |
| B1891 | (I.AF) | P.61 |

B = Mixture;
I = compound I;
II = compound II

TABLE 32

| B | I | II |
|---|---|---|
| B1892 | (I.AG) | P.1 |
| B1893 | (I.AG) | P.2 |
| B1894 | (I.AG) | P.3 |
| B1895 | (I.AG) | P.4 |
| B1896 | (I.AG) | P.5 |
| B1897 | (I.AG) | P.6 |
| B1898 | (I.AG) | P.7 |
| B1899 | (I.AG) | P.8 |
| B1900 | (I.AG) | P.9 |
| B1901 | (I.AG) | P.10 |
| B1902 | (I.AG) | P.11 |
| B1903 | (I.AG) | P.12 |
| B1904 | (I.AG) | P.13 |
| B1905 | (I.AG) | P.14 |
| B1906 | (I.AG) | P.15 |
| B1907 | (I.AG) | P.16 |
| B1908 | (I.AG) | P.17 |
| B1909 | (I.AG) | P.18 |
| B1910 | (I.AG) | P.19 |
| B1911 | (I.AG) | P.20 |
| B1912 | (I.AG) | P.21 |
| B1913 | (I.AG) | P.22 |
| B1914 | (I.AG) | P.23 |
| B1915 | (I.AG) | P.24 |
| B1916 | (I.AG) | P.25 |
| B1917 | (I.AG) | P.26 |
| B1918 | (I.AG) | P.27 |
| B1919 | (I.AG) | P.28 |
| B1920 | (I.AG) | P.29 |
| B1921 | (I.AG) | P.30 |
| B1922 | (I.AG) | P.31 |
| B1923 | (I.AG) | P.32 |
| B1924 | (I.AG) | P.33 |
| B1925 | (I.AG) | P.34 |
| B1926 | (I.AG) | P.35 |
| B1927 | (I.AG) | P.36 |
| B1928 | (I.AG) | P.37 |
| B1929 | (I.AG) | P.38 |
| B1930 | (I.AG) | P.39 |
| B1931 | (I.AG) | P.40 |
| B1932 | (I.AG) | P.41 |
| B1933 | (I.AG) | P.42 |
| B1934 | (I.AG) | P.43 |
| B1935 | (I.AG) | P.44 |
| B1936 | (I.AG) | P.45 |
| B1937 | (I.AG) | P.46 |
| B1938 | (I.AG) | P.47 |
| B1939 | (I.AG) | P.48 |

TABLE 32-continued

| B | I | II |
|---|---|---|
| B1940 | (I.AG) | P.49 |
| B1941 | (I.AG) | P.50 |
| B1942 | (I.AG) | P.51 |
| B1943 | (I.AG) | P.52 |
| B1944 | (I.AG) | P.53 |
| B1945 | (I.AG) | P.54 |
| B1946 | (I.AG) | P.55 |
| B1947 | (I.AG) | P.56 |
| B1948 | (I.AG) | P.57 |
| B1949 | (I.AG) | P.58 |
| B1950 | (I.AG) | P.59 |
| B1951 | (I.AG) | P.60 |
| B1952 | (I.AG) | P.61 |

B = Mixture;
I = compound I;
II = compound II

TABLE 33

| B | I | II |
|---|---|---|
| B1953 | (I.AH) | P.1 |
| B1954 | (I.AH) | P.2 |
| B1955 | (I.AH) | P.3 |
| B1956 | (I.AH) | P.4 |
| B1957 | (I.AH) | P.5 |
| B1958 | (I.AH) | P.6 |
| B1959 | (I.AH) | P.7 |
| B1960 | (I.AH) | P.8 |
| B1961 | (I.AH) | P.9 |
| B1962 | (I.AH) | P.10 |
| B1963 | (I.AH) | P.11 |
| B1964 | (I.AH) | P.12 |
| B1965 | (I.AH) | P.13 |
| B1966 | (I.AH) | P.14 |
| B1967 | (I.AH) | P.15 |
| B1968 | (I.AH) | P.16 |
| B1969 | (I.AH) | P.17 |
| B1970 | (I.AH) | P.18 |
| B1971 | (I.AH) | P.19 |
| B1972 | (I.AH) | P.20 |
| B1973 | (I.AH) | P.21 |
| B1974 | (I.AH) | P.22 |
| B1975 | (I.AH) | P.23 |
| B1976 | (I.AH) | P.24 |
| B1977 | (I.AH) | P.25 |
| B1978 | (I.AH) | P.26 |
| B1979 | (I.AH) | P.27 |
| B1980 | (I.AH) | P.28 |
| B1981 | (I.AH) | P.29 |
| B1982 | (I.AH) | P.30 |
| B1983 | (I.AH) | P.31 |
| B1984 | (I.AH) | P.32 |
| B1985 | (I.AH) | P.33 |
| B1986 | (I.AH) | P.34 |
| B1987 | (I.AH) | P.35 |
| B1988 | (I.AH) | P.36 |
| B1989 | (I.AH) | P.37 |
| B1990 | (I.AH) | P.38 |
| B1991 | (I.AH) | P.39 |
| B1992 | (I.AH) | P.40 |
| B1993 | (I.AH) | P.41 |
| B1994 | (I.AH) | P.42 |
| B1995 | (I.AH) | P.43 |
| B1996 | (I.AH) | P.44 |
| B1997 | (I.AH) | P.45 |
| B1998 | (I.AH) | P.46 |
| B1999 | (I.AH) | P.47 |
| B2000 | (I.AH) | P.48 |
| B2001 | (I.AH) | P.49 |
| B2002 | (I.AH) | P.50 |
| B2003 | (I.AH) | P.51 |
| B2004 | (I.AH) | P.52 |
| B2005 | (I.AH) | P.53 |
| B2006 | (I.AH) | P.54 |
| B2007 | (I.AH) | P.55 |
| B2008 | (I.AH) | P.56 |
| B2009 | (I.AH) | P.57 |
| B2010 | (I.AH) | P.58 |
| B2011 | (I.AH) | P.59 |
| B2012 | (I.AH) | P.60 |
| B2013 | (I.AH) | P.61 |

B = Mixture;
I = compound I;
II = compound II

TABLE 34

| B | I | II |
|---|---|---|
| B2014 | (I.AI) | P.1 |
| B2015 | (I.AI) | P.2 |
| B2016 | (I.AI) | P.3 |
| B2017 | (I.AI) | P.4 |
| B2018 | (I.AI) | P.5 |
| B2019 | (I.AI) | P.6 |
| B2020 | (I.AI) | P.7 |
| B2021 | (I.AI) | P.8 |
| B2022 | (I.AI) | P.9 |
| B2023 | (I.AI) | P.10 |
| B2024 | (I.AI) | P.11 |
| B2025 | (I.AI) | P.12 |
| B2026 | (I.AI) | P.13 |
| B2027 | (I.AI) | P.14 |
| B2028 | (I.AI) | P.15 |
| B2029 | (I.AI) | P.16 |
| B2030 | (I.AI) | P.17 |
| B2031 | (I.AI) | P.18 |
| B2032 | (I.AI) | P.19 |
| B2033 | (I.AI) | P.20 |
| B2034 | (I.AI) | P.21 |
| B2035 | (I.AI) | P.22 |
| B2036 | (I.AI) | P.23 |
| B2037 | (I.AI) | P.24 |
| B2038 | (I.AI) | P.25 |
| B2039 | (I.AI) | P.26 |
| B2040 | (I.AI) | P.27 |
| B2041 | (I.AI) | P.28 |
| B2042 | (I.AI) | P.29 |
| B2043 | (I.AI) | P.30 |
| B2044 | (I.AI) | P.31 |
| B2045 | (I.AI) | P.32 |
| B2046 | (I.AI) | P.33 |
| B2047 | (I.AI) | P.34 |
| B2048 | (I.AI) | P.35 |
| B2049 | (I.AI) | P.36 |
| B2050 | (I.AI) | P.37 |
| B2051 | (I.AI) | P.38 |
| B2052 | (I.AI) | P.39 |
| B2053 | (I.AI) | P.40 |
| B2054 | (I.AI) | P.41 |
| B2055 | (I.AI) | P.42 |
| B2056 | (I.AI) | P.43 |
| B2057 | (I.AI) | P.44 |
| B2058 | (I.AI) | P.45 |
| B2059 | (I.AI) | P.46 |
| B2060 | (I.AI) | P.47 |
| B2061 | (I.AI) | P.48 |
| B2062 | (I.AI) | P.49 |
| B2063 | (I.AI) | P.50 |
| B2064 | (I.AI) | P.51 |
| B2065 | (I.AI) | P.52 |
| B2066 | (I.AI) | P.53 |
| B2067 | (I.AI) | P.54 |
| B2068 | (I.AI) | P.55 |
| B2069 | (I.AI) | P.56 |
| B2070 | (I.AI) | P.57 |
| B2071 | (I.AI) | P.58 |
| B2072 | (I.AI) | P.59 |

TABLE 34-continued

| B | I | II |
|---|---|---|
| B2073 | (I.AI) | P.60 |
| B2074 | (I.AI) | P.61 |

B = Mixture;
I = compound I;
II = compound II

TABLE 35

| B | I | II |
|---|---|---|
| B2075 | (I.AJ) | P.1 |
| B2076 | (I.AJ) | P.2 |
| B2077 | (I.AJ) | P.3 |
| B2078 | (I.AJ) | P.4 |
| B2079 | (I.AJ) | P.5 |
| B2080 | (I.AJ) | P.6 |
| B2081 | (I.AJ) | P.7 |
| B2082 | (I.AJ) | P.8 |
| B2083 | (I.AJ) | P.9 |
| B2084 | (I.AJ) | P.10 |
| B2085 | (I.AJ) | P.11 |
| B2086 | (I.AJ) | P.12 |
| B2087 | (I.AJ) | P.13 |
| B2088 | (I.AJ) | P.14 |
| B2089 | (I.AJ) | P.15 |
| B2090 | (I.AJ) | P.16 |
| B2091 | (I.AJ) | P.17 |
| B2092 | (I.AJ) | P.18 |
| B2093 | (I.AJ) | P.19 |
| B2094 | (I.AJ) | P.20 |
| B2095 | (I.AJ) | P.21 |
| B2096 | (I.AJ) | P.22 |
| B2097 | (I.AJ) | P.23 |
| B2098 | (I.AJ) | P.24 |
| B2099 | (I.AJ) | P.25 |
| B2100 | (I.AJ) | P.26 |
| B2101 | (I.AJ) | P.27 |
| B2102 | (I.AJ) | P.28 |
| B2103 | (I.AJ) | P.29 |
| B2104 | (I.AJ) | P.30 |
| B2105 | (I.AJ) | P.31 |
| B2106 | (I.AJ) | P.32 |
| B2107 | (I.AJ) | P.33 |
| B2108 | (I.AJ) | P.34 |
| B2109 | (I.AJ) | P.35 |
| B2110 | (I.AJ) | P.36 |
| B2111 | (I.AJ) | P.37 |
| B2112 | (I.AJ) | P.38 |
| B2113 | (I.AJ) | P.39 |
| B2114 | (I.AJ) | P.40 |
| B2115 | (I.AJ) | P.41 |
| B2116 | (I.AJ) | P.42 |
| B2117 | (I.AJ) | P.43 |
| B2118 | (I.AJ) | P.44 |
| B2119 | (I.AJ) | P.45 |
| B2120 | (I.AJ) | P.46 |
| B2121 | (I.AJ) | P.47 |
| B2122 | (I.AJ) | P.48 |
| B2123 | (I.AJ) | P.49 |
| B2124 | (I.AJ) | P.50 |
| B2125 | (I.AJ) | P.51 |
| B2126 | (I.AJ) | P.52 |
| B2127 | (I.AJ) | P.53 |
| B2128 | (I.AJ) | P.54 |
| B2129 | (I.AJ) | P.55 |
| B2130 | (I.AJ) | P.56 |
| B2131 | (I.AJ) | P.57 |
| B2132 | (I.AJ) | P.58 |
| B2133 | (I.AJ) | P.59 |
| B2134 | (I.AJ) | P.60 |
| B2135 | (I.AJ) | P.61 |

B = Mixture;
I = compound I;
II = compound II

TABLE 36

| B | I | II |
|---|---|---|
| B2136 | (I.AK) | P.1 |
| B2137 | (I.AK) | P.2 |
| B2138 | (I.AK) | P.3 |
| B2139 | (I.AK) | P.4 |
| B2140 | (I.AK) | P.5 |
| B2141 | (I.AK) | P.6 |
| B2142 | (I.AK) | P.7 |
| B2143 | (I.AK) | P.8 |
| B2144 | (I.AK) | P.9 |
| B2145 | (I.AK) | P.10 |
| B2146 | (I.AK) | P.11 |
| B2147 | (I.AK) | P.12 |
| B2148 | (I.AK) | P.13 |
| B2149 | (I.AK) | P.14 |
| B2150 | (I.AK) | P.15 |
| B2151 | (I.AK) | P.16 |
| B2152 | (I.AK) | P.17 |
| B2153 | (I.AK) | P.18 |
| B2154 | (I.AK) | P.19 |
| B2155 | (I.AK) | P.20 |
| B2156 | (I.AK) | P.21 |
| B2157 | (I.AK) | P.22 |
| B2158 | (I.AK) | P.23 |
| B2159 | (I.AK) | P.24 |
| B2160 | (I.AK) | P.25 |
| B2161 | (I.AK) | P.26 |
| B2162 | (I.AK) | P.27 |
| B2163 | (I.AK) | P.28 |
| B2164 | (I.AK) | P.29 |
| B2165 | (I.AK) | P.30 |
| B2166 | (I.AK) | P.31 |
| B2167 | (I.AK) | P.32 |
| B2168 | (I.AK) | P.33 |
| B2169 | (I.AK) | P.34 |
| B2170 | (I.AK) | P.35 |
| B2171 | (I.AK) | P.36 |
| B2172 | (I.AK) | P.37 |
| B2173 | (I.AK) | P.38 |
| B2174 | (I.AK) | P.39 |
| B2175 | (I.AK) | P.40 |
| B2176 | (I.AK) | P.41 |
| B2177 | (I.AK) | P.42 |
| B2178 | (I.AK) | P.43 |
| B2179 | (I.AK) | P.44 |
| B2180 | (I.AK) | P.45 |
| B2181 | (I.AK) | P.46 |
| B2182 | (I.AK) | P.47 |
| B2183 | (I.AK) | P.48 |
| B2184 | (I.AK) | P.49 |
| B2185 | (I.AK) | P.50 |
| B2186 | (I.AK) | P.51 |
| B2187 | (I.AK) | P.52 |
| B2188 | (I.AK) | P.53 |
| B2189 | (I.AK) | P.54 |
| B2190 | (I.AK) | P.55 |
| B2191 | (I.AK) | P.56 |
| B2192 | (I.AK) | P.57 |
| B2193 | (I.AK) | P.58 |
| B2194 | (I.AK) | P.59 |
| B2195 | (I.AK) | P.60 |
| B2196 | (I.AK) | P.61 |

B = Mixture;
I = compound I;
II = compound II

TABLE 37

| B | I | II |
|---|---|---|
| B2197 | (I.AL) | P.1 |
| B2198 | (I.AL) | P.2 |
| B2199 | (I.AL) | P.3 |
| B2200 | (I.AL) | P.4 |
| B2201 | (I.AL) | P.5 |
| B2202 | (I.AL) | P.6 |

TABLE 37-continued

| B | I | II |
|---|---|---|
| B2203 | (I.AL) | P.7 |
| B2204 | (I.AL) | P.8 |
| B2205 | (I.AL) | P.9 |
| B2206 | (I.AL) | P.10 |
| B2207 | (I.AL) | P.11 |
| B2208 | (I.AL) | P.12 |
| B2209 | (I.AL) | P.13 |
| B2210 | (I.AL) | P.14 |
| B2211 | (I.AL) | P.15 |
| B2212 | (I.AL) | P.16 |
| B2213 | (I.AL) | P.17 |
| B2214 | (I.AL) | P.18 |
| B2215 | (I.AL) | P.19 |
| B2216 | (I.AL) | P.20 |
| B2217 | (I.AL) | P.21 |
| B2218 | (I.AL) | P.22 |
| B2219 | (I.AL) | P.23 |
| B2220 | (I.AL) | P.24 |
| B2221 | (I.AL) | P.25 |
| B2222 | (I.AL) | P.26 |
| B2223 | (I.AL) | P.27 |
| B2224 | (I.AL) | P.28 |
| B2225 | (I.AL) | P.29 |
| B2226 | (I.AL) | P.30 |
| B2227 | (I.AL) | P.31 |
| B2228 | (I.AL) | P.32 |
| B2229 | (I.AL) | P.33 |
| B2230 | (I.AL) | P.34 |
| B2231 | (I.AL) | P.35 |
| B2232 | (I.AL) | P.36 |
| B2233 | (I.AL) | P.37 |
| B2234 | (I.AL) | P.38 |
| B2235 | (I.AL) | P.39 |
| B2236 | (I.AL) | P.40 |
| B2237 | (I.AL) | P.41 |
| B2238 | (I.AL) | P.42 |
| B2239 | (I.AL) | P.43 |
| B2240 | (I.AL) | P.44 |
| B2241 | (I.AL) | P.45 |
| B2242 | (I.AL) | P.46 |
| B2243 | (I.AL) | P.47 |
| B2244 | (I.AL) | P.48 |
| B2245 | (I.AL) | P.49 |
| B2246 | (I.AL) | P.50 |
| B2247 | (I.AL) | P.51 |
| B2248 | (I.AL) | P.52 |
| B2249 | (I.AL) | P.53 |
| B2250 | (I.AL) | P.54 |
| B2251 | (I.AL) | P.55 |
| B2252 | (I.AL) | P.56 |
| B2253 | (I.AL) | P.57 |
| B2254 | (I.AL) | P.58 |
| B2255 | (I.AL) | P.59 |
| B2256 | (I.AL) | P.60 |
| B2257 | (I.AL) | P.61 |

B = Mixture;
I = compound I;
II = compound II

TABLE 38

| B | I | II |
|---|---|---|
| B2258 | (I.AM) | P.1 |
| B2259 | (I.AM) | P.2 |
| B2260 | (I.AM) | P.3 |
| B2261 | (I.AM) | P.4 |
| B2262 | (I.AM) | P.5 |
| B2263 | (I.AM) | P.6 |
| B2264 | (I.AM) | P.7 |
| B2265 | (I.AM) | P.8 |
| B2266 | (I.AM) | P.9 |
| B2267 | (I.AM) | P.10 |
| B2268 | (I.AM) | P.11 |
| B2269 | (I.AM) | P.12 |

TABLE 38-continued

| B | I | II |
|---|---|---|
| B2270 | (I.AM) | P.13 |
| B2271 | (I.AM) | P.14 |
| B2272 | (I.AM) | P.15 |
| B2273 | (I.AM) | P.16 |
| B2274 | (I.AM) | P.17 |
| B2275 | (I.AM) | P.18 |
| B2276 | (I.AM) | P.19 |
| B2277 | (I.AM) | P.20 |
| B2278 | (I.AM) | P.21 |
| B2279 | (I.AM) | P.22 |
| B2280 | (I.AM) | P.23 |
| B2281 | (I.AM) | P.24 |
| B2282 | (I.AM) | P.25 |
| B2283 | (I.AM) | P.26 |
| B2284 | (I.AM) | P.27 |
| B2285 | (I.AM) | P.28 |
| B2286 | (I.AM) | P.29 |
| B2287 | (I.AM) | P.30 |
| B2288 | (I.AM) | P.31 |
| B2289 | (I.AM) | P.32 |
| B2290 | (I.AM) | P.33 |
| B2291 | (I.AM) | P.34 |
| B2292 | (I.AM) | P.35 |
| B2293 | (I.AM) | P.36 |
| B2294 | (I.AM) | P.37 |
| B2295 | (I.AM) | P.38 |
| B2296 | (I.AM) | P.39 |
| B2297 | (I.AM) | P.40 |
| B2298 | (I.AM) | P.41 |
| B2299 | (I.AM) | P.42 |
| B2300 | (I.AM) | P.43 |
| B2301 | (I.AM) | P.44 |
| B2302 | (I.AM) | P.45 |
| B2303 | (I.AM) | P.46 |
| B2304 | (I.AM) | P.47 |
| B2305 | (I.AM) | P.48 |
| B2306 | (I.AM) | P.49 |
| B2307 | (I.AM) | P.50 |
| B2308 | (I.AM) | P.51 |
| B2309 | (I.AM) | P.52 |
| B2310 | (I.AM) | P.53 |
| B2311 | (I.AM) | P.54 |
| B2312 | (I.AM) | P.55 |
| B2313 | (I.AM) | P.56 |
| B2314 | (I.AM) | P.57 |
| B2315 | (I.AM) | P.58 |
| B2316 | (I.AM) | P.59 |
| B2317 | (I.AM) | P.60 |
| B2318 | (I.AM) | P.61 |

B = Mixture;
I = compound I;
II = compound II

TABLE 39

| B | I | II |
|---|---|---|
| B2319 | (I.AN) | P.1 |
| B2320 | (I.AN) | P.2 |
| B2321 | (I.AN) | P.3 |
| B2322 | (I.AN) | P.4 |
| B2323 | (I.AN) | P.5 |
| B2324 | (I.AN) | P.6 |
| B2325 | (I.AN) | P.7 |
| B2326 | (I.AN) | P.8 |
| B2327 | (I.AN) | P.9 |
| B2328 | (I.AN) | P.10 |
| B2329 | (I.AN) | P.11 |
| B2330 | (I.AN) | P.12 |
| B2331 | (I.AN) | P.13 |
| B2332 | (I.AN) | P.14 |
| B2333 | (I.AN) | P.15 |
| B2334 | (I.AN) | P.16 |
| B2335 | (I.AN) | P.17 |
| B2336 | (I.AN) | P.18 |

TABLE 39-continued

| B | I | II |
|---|---|---|
| B2337 | (I.AN) | P.19 |
| B2338 | (I.AN) | P.20 |
| B2339 | (I.AN) | P.21 |
| B2340 | (I.AN) | P.22 |
| B2341 | (I.AN) | P.23 |
| B2342 | (I.AN) | P.24 |
| B2343 | (I.AN) | P.25 |
| B2344 | (I.AN) | P.26 |
| B2345 | (I.AN) | P.27 |
| B2346 | (I.AN) | P.28 |
| B2347 | (I.AN) | P.29 |
| B2348 | (I.AN) | P.30 |
| B2349 | (I.AN) | P.31 |
| B2350 | (I.AN) | P.32 |
| B2351 | (I.AN) | P.33 |
| B2352 | (I.AN) | P.34 |
| B2353 | (I.AN) | P.35 |
| B2354 | (I.AN) | P.36 |
| B2355 | (I.AN) | P.37 |
| B2356 | (I.AN) | P.38 |
| B2357 | (I.AN) | P.39 |
| B2358 | (I.AN) | P.40 |
| B2359 | (I.AN) | P.41 |
| B2360 | (I.AN) | P.42 |
| B2361 | (I.AN) | P.43 |
| B2362 | (I.AN) | P.44 |
| B2363 | (I.AN) | P.45 |
| B2364 | (I.AN) | P.46 |
| B2365 | (I.AN) | P.47 |
| B2366 | (I.AN) | P.48 |
| B2367 | (I.AN) | P.49 |
| B2368 | (I.AN) | P.50 |
| B2369 | (I.AN) | P.51 |
| B2370 | (I.AN) | P.52 |
| B2371 | (I.AN) | P.53 |
| B2372 | (I.AN) | P.54 |
| B2373 | (I.AN) | P.55 |
| B2374 | (I.AN) | P.56 |
| B2375 | (I.AN) | P.57 |
| B2376 | (I.AN) | P.58 |
| B2377 | (I.AN) | P.59 |
| B2378 | (I.AN) | P.60 |
| B2379 | (I.AN) | P.61 |

B = Mixture;
I = compound I;
II = compound II

TABLE 40

| B | I | II |
|---|---|---|
| B2380 | (I.AO) | P.1 |
| B2381 | (I.AO) | P.2 |
| B2382 | (I.AO) | P.3 |
| B2383 | (I.AO) | P.4 |
| B2384 | (I.AO) | P.5 |
| B2385 | (I.AO) | P.6 |
| B2386 | (I.AO) | P.7 |
| B2387 | (I.AO) | P.8 |
| B2388 | (I.AO) | P.9 |
| B2389 | (I.AO) | P.10 |
| B2390 | (I.AO) | P.11 |
| B2391 | (I.AO) | P.12 |
| B2392 | (I.AO) | P.13 |
| B2393 | (I.AO) | P.14 |
| B2394 | (I.AO) | P.15 |
| B2395 | (I.AO) | P.16 |
| B2396 | (I.AO) | P.17 |
| B2397 | (I.AO) | P.18 |
| B2398 | (I.AO) | P.19 |
| B2399 | (I.AO) | P.20 |
| B2400 | (I.AO) | P.21 |
| B2401 | (I.AO) | P.22 |
| B2402 | (I.AO) | P.23 |
| B2403 | (I.AO) | P.24 |
| B2404 | (I.AO) | P.25 |
| B2405 | (I.AO) | P.26 |
| B2406 | (I.AO) | P.27 |
| B2407 | (I.AO) | P.28 |
| B2408 | (I.AO) | P.29 |
| B2409 | (I.AO) | P.30 |
| B2410 | (I.AO) | P.31 |
| B2411 | (I.AO) | P.32 |
| B2412 | (I.AO) | P.33 |
| B2413 | (I.AO) | P.34 |
| B2414 | (I.AO) | P.35 |
| B2415 | (I.AO) | P.36 |
| B2416 | (I.AO) | P.37 |
| B2417 | (I.AO) | P.38 |
| B2418 | (I.AO) | P.39 |
| B2419 | (I.AO) | P.40 |
| B2420 | (I.AO) | P.41 |
| B2421 | (I.AO) | P.42 |
| B2422 | (I.AO) | P.43 |
| B2423 | (I.AO) | P.44 |
| B2424 | (I.AO) | P.45 |
| B2425 | (I.AO) | P.46 |
| B2426 | (I.AO) | P.47 |
| B2427 | (I.AO) | P.48 |
| B2428 | (I.AO) | P.49 |
| B2429 | (I.AO) | P.50 |
| B2430 | (I.AO) | P.51 |
| B2431 | (I.AO) | P.52 |
| B2432 | (I.AO) | P.53 |
| B2433 | (I.AO) | P.54 |
| B2434 | (I.AO) | P.55 |
| B2435 | (I.AO) | P.56 |
| B2436 | (I.AO) | P.57 |
| B2437 | (I.AO) | P.58 |
| B2438 | (I.AO) | P.59 |
| B2439 | (I.AO) | P.60 |
| B2440 | (I.AO) | P.61 |

B = Mixture;
I = compound I;
II = compound II

TABLE 41

| B | I | II |
|---|---|---|
| B2441 | (I.AP) | P.1 |
| B2442 | (I.AP) | P.2 |
| B2443 | (I.AP) | P.3 |
| B2444 | (I.AP) | P.4 |
| B2445 | (I.AP) | P.5 |
| B2446 | (I.AP) | P.6 |
| B2447 | (I.AP) | P.7 |
| B2448 | (I.AP) | P.8 |
| B2449 | (I.AP) | P.9 |
| B2450 | (I.AP) | P.10 |
| B2451 | (I.AP) | P.11 |
| B2452 | (I.AP) | P.12 |
| B2453 | (I.AP) | P.13 |
| B2454 | (I.AP) | P.14 |
| B2455 | (I.AP) | P.15 |
| B2456 | (I.AP) | P.16 |
| B2457 | (I.AP) | P.17 |
| B2458 | (I.AP) | P.18 |
| B2459 | (I.AP) | P.19 |
| B2460 | (I.AP) | P.20 |
| B2461 | (I.AP) | P.21 |
| B2462 | (I.AP) | P.22 |
| B2463 | (I.AP) | P.23 |
| B2464 | (I.AP) | P.24 |
| B2465 | (I.AP) | P.25 |
| B2466 | (I.AP) | P.26 |
| B2467 | (I.AP) | P.27 |
| B2468 | (I.AP) | P.28 |
| B2469 | (I.AP) | P.29 |
| B2470 | (I.AP) | P.30 |

TABLE 41-continued

| B | I | II |
|---|---|---|
| B2471 | (I.AP) | P.31 |
| B2472 | (I.AP) | P.32 |
| B2473 | (I.AP) | P.33 |
| B2474 | (I.AP) | P.34 |
| B2475 | (I.AP) | P.35 |
| B2476 | (I.AP) | P.36 |
| B2477 | (I.AP) | P.37 |
| B2478 | (I.AP) | P.38 |
| B2479 | (I.AP) | P.39 |
| B2480 | (I.AP) | P.40 |
| B2481 | (I.AP) | P.41 |
| B2482 | (I.AP) | P.42 |
| B2483 | (I.AP) | P.43 |
| B2484 | (I.AP) | P.44 |
| B2485 | (I.AP) | P.45 |
| B2486 | (I.AP) | P.46 |
| B2487 | (I.AP) | P.47 |
| B2488 | (I.AP) | P.48 |
| B2489 | (I.AP) | P.49 |
| B2490 | (I.AP) | P.50 |
| B2491 | (I.AP) | P.51 |
| B2492 | (I.AP) | P.52 |
| B2493 | (I.AP) | P.53 |
| B2494 | (I.AP) | P.54 |
| B2495 | (I.AP) | P.55 |
| B2496 | (I.AP) | P.56 |
| B2497 | (I.AP) | P.57 |
| B2498 | (I.AP) | P.58 |
| B2499 | (I.AP) | P.59 |
| B2500 | (I.AP) | P.60 |
| B2501 | (I.AP) | P.61 |

B = Mixture;
I = compound I;
II = compound II

TABLE 42

| B | I | II |
|---|---|---|
| B2502 | (I.AQ) | P.1 |
| B2503 | (I.AQ) | P.2 |
| B2504 | (I.AQ) | P.3 |
| B2505 | (I.AQ) | P.4 |
| B2506 | (I.AQ) | P.5 |
| B2507 | (I.AQ) | P.6 |
| B2508 | (I.AQ) | P.7 |
| B2509 | (I.AQ) | P.8 |
| B2510 | (I.AQ) | P.9 |
| B2511 | (I.AQ) | P.10 |
| B2512 | (I.AQ) | P.11 |
| B2513 | (I.AQ) | P.12 |
| B2514 | (I.AQ) | P.13 |
| B2515 | (I.AQ) | P.14 |
| B2516 | (I.AQ) | P.15 |
| B2517 | (I.AQ) | P.16 |
| B2518 | (I.AQ) | P.17 |
| B2519 | (I.AQ) | P.18 |
| B2520 | (I.AQ) | P.19 |
| B2521 | (I.AQ) | P.20 |
| B2522 | (I.AQ) | P.21 |
| B2523 | (I.AQ) | P.22 |
| B2524 | (I.AQ) | P.23 |
| B2525 | (I.AQ) | P.24 |
| B2526 | (I.AQ) | P.25 |
| B2527 | (I.AQ) | P.26 |
| B2528 | (I.AQ) | P.27 |
| B2529 | (I.AQ) | P.28 |
| B2530 | (I.AQ) | P.29 |
| B2531 | (I.AQ) | P.30 |
| B2532 | (I.AQ) | P.31 |
| B2533 | (I.AQ) | P.32 |
| B2534 | (I.AQ) | P.33 |
| B2535 | (I.AQ) | P.34 |
| B2536 | (I.AQ) | P.35 |
| B2537 | (I.AQ) | P.36 |

TABLE 42-continued

| B | I | II |
|---|---|---|
| B2538 | (I.AQ) | P.37 |
| B2539 | (I.AQ) | P.38 |
| B2540 | (I.AQ) | P.39 |
| B2541 | (I.AQ) | P.40 |
| B2542 | (I.AQ) | P.41 |
| B2543 | (I.AQ) | P.42 |
| B2544 | (I.AQ) | P.43 |
| B2545 | (I.AQ) | P.44 |
| B2546 | (I.AQ) | P.45 |
| B2547 | (I.AQ) | P.46 |
| B2548 | (I.AQ) | P.47 |
| B2549 | (I.AQ) | P.48 |
| B2550 | (I.AQ) | P.49 |
| B2551 | (I.AQ) | P.50 |
| B2552 | (I.AQ) | P.51 |
| B2553 | (I.AQ) | P.52 |
| B2554 | (I.AQ) | P.53 |
| B2555 | (I.AQ) | P.54 |
| B2556 | (I.AQ) | P.55 |
| B2557 | (I.AQ) | P.56 |
| B2558 | (I.AQ) | P.57 |
| B2559 | (I.AQ) | P.58 |
| B2560 | (I.AQ) | P.59 |
| B2561 | (I.AQ) | P.60 |
| B2562 | (I.AQ) | P.61 |

B = Mixture;
I = compound I;
II = compound II

TABLE 43

| B | I | II |
|---|---|---|
| B2563 | (I.AR) | P.1 |
| B2564 | (I.AR) | P.2 |
| B2565 | (I.AR) | P.3 |
| B2566 | (I.AR) | P.4 |
| B2567 | (I.AR) | P.5 |
| B2568 | (I.AR) | P.6 |
| B2569 | (I.AR) | P.7 |
| B2570 | (I.AR) | P.8 |
| B2571 | (I.AR) | P.9 |
| B2572 | (I.AR) | P.10 |
| B2573 | (I.AR) | P.11 |
| B2574 | (I.AR) | P.12 |
| B2575 | (I.AR) | P.13 |
| B2576 | (I.AR) | P.14 |
| B2577 | (I.AR) | P.15 |
| B2578 | (I.AR) | P.16 |
| B2579 | (I.AR) | P.17 |
| B2580 | (I.AR) | P.18 |
| B2581 | (I.AR) | P.19 |
| B2582 | (I.AR) | P.20 |
| B2583 | (I.AR) | P.21 |
| B2584 | (I.AR) | P.22 |
| B2585 | (I.AR) | P.23 |
| B2586 | (I.AR) | P.24 |
| B2587 | (I.AR) | P.25 |
| B2588 | (I.AR) | P.26 |
| B2589 | (I.AR) | P.27 |
| B2590 | (I.AR) | P.28 |
| B2591 | (I.AR) | P.29 |
| B2592 | (I.AR) | P.30 |
| B2593 | (I.AR) | P.31 |
| B2594 | (I.AR) | P.32 |
| B2595 | (I.AR) | P.33 |
| B2596 | (I.AR) | P.34 |
| B2597 | (I.AR) | P.35 |
| B2598 | (I.AR) | P.36 |
| B2599 | (I.AR) | P.37 |
| B2600 | (I.AR) | P.38 |
| B2601 | (I.AR) | P.39 |
| B2602 | (I.AR) | P.40 |
| B2603 | (I.AR) | P.41 |
| B2604 | (I.AR) | P.42 |

TABLE 43-continued

| B | I | II |
|---|---|---|
| B2605 | (I.AR) | P.43 |
| B2606 | (I.AR) | P.44 |
| B2607 | (I.AR) | P.45 |
| B2608 | (I.AR) | P.46 |
| B2609 | (I.AR) | P.47 |
| B2610 | (I.AR) | P.48 |
| B2611 | (I.AR) | P.49 |
| B2612 | (I.AR) | P.50 |
| B2613 | (I.AR) | P.51 |
| B2614 | (I.AR) | P.52 |
| B2615 | (I.AR) | P.53 |
| B2616 | (I.AR) | P.54 |
| B2617 | (I.AR) | P.55 |
| B2618 | (I.AR) | P.56 |
| B2619 | (I.AR) | P.57 |
| B2620 | (I.AR) | P.58 |
| B2621 | (I.AR) | P.59 |
| B2622 | (I.AR) | P.60 |
| B2623 | (I.AR) | P.61 |

B = Mixture;
I = compound I;
II = compound II

TABLE 44

| B | I | II |
|---|---|---|
| B2624 | (I.AS) | P.1 |
| B2625 | (I.AS) | P.2 |
| B2626 | (I.AS) | P.3 |
| B2627 | (I.AS) | P.4 |
| B2628 | (I.AS) | P.5 |
| B2629 | (I.AS) | P.6 |
| B2630 | (I.AS) | P.7 |
| B2631 | (I.AS) | P.8 |
| B2632 | (I.AS) | P.9 |
| B2633 | (I.AS) | P.10 |
| B2634 | (I.AS) | P.11 |
| B2635 | (I.AS) | P.12 |
| B2636 | (I.AS) | P.13 |
| B2637 | (I.AS) | P.14 |
| B2638 | (I.AS) | P.15 |
| B2639 | (I.AS) | P.16 |
| B2640 | (I.AS) | P.17 |
| B2641 | (I.AS) | P.18 |
| B2642 | (I.AS) | P.19 |
| B2643 | (I.AS) | P.20 |
| B2644 | (I.AS) | P.21 |
| B2645 | (I.AS) | P.22 |
| B2646 | (I.AS) | P.23 |
| B2647 | (I.AS) | P.24 |
| B2648 | (I.AS) | P.25 |
| B2649 | (I.AS) | P.26 |
| B2650 | (I.AS) | P.27 |
| B2651 | (I.AS) | P.28 |
| B2652 | (I.AS) | P.29 |
| B2653 | (I.AS) | P.30 |
| B2654 | (I.AS) | P.31 |
| B2655 | (I.AS) | P.32 |
| B2656 | (I.AS) | P.33 |
| B2657 | (I.AS) | P.34 |
| B2658 | (I.AS) | P.35 |
| B2659 | (I.AS) | P.36 |
| B2660 | (I.AS) | P.37 |
| B2661 | (I.AS) | P.38 |
| B2662 | (I.AS) | P.39 |
| B2663 | (I.AS) | P.40 |
| B2664 | (I.AS) | P.41 |
| B2665 | (I.AS) | P.42 |
| B2666 | (I.AS) | P.43 |
| B2667 | (I.AS) | P.44 |
| B2668 | (I.AS) | P.45 |
| B2669 | (I.AS) | P.46 |
| B2670 | (I.AS) | P.47 |
| B2671 | (I.AS) | P.48 |
| B2672 | (I.AS) | P.49 |
| B2673 | (I.AS) | P.50 |
| B2674 | (I.AS) | P.51 |
| B2675 | (I.AS) | P.52 |
| B2676 | (I.AS) | P.53 |
| B2677 | (I.AS) | P.54 |
| B2678 | (I.AS) | P.55 |
| B2679 | (I.AS) | P.56 |
| B2680 | (I.AS) | P.57 |
| B2681 | (I.AS) | P.58 |
| B2682 | (I.AS) | P.59 |
| B2683 | (I.AS) | P.60 |
| B2684 | (I.AS) | P.61 |

B = Mixture;
I = compound I;
II = compound II

TABLE 45

| B | I | II |
|---|---|---|
| B2685 | (I.AT) | P.1 |
| B2686 | (I.AT) | P.2 |
| B2687 | (I.AT) | P.3 |
| B2688 | (I.AT) | P.4 |
| B2689 | (I.AT) | P.5 |
| B2690 | (I.AT) | P.6 |
| B2691 | (I.AT) | P.7 |
| B2692 | (I.AT) | P.8 |
| B2693 | (I.AT) | P.9 |
| B2694 | (I.AT) | P.10 |
| B2695 | (I.AT) | P.11 |
| B2696 | (I.AT) | P.12 |
| B2697 | (I.AT) | P.13 |
| B2698 | (I.AT) | P.14 |
| B2699 | (I.AT) | P.15 |
| B2700 | (I.AT) | P.16 |
| B2701 | (I.AT) | P.17 |
| B2702 | (I.AT) | P.18 |
| B2703 | (I.AT) | P.19 |
| B2704 | (I.AT) | P.20 |
| B2705 | (I.AT) | P.21 |
| B2706 | (I.AT) | P.22 |
| B2707 | (I.AT) | P.23 |
| B2708 | (I.AT) | P.24 |
| B2709 | (I.AT) | P.25 |
| B2710 | (I.AT) | P.26 |
| B2711 | (I.AT) | P.27 |
| B2712 | (I.AT) | P.28 |
| B2713 | (I.AT) | P.29 |
| B2714 | (I.AT) | P.30 |
| B2715 | (I.AT) | P.31 |
| B2716 | (I.AT) | P.32 |
| B2717 | (I.AT) | P.33 |
| B2718 | (I.AT) | P.34 |
| B2719 | (I.AT) | P.35 |
| B2720 | (I.AT) | P.36 |
| B2721 | (I.AT) | P.37 |
| B2722 | (I.AT) | P.38 |
| B2723 | (I.AT) | P.39 |
| B2724 | (I.AT) | P.40 |
| B2725 | (I.AT) | P.41 |
| B2726 | (I.AT) | P.42 |
| B2727 | (I.AT) | P.43 |
| B2728 | (I.AT) | P.44 |
| B2729 | (I.AT) | P.45 |
| B2730 | (I.AT) | P.46 |
| B2731 | (I.AT) | P.47 |
| B2732 | (I.AT) | P.48 |
| B2733 | (I.AT) | P.49 |
| B2734 | (I.AT) | P.50 |
| B2735 | (I.AT) | P.51 |
| B2736 | (I.AT) | P.52 |
| B2737 | (I.AT) | P.53 |
| B2738 | (I.AT) | P.54 |

TABLE 45-continued

| B | I | II |
|---|---|---|
| B2739 | (I.AT) | P.55 |
| B2740 | (I.AT) | P.56 |
| B2741 | (I.AT) | P.57 |
| B2742 | (I.AT) | P.58 |
| B2743 | (I.AT) | P.59 |
| B2744 | (I.AT) | P.60 |
| B2745 | (I.AT) | P.61 |

B = Mixture;
I = compound I;
II = compound II

TABLE 46

| B | I | II |
|---|---|---|
| B2746 | (I.AU) | P.1 |
| B2747 | (I.AU) | P.2 |
| B2748 | (I.AU) | P.3 |
| B2749 | (I.AU) | P.4 |
| B2750 | (I.AU) | P.5 |
| B2751 | (I.AU) | P.6 |
| B2752 | (I.AU) | P.7 |
| B2753 | (I.AU) | P.8 |
| B2754 | (I.AU) | P.9 |
| B2755 | (I.AU) | P.10 |
| B2756 | (I.AU) | P.11 |
| B2757 | (I.AU) | P.12 |
| B2758 | (I.AU) | P.13 |
| B2759 | (I.AU) | P.14 |
| B2760 | (I.AU) | P.15 |
| B2761 | (I.AU) | P.16 |
| B2762 | (I.AU) | P.17 |
| B2763 | (I.AU) | P.18 |
| B2764 | (I.AU) | P.19 |
| B2765 | (I.AU) | P.20 |
| B2766 | (I.AU) | P.21 |
| B2767 | (I.AU) | P.22 |
| B2768 | (I.AU) | P.23 |
| B2769 | (I.AU) | P.24 |
| B2770 | (I.AU) | P.25 |
| B2771 | (I.AU) | P.26 |
| B2772 | (I.AU) | P.27 |
| B2773 | (I.AU) | P.28 |
| B2774 | (I.AU) | P.29 |
| B2775 | (I.AU) | P.30 |
| B2776 | (I.AU) | P.31 |
| B2777 | (I.AU) | P.32 |
| B2778 | (I.AU) | P.33 |
| B2779 | (I.AU) | P.34 |
| B2780 | (I.AU) | P.35 |
| B2781 | (I.AU) | P.36 |
| B2782 | (I.AU) | P.37 |
| B2783 | (I.AU) | P.38 |
| B2784 | (I.AU) | P.39 |
| B2785 | (I.AU) | P.40 |
| B2786 | (I.AU) | P.41 |
| B2787 | (I.AU) | P.42 |
| B2788 | (I.AU) | P.43 |
| B2789 | (I.AU) | P.44 |
| B2790 | (I.AU) | P.45 |
| B2791 | (I.AU) | P.46 |
| B2792 | (I.AU) | P.47 |
| B2793 | (I.AU) | P.48 |
| B2794 | (I.AU) | P.49 |
| B2795 | (I.AU) | P.50 |
| B2796 | (I.AU) | P.51 |
| B2797 | (I.AU) | P.52 |
| B2798 | (I.AU) | P.53 |
| B2799 | (I.AU) | P.54 |
| B2800 | (I.AU) | P.55 |
| B2801 | (I.AU) | P.56 |
| B2802 | (I.AU) | P.57 |
| B2803 | (I.AU) | P.58 |
| B2804 | (I.AU) | P.59 |
| B2805 | (I.AU) | P.60 |
| B2806 | (I.AU) | P.61 |

B = Mixture;
I = compound I;
II = compound II

TABLE 47

| B | I | II |
|---|---|---|
| B2807 | (I.AV) | P.1 |
| B2808 | (I.AV) | P.2 |
| B2809 | (I.AV) | P.3 |
| B2810 | (I.AV) | P.4 |
| B2811 | (I.AV) | P.5 |
| B2812 | (I.AV) | P.6 |
| B2813 | (I.AV) | P.7 |
| B2814 | (I.AV) | P.8 |
| B2815 | (I.AV) | P.9 |
| B2816 | (I.AV) | P.10 |
| B2817 | (I.AV) | P.11 |
| B2818 | (I.AV) | P.12 |
| B2819 | (I.AV) | P.13 |
| B2820 | (I.AV) | P.14 |
| B2821 | (I.AV) | P.15 |
| B2822 | (I.AV) | P.16 |
| B2823 | (I.AV) | P.17 |
| B2824 | (I.AV) | P.18 |
| B2825 | (I.AV) | P.19 |
| B2826 | (I.AV) | P.20 |
| B2827 | (I.AV) | P.21 |
| B2828 | (I.AV) | P.22 |
| B2829 | (I.AV) | P.23 |
| B2830 | (I.AV) | P.24 |
| B2831 | (I.AV) | P.25 |
| B2832 | (I.AV) | P.26 |
| B2833 | (I.AV) | P.27 |
| B2834 | (I.AV) | P.28 |
| B2835 | (I.AV) | P.29 |
| B2836 | (I.AV) | P.30 |
| B2837 | (I.AV) | P.31 |
| B2838 | (I.AV) | P.32 |
| B2839 | (I.AV) | P.33 |
| B2840 | (I.AV) | P.34 |
| B2841 | (I.AV) | P.35 |
| B2842 | (I.AV) | P.36 |
| B2843 | (I.AV) | P.37 |
| B2844 | (I.AV) | P.38 |
| B2845 | (I.AV) | P.39 |
| B2846 | (I.AV) | P.40 |
| B2847 | (I.AV) | P.41 |
| B2848 | (I.AV) | P.42 |
| B2849 | (I.AV) | P.43 |
| B2850 | (I.AV) | P.44 |
| B2851 | (I.AV) | P.45 |
| B2852 | (I.AV) | P.46 |
| B2853 | (I.AV) | P.47 |
| B2854 | (I.AV) | P.48 |
| B2855 | (I.AV) | P.49 |
| B2856 | (I.AV) | P.50 |
| B2857 | (I.AV) | P.51 |
| B2858 | (I.AV) | P.52 |
| B2859 | (I.AV) | P.53 |
| B2860 | (I.AV) | P.54 |
| B2861 | (I.AV) | P.55 |
| B2862 | (I.AV) | P.56 |
| B2863 | (I.AV) | P.57 |
| B2864 | (I.AV) | P.58 |
| B2865 | (I.AV) | P.59 |
| B2866 | (I.AV) | P.60 |
| B2867 | (I.AV) | P.61 |

B = Mixture;
I = compound I;
II = compound II

TABLE 48

| B | I | II |
|---|---|---|
| B2868 | (I.AW) | P.1 |
| B2869 | (I.AW) | P.2 |
| B2870 | (I.AW) | P.3 |
| B2871 | (I.AW) | P.4 |
| B2872 | (I.AW) | P.5 |
| B2873 | (I.AW) | P.6 |
| B2874 | (I.AW) | P.7 |
| B2875 | (I.AW) | P.8 |
| B2876 | (I.AW) | P.9 |
| B2877 | (I.AW) | P.10 |
| B2878 | (I.AW) | P.11 |
| B2879 | (I.AW) | P.12 |
| B2880 | (I.AW) | P.13 |
| B2881 | (I.AW) | P.14 |
| B2882 | (I.AW) | P.15 |
| B2883 | (I.AW) | P.16 |
| B2884 | (I.AW) | P.17 |
| B2885 | (I.AW) | P.18 |
| B2886 | (I.AW) | P.19 |
| B2887 | (I.AW) | P.20 |
| B2888 | (I.AW) | P.21 |
| B2889 | (I.AW) | P.22 |
| B2890 | (I.AW) | P.23 |
| B2891 | (I.AW) | P.24 |
| B2892 | (I.AW) | P.25 |
| B2893 | (I.AW) | P.26 |
| B2894 | (I.AW) | P.27 |
| B2895 | (I.AW) | P.28 |
| B2896 | (I.AW) | P.29 |
| B2897 | (I.AW) | P.30 |
| B2898 | (I.AW) | P.31 |
| B2899 | (I.AW) | P.32 |
| B2900 | (I.AW) | P.33 |
| B2901 | (I.AW) | P.34 |
| B2902 | (I.AW) | P.35 |
| B2903 | (I.AW) | P.36 |
| B2904 | (I.AW) | P.37 |
| B2905 | (I.AW) | P.38 |
| B2906 | (I.AW) | P.39 |
| B2907 | (I.AW) | P.40 |
| B2908 | (I.AW) | P.41 |
| B2909 | (I.AW) | P.42 |
| B2910 | (I.AW) | P.43 |
| B2911 | (I.AW) | P.44 |
| B2912 | (I.AW) | P.45 |
| B2913 | (I.AW) | P.46 |
| B2914 | (I.AW) | P.47 |
| B2915 | (I.AW) | P.48 |
| B2916 | (I.AW) | P.49 |
| B2917 | (I.AW) | P.50 |
| B2918 | (I.AW) | P.51 |
| B2919 | (I.AW) | P.52 |
| B2920 | (I.AW) | P.53 |
| B2921 | (I.AW) | P.54 |
| B2922 | (I.AW) | P.55 |
| B2923 | (I.AW) | P.56 |
| B2924 | (I.AW) | P.57 |
| B2925 | (I.AW) | P.58 |
| B2926 | (I.AW) | P.59 |
| B2927 | (I.AW) | P.60 |
| B2928 | (I.AW) | P.61 |

B = Mixture;
I = compound I;
II = compound II

TABLE 49

| B | I | II |
|---|---|---|
| B2929 | (I.AX) | P.1 |
| B2930 | (I.AX) | P.2 |
| B2931 | (I.AX) | P.3 |
| B2932 | (I.AX) | P.4 |
| B2933 | (I.AX) | P.5 |
| B2934 | (I.AX) | P.6 |
| B2935 | (I.AX) | P.7 |
| B2936 | (I.AX) | P.8 |
| B2937 | (I.AX) | P.9 |
| B2938 | (I.AX) | P.10 |
| B2939 | (I.AX) | P.11 |
| B2940 | (I.AX) | P.12 |
| B2941 | (I.AX) | P.13 |
| B2942 | (I.AX) | P.14 |
| B2943 | (I.AX) | P.15 |
| B2944 | (I.AX) | P.16 |
| B2945 | (I.AX) | P.17 |
| B2946 | (I.AX) | P.18 |
| B2947 | (I.AX) | P.19 |
| B2948 | (I.AX) | P.20 |
| B2949 | (I.AX) | P.21 |
| B2950 | (I.AX) | P.22 |
| B2951 | (I.AX) | P.23 |
| B2952 | (I.AX) | P.24 |
| B2953 | (I.AX) | P.25 |
| B2954 | (I.AX) | P.26 |
| B2955 | (I.AX) | P.27 |
| B2956 | (I.AX) | P.28 |
| B2957 | (I.AX) | P.29 |
| B2958 | (I.AX) | P.30 |
| B2959 | (I.AX) | P.31 |
| B2960 | (I.AX) | P.32 |
| B2961 | (I.AX) | P.33 |
| B2962 | (I.AX) | P.34 |
| B2963 | (I.AX) | P.35 |
| B2964 | (I.AX) | P.36 |
| B2965 | (I.AX) | P.37 |
| B2966 | (I.AX) | P.38 |
| B2967 | (I.AX) | P.39 |
| B2968 | (I.AX) | P.40 |
| B2969 | (I.AX) | P.41 |
| B2970 | (I.AX) | P.42 |
| B2971 | (I.AX) | P.43 |
| B2972 | (I.AX) | P.44 |
| B2973 | (I.AX) | P.45 |
| B2974 | (I.AX) | P.46 |
| B2975 | (I.AX) | P.47 |
| B2976 | (I.AX) | P.48 |
| B2977 | (I.AX) | P.49 |
| B2978 | (I.AX) | P.50 |
| B2979 | (I.AX) | P.51 |
| B2980 | (I.AX) | P.52 |
| B2981 | (I.AX) | P.53 |
| B2982 | (I.AX) | P.54 |
| B2983 | (I.AX) | P.55 |
| B2984 | (I.AX) | P.56 |
| B2985 | (I.AX) | P.57 |
| B2986 | (I.AX) | P.58 |
| B2987 | (I.AX) | P.59 |
| B2988 | (I.AX) | P.60 |
| B2989 | (I.AX) | P.61 |

B = Mixture;
I = compound I;
II = compound II

The compounds II (UI) may also have fungicidal, insecticidal, acaricidal, molluscidal, pheromone, nematicidal, plant stress reducing, plant growth regulator, plant growth promoting and/or yield enhancing activity.

The present invention furthermore relates to agrochemical compositions comprising a mixture of at least one compound I and at least one compound II (UI) as described above, and if desired at least one suitable auxiliary.

The mixtures and compositions according to the invention can also be present together with further pesticides, e.g. with herbicides, insecticides, growth regulators, fungicides; or else with fertilizers, as pre-mix or, if appropriate, not until immediately prior to use (tank mix).

In one embodiment, the mixture according to the invention comprises as active components one active compound I (nitrification inhibitor), or an agriculturally useful salt thereof, and one active compound II and one active compound III selected from group of herbicides, insecticides, fungicides, growth regulators, biopesticides, urease inhibitors, nitrification inhibitors, and denitrification inhibitors.

Mixing a composition comprising at least one compound I and at least one compound II with further urease inhibitors results in many cases in an improvement of the nitrification inhibition effect and/or an improvement of the health of a plant and/or an improvement of the urease inhibition effect. Furthermore, in many cases, synergistic effects are obtained.

The mixtures and compositions according to the invention are suitable as nitrification inhibitors, improvers for the plant yield, or improvers for the plant health.

The term "plant propagation material" is to be understood to denote all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants, including seedlings and young plants, which are to be transplanted after germination or after emergence from soil.

These young plants may also be protected before transplantation by a total or partial treatment by immersion or pouring.

Preferably, treatment of plant propagation materials with the inventive mixtures and compositions thereof, respectively, is used for for enhancing the use efficiency of urea-containing fertilizer or for urease inhibition.

The term "cultivated plants" is to be understood as including plants which have been modified by breeding, mutagenesis or genetic engineering including but not limiting to agricultural biotech products on the market or in development (cf. http://cera-gmc.org/, see GM crop database therein). Genetically modified plants are plants, which genetic material has been so modified by the use of recombinant DNA techniques that under natural circumstances cannot readily be obtained by cross breeding, mutations or natural recombination. Typically, one or more genes have been integrated into the genetic material of a genetically modified plant in order to improve certain properties of the plant. Such genetic modifications also include but are not limited to targeted post-transitional modification of protein(s), oligo- or polypeptides e.g. by glycosylation or polymer additions such as prenylated, acetylated or farnesylated moieties or PEG moieties.

Plants that have been modified by breeding, mutagenesis or genetic engineering, e.g. have been rendered tolerant to applications of specific classes of herbicides, such as hydroxyphenylpyruvate dioxygenase (HPPD) inhibitors; acetolactate synthase (ALS) inhibitors, such as sulfonyl ureas (see e.g. U.S. Pat. No. 6,222,100, WO 01/82685, WO 00/26390, WO 97/41218, WO 98/02526, WO 98/02527, WO 04/106529, WO 05/20673, WO 03/14357, WO 03/13225, WO 03/14356, WO 04/16073) or imidazolinones (see e.g. U.S. Pat. No. 6,222,100, WO 01/82685, WO 00/026390, WO 97/41218, WO 98/002526, WO 98/02527, WO 04/106529, WO 05/20673, WO 03/014357, WO 03/13225, WO 03/14356, WO 04/16073); enolpyruvylshikimate-3-phosphate synthase (EPSPS) inhibitors, such as glyphosate (see e.g. WO 92/00377); glutamine synthetase (GS) inhibitors, such as glufosinate (see e.g. EP-A 242 236, EP-A 242 246) or oxynil herbicides (see e.g. U.S. Pat. No. 5,559,024) as a result of conventional methods of breeding or genetic engineering. Several cultivated plants have been rendered tolerant to herbicides by conventional methods of breeding (mutagenesis), e.g. Clearfield® summer rape (Canola, BASF SE, Germany) being tolerant to imidazolinones, e.g. imazamox. Genetic engineering methods have been used to render cultivated plants such as soybean, cotton, corn, beets and rape, tolerant to herbicides such as glyphosate and glufosinate, some of which are commercially available under the trade names RoundupReady® (glyphosate-tolerant, Monsanto, U.S.A.) and LibertyLink® (glufosinate-tolerant, Bayer CropScience, Germany).

Furthermore, plants are also covered that are by the use of recombinant DNA techniques capable to synthesize one or more insecticidal proteins, especially those known from the bacterial genus *Bacillus*, particularly from *Bacillus thuringiensis*, such as δ-endotoxins, e.g. CryIA(b), CryIA(c), CryIF, CryIF(a2), CryIIA(b), CryIIIA, CryIIIB(b1) or Cry9c; vegetative insecticidal proteins (VIP), e.g. VIP1, VIP2, VIP3 or VIP3A; insecticidal proteins of bacteria colonizing nematodes, e.g. *Photorhabdus* spp. or *Xenorhabdus* spp.; toxins produced by animals, such as scorpion toxins, arachnid toxins, wasp toxins, or other insect-specific neurotoxins; toxins produced by fungi, such Streptomycetes toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxysteroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilben synthase, bibenzyl synthase, chitinases or glucanases. In the context of the present invention these insecticidal proteins or toxins are to be understood expressly also as pre-toxins, hybrid proteins, truncated or otherwise modified proteins. Hybrid proteins are characterized by a new combination of protein domains, (see, e.g. WO02/015701). Further examples of such toxins or genetically modified plants capable of synthesizing such toxins are disclosed, e.g., in EP-A374753, WO93/007278, WO95/34656, EP-A427529, EP-A451 878, WO03/18810 and WO03/52073. The methods for producing such genetically modified plants are generally known to the person skilled in the art and are described, e.g. in the publications mentioned above. These insecticidal proteins contained in the genetically modified plants impart to the plants producing these proteins tolerance to harmful pests from all taxonomic groups of athropods, especially to beetles (Coeloptera), two-winged insects (Diptera), and moths (Lepidoptera) and to nematodes (Nematoda). Genetically modified plants capable to synthesize one or more insecticidal proteins are, e.g., described in the publications mentioned above, and some of which are commercially available such as YieldGard® (corn cultivars producing the Cry1Ab toxin), YieldGard® Plus (corn cultivars producing Cry1Ab and Cry3Bb1 toxins), Starlink® (corn cultivars producing the Cry9c toxin), Herculex® RW (corn cultivars producing Cry34Ab1, Cry35Ab1 and the enzyme Phosphinothricin-N-Acetyltransferase [PAT]); NuCOTN® 33B (cotton cultivars producing the Cry1Ac toxin), Bollgard® I (cotton cultivars producing the Cry1Ac toxin), Bollgard® II (cotton cultivars producing Cry1Ac and Cry2Ab2 toxins); VIPCOT® (cotton cultivars producing a VIP-toxin); NewLeaf® (potato cultivars producing the Cry3A toxin); Bt-Xtra®, NatureGard®, KnockOut®, BiteGard®, Protecta®, Bt11 (e.g. Agrisure® CB) and Bt176 from Syngenta Seeds SAS, France, (corn cultivars producing the Cry1Ab toxin and PAT enzyme), MIR604 from Syngenta Seeds SAS, France (corn cultivars producing a modified version of the Cry3A toxin, c.f. WO 03/018810), MON 863 from Monsanto Europe S.A., Belgium (corn cultivars producing the Cry3Bb1 toxin), IPC 531 from Monsanto Europe S.A., Belgium (cotton cultivars producing a modified version of the Cry1Ac toxin) and 1507 from Pioneer Overseas Corporation, Belgium (corn cultivars producing the CryIF toxin and PAT enzyme).

Furthermore, plants are also covered that are by the use of recombinant DNA techniques capable to synthesize one or more proteins to increase the resistance or tolerance of those plants to bacterial, viral or fungal pathogens. Examples of such proteins are the so-called "pathogenesis-related proteins" (PR proteins, see, e.g. EP-A 392 225), plant disease resistance genes (e.g. potato cultivars, which express resistance genes acting against *Phytophthora infestans* derived from the mexican wild potato *Solanum bulbocastanum*) or T4-lysozym (e.g. potato cultivars capable of synthesizing these proteins with increased resistance against bacteria such as *Erwinia amylvora*). The methods for producing such genetically modified plants are generally known to the person skilled in the art and are described, e.g. in the publications mentioned above.

Furthermore, plants are also covered that are by the use of recombinant DNA techniques capable to synthesize one or more proteins to increase the productivity (e.g. bio mass production, grain yield, starch content, oil content or protein content), tolerance to drought, salinity or other growth-limiting environmental factors or tolerance to pests and fungal, bacterial or viral pathogens of those plants.

Furthermore, plants are also covered that contain by the use of recombinant DNA techniques a modified amount of substances of content or new substances of content, specifically to improve human or animal nutrition, e.g. oil crops that produce health-promoting long-chain omega-3 fatty acids or unsaturated omega-9 fatty acids (e.g. Nexera® rape, DOW Agro Sciences, Canada).

Furthermore, plants are also covered that contain by the use of recombinant DNA techniques a modified amount of substances of content or new substances of content, specifically to improve raw material production, e.g. potatoes that produce increased amounts of amylopectin (e.g. Amflora® potato, BASF SE, Germany).

Plant propagation materials may be treated with the mixtures and compositions of the invention prophylactically either at or before planting or transplanting.

In particular, the present invention relates to a method for protection of plant propagation material from pests, wherein the plant propagation material is treated with an effective amount of an inventive mixture.

Depending on the application method in question, the mixtures or compositions according to the invention can additionally be employed in a further number of crop plants for increasing yield, for increasing the productivity (e.g. bio mass production, grain yield, starch content, oil content or protein content), for improving plant health or for improving or regulating plant growth. Examples of suitable crops are the following:

*Allium cepa, Ananas comosus, Arachis hypogaea, Asparagus officinalis, Avena sativa, Beta vulgaris* spec. *altissima, Beta vulgaris* spec. *rapa, Brassica napus* var. *napus, Brassica napus* var. *napobrassica, Brassica rapa* var. *silvestris, Brassica oleracea, Brassica nigra, Camellia sinensis, Carthamus tinctorius, Carya illinoinensis, Citrus limon, Citrus sinensis, Coffea arabica (Coffea canephora, Coffea liberica), Cucumis sativus, Cynodon dactylon, Daucus carota, Elaeis guineensis, Fragaria vesca, Glycine max, Gossypium hirsutum, (Gossypium arboreum, Gossypium herbaceum, Gossypium vitifolium), Helianthus annuus, Hevea brasiliensis, Hordeum vulgare, Humulus lupulus, Ipomoea batatas, Juglans regia, Lens culinaris, Linum usitatissimum, Lycopersicon lycopersicum, Malus* spec., *Manihot esculenta, Medicago sativa, Musa* spec., *Nicotiana tabacum (N. rustica), Olea europaea, Oryza sativa, Phaseolus lunatus, Phaseolus vulgaris, Picea abies, Pinus* spec., *Pistacia vera, Pisum sativum, Prunus avium, Prunus persica, Pyrus communis, Prunus armeniaca, Prunus cerasus, Prunus dulcis* and *prunus domestica, Ribes sylvestre, Ricinus communis, Saccharum officinarum, Secale cereale, Sinapis alba, Solanum tuberosum, Sorghum bicolor* (s. *vulgare), Theobroma cacao, Trifolium pratense, Triticum aestivum, Triticale, Triticum durum, Vicia faba, Vitis vinifera, Zea mays.*

Preferred crops are *Arachis hypogaea, Beta vulgaris* spec. *altissima, Brassica napus* var. *napus, Brassica oleracea, Citrus limon, Citrus sinensis, Coffea arabica (Coffea canephora, Coffea liberica), Cynodon dactylon, Glycine max, Gossypium hirsutum, (Gossypium arboreum, Gossypium herbaceum, Gossypium vitifolium), Helianthus annuus, Hordeum vulgare, Juglans regia, Lens culinaris, Linum usitatissimum, Lycopersicon lycopersicum, Malus* spec., *Medicago sativa, Nicotiana tabacum (N. rustica), Olea europaea, Oryza sativa, Phaseolus lunatus, Phaseolus vulgaris, Pistacia vera, Pisum sativum, Prunus dulcis, Saccharum officinarum, Secale cereale, Solanum tuberosum, Sorghum bicolor* (s. *vulgare), Triticale, Triticum aestivum, Triticum durum, Vicia faba, Vitis vinifera* and *Zea mays*

Especially preferred crops are crops of cereals, corn, soybeans, rice, oilseed rape, cotton, potatoes, peanuts or permanent crops.

The mixtures or compositions according to the invention can also be used in crops which have been modified by mutagenesis or genetic engineering in order to provide a new trait to a plant or to modify an already present trait.

The term "crops" as used herein includes also (crop) plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, increased yield and tolerance to abiotic conditions, like drought.

Increased yield has been created by increasing ear biomass using the transgene athb17, being present in corn event MON87403, or by enhancing photosynthesis using the transgene bbx32, being present in the soybean event MON87712.

Crops comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-ØØ41Ø-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (http://www.isaaa.org/gmapprovaldatabase) and the "Center for Environmental Risk Assessment (CERA)" (http://cera-gmc.org/GMCropDatabase), as well as in patent applications, like EP3028573 and WO2017/011288.

The use of compositions according to the invention on crops may result in effects which are specific to a crop comprising a certain gene or event. These effects might involve changes in growth behavior or changed resistance to biotic or abiotic stress factors. Such effects may in particular comprise enhanced yield, enhanced resistance or tolerance to insects, nematodes, fungal, bacterial, *mycoplasma*, viral or viroid pathogens as well as early vigour, early or delayed ripening, cold or heat tolerance as well as changed amino acid or fatty acid spectrum or content.

In an equally preferred embodiment, the present invention relates to a method for improving the urease-inhibiting effect (hereinafter referred to as "UI effect"), wherein the seeds, the plants or the soil are treated with an UI effective amount of an inventive mixture.

The term "UI effective amount" denotes an amount of the inventive mixtures, which is sufficient for achieving UI effects as defined herein below. More exemplary information about amounts, ways of application and suitable ratios to be used is given below. Anyway, the skilled artisan is well aware of the fact that such an amount can vary in a broad range and is dependent on various factors, e.g. weather, target species, locus, mode of application, soil type, the treated cultivated plant or material and the climatic conditions.

According to the present invention, the UI effect is increased by at least 2%, more preferably by at least 4%, most preferably at least 7%, particularly preferably at least 10%, more particularly preferably by at least 15%, most particularly preferably by at least 20%, particularly more preferably by at least 25%, particularly most preferably by at least 30%, particularly by at least 35%, especially more preferably by at least 40%, especially most preferably by at least 45%, especially by at least 50%, in particular preferably by at least 55%, in particular more preferably by at least 60%, in particular most preferably by at least 65%, in particular by at least 70%, for example by at least 75%. In general, the increase of the UI effect may be for example 5 to 10%, more preferably 10 to 20%, most preferably 20 to 30%.

The UI effect can be measured according to the Study on ammonia volatilization losses as shown below: The method used to measure NH3 volatilization losses from urea in the laboratory is described by Fenn & Kissel (1973) (in: Ammonia volatilization from surface applications of ammonium compounds on calcareous soils: I. General theory. Soil Sci. Am. Proc. 37, 855-859) and Terman (1979) (in: Volatilization losses of nitrogen as ammonia from surface-applied fertilizers, organic amendments and crop residues. Advances in Agronomy 31, 189-223). In brief, air passes for up to 21 days over 200 g soil from Limburgerhof (loamy sand, pH(CaCl2)) 6.8), with a moisture content of about 55% water holding capacity, in a gas exchange vessel after surface application of 0.25 g nitrogen in form of differently formulated urea. To scrub NH3 from the air leaving the vessel at a rate of about 4 L/min, it is bubbled through a solution of 200 mL 0.15 NH2SO4. NH3-N is quantified at regular intervals in the solution as NH4-N by means of an autoanalyzer.

In an equally preferred embodiment, the present invention relates to a method for improving the nitrification-inhibiting effect, wherein the seeds, the plants or the soil are treated with a NI effective amount of an inventive mixture.

The term "NI effective amount" denotes an amount of the inventive mixtures, which is sufficient for achieving nitrification-inhibiting effects as defined herein below. More exemplary information about amounts, ways of application and suitable ratios to be used is given below. Anyway, the skilled artisan is well aware of the fact that such an amount can vary in a broad range and is dependent on various factors, e.g. weather, target species, locus, mode of application, soil type, the treated cultivated plant or material and the climatic conditions.

According to the present invention, the nitrification-inhibiting effect is increased by at least 2%, more preferably by at least 4%, most preferably at least 7%, particularly preferably at least 10%, more particularly preferably by at least 15%, most particularly preferably by at least 20%, particularly more preferably by at least 25%, particularly most preferably by at least 30%, particularly by at least 35%, especially more preferably by at least 40%, especially most preferably by at least 45%, especially by at least 50%, in particular preferably by at least 55%, in particular more preferably by at least 60%, in particular most preferably by at least 65%, in particular by at least 70%, for example by at least 75%. In general, the increase of the nitrification-inhibiting effect may be for example 5 to 10%, more preferably 10 to 20%, most preferably 20 to 30%. The nitrification-inhibiting effect can be measured according to the Example 1 and Example 2 as shown below:

EXAMPLE 1

The compositions and mixtures of the invention have been tested as follows in terms of the inhibition of nitrification:

Soil was sampled fresh from a field (e.g. Limburgerhof), dried and sieved through a 500 µm sieve. Approximately 200 mg of soil were placed into each well of a 48 well plate. The compositions or mixtures of the invention, or DMSO alone, were added at a concentration of 10 ppm, dissolved in 1% DMSO. 6 μmol ammonium sulfate was added per well as well as 4.8 mg NaClO₃.

Subsequently, the samples were incubated at room temperature for up to 72 hrs. After the incubation period 64 mg KCl were added and mixed. 25 μl of the supernatant were placed into a fresh plate and 260 μl of a color reaction solution (from Merck Nr 1.11799.0100) were added.

Measurements were taken with a Tecan plate Reader at 540 nm wavelength.

EXAMPLE 2: (FOR THOSE RESULTS WITH A % INHIBITION AND NOT RESULTS IN PPM)

100 g soil is filled into 500 ml plastic bottles (e.g. soil sampled from the field) and is moistened to 50% water holding capacity. The soil is incubated at 20° C. for two weeks to activate the microbial biomass. 1 ml test solution, containing the compositions and mixtures of the invention in the appropriate concentration (usually 0.3 or 1% of nitrogen N), or DMSO and 10 mg nitrogen in the form of ammoniumsulfate-N is added to the soil and everything mixed well. Bottles are capped but loosely to allow air exchange. The bottles are then incubated at 20° C. for 0 and 14 days.

For analysis, 300 ml of a 1% K2SO4-solution is added to the bottle containing the soil and shaken for 2 hrs in a horizontal shaker at 150 rpm. Then the whole solution is filtered through a Macherey-Nagel Filter MN 807 ¼. Ammonium and nitrate content is then analyzed in the filtrate in an autoanalyzer at 550 nm (Merck, AA11). Calculations:

$$\text{inhibition in \%} = \frac{(NO3-N_{without\ NI\ at\ end\ of\ incubation} - NO3-N_{with\ NI\ at\ end\ of\ incubation})}{(NO3-N_{without\ NI\ at\ end\ of\ incubation} - NO3-N_{at\ beginning})} \times 100$$

In an equally preferred embodiment, the present invention relates to a method for improving the health of plants, wherein the plants are treated with a plant health effective amount of an inventive mixture.

The term "plant health effective amount" denotes an amount of the inventive mixtures, which is sufficient for achieving plant health effects as defined herein below. More exemplary information about amounts, ways of application and suitable ratios to be used is given below. Anyway, the skilled artisan is well aware of the fact that such an amount can vary in a broad range and is dependent on various factors, e.g. the treated cultivated plant or material and the climatic conditions.

Healthier plants are desirable since they result among others in better yields and/or a better quality of the plants or crops, specifically better quality of the harvested plant parts. Healthier plants also better resist to biotic and/or abiotic stress. A high resistance against biotic stresses in turn allows the person skilled in the art to reduce the quantity of pesticides applied and consequently to slow down the development of resistances against the respective pesticides.

It has to be emphasized that the above mentioned effects of the inventive mixtures, i.e. enhanced health of the plant, are also present when the plant is not under biotic stress and in particular when the plant is not under pest pressure.

For example, for seed treatment and soil applications, it is evident that a plant suffering from fungal or insecticidal attack shows reduced germination and emergence leading to poorer plant or crop establishment and vigor, and consequently, to a reduced yield as compared to a plant propagation material which has been subjected to curative or preventive treatment against the relevant pest and which can grow without the damage caused by the biotic stress factor.

However, the methods according to the invention lead to an enhanced plant health even in the absence of any biotic stress. This means that the positive effects of the mixtures of the invention cannot be explained just by the nitrification-inhibiting or urease-inhibiting activities of the compounds I and compounds II, but are based on further activity profiles. Accordingly, the application of the inventive mixtures can also be carried out in the absence of pest pressure.

In an equally preferred embodiment, the present invention relates to a method for improving the health of plants grown from said plant propagation material, wherein the plant propagation material is treated with an effective amount of an inventive mixture.

Each plant health indicator listed below, which is selected from the groups consisting of yield, plant vigor, quality and tolerance of the plant to abiotic and/or biotic stress, is to be understood as a preferred embodiment of the present invention either each on its own or preferably in combination with each other.

According to the present invention, "increased yield" of a plant means that the yield of a product of the respective plant is increased by a measurable amount over the yield of the same product of the plant produced under the same conditions, but without the application of the inventive mixture.

For seed treatment e.g. as inoculant and/or foliar application forms, increased yield can be characterized, among others, by the following improved properties of the plant: increased plant weight; and/or increased plant height; and/or increased biomass such as higher overall fresh weight (FW) or dry weight (DW); and/or increased number of flowers per plant; and/or higher grain and/or fruit yield; and/or more tillers or side shoots (branches); and/or larger leaves; and/or increased shoot growth; and/or increased protein content; and/or increased oil content; and/or increased starch content; and/or increased pigment content; and/or increased chlorophyll content (chlorophyll content has a positive correlation with the plant's photosynthesis rate and accordingly, the higher the chlorophyll content the higher the yield of a plant) and/or increased quality of a plant; and/or better nitrogen uptake (N uptake).

"Grain" and "fruit" are to be understood as any plant product which is further utilized after harvesting, e.g. fruits in the proper sense, vegetables, nuts, grains, seeds, wood (e.g. in the case of silviculture plants), flowers (e.g. in the case of gardening plants, ornamentals) etc., that is anything of economic value that is produced by the plant.

According to the present invention, the yield is increased by at least 2%, more preferably by at least 4%, most preferably at least 7%, particularly preferably at least 10%, more particularly preferably by at least 15%, most particularly preferably by at least 20%, particularly more preferably by at least 25%, particularly most preferably by at least 30%, particularly by at least 35%, especially more preferably by at least 40%, especially most preferably by at least 45%, especially by at least 50%, in particular preferably by at least 55%, in particular more preferably by at least 60%, in particular most preferably by at least 65%, in particular by at least 70%, for example by at least 75%.

According to the present invention, the yield—if measured in the absence of pest pressure—is increased by at least 2%, more preferably by at least 4%, most preferably at least 7%, particularly preferably at least 10%, more particularly preferably by at least 15%, most particularly preferably by at least 20%, particularly more preferably by at least 25%, particularly most preferably by at least 30%, particularly by at least 35%, especially more preferably by at least 40%, especially most preferably by at least 45%, especially by at least 50%, in particular preferably by at least 55%, in particular more preferably by at least 60%, in particular most preferably by at least 65%, in particular by at least 70%, for example by at least 75%.

Another indicator for the condition of the plant is the plant vigor. The plant vigor becomes manifest in several aspects such as the general visual appearance.

For foliar applications, improved plant vigor can be characterized, among others, by the following improved properties of the plant: improved vitality of the plant; and/or improved plant growth; and/or improved plant development; and/or improved visual appearance; and/or improved plant stand (less plant verse/lodging and/or bigger leaf blade; and/or bigger size; and/or increased plant height; and/or increased tiller number; and/or increased number of side shoots; and/or increased number of flowers per plant; and/or increased shoot growth; and/or enhanced photosynthetic activity (e.g. based on increased stomatal conductance and/or increased $CO_2$ assimilation rate)); and/or earlier flowering; and/or earlier fruiting; and/or earlier grain maturity; and/or less non-productive tillers; and/or less dead basal leaves; and/or less input needed (such as fertilizers or water); and/or greener leaves; and/or complete maturation under shortened vegetation periods; and/or easier harvesting; and/or faster and more uniform ripening; and/or longer shelf-life; and/or longer panicles; and/or delay of senescence; and/or stronger and/or more productive tillers; and/or better extractability of ingredients; and/or improved quality of seeds (for being seeded in the following seasons for seed production); and/or reduced production of ethylene and/or the inhibition of its reception by the plant.

Another indicator for the condition of the plant is the "quality" of a plant and/or its products. According to the present invention, enhanced quality means that certain plant characteristics such as the content or composition of certain ingredients are increased or improved by a measurable or noticeable amount over the same factor of the plant produced under the same conditions, but without the application of the mixtures of the present invention. Enhanced quality can be characterized, among others, by following improved properties of the plant or its product: increased nutrient content; and/or increased protein content; and/or increased oil content; and/or increased starch content; and/or increased content of fatty acids; and/or increased metabolite content; and/or increased carotenoid content; and/or increased sugar content; and/or increased amount of essential amino acids; and/or improved nutrient composition; and/or improved protein composition; and/or improved composition of fatty acids; and/or improved metabolite composition; and/or improved carotenoid composition; and/or improved sugar composition; and/or improved amino acids composition; and/or improved or optimal fruit color; and/or improved leaf color; and/or higher storage capacity; and/or better processability of the harvested products.

Another indicator for the condition of the plant is the plant's tolerance or resistance to biotic and/or abiotic stress factors. Biotic and abiotic stress, especially over longer terms, can have harmful effects on plants.

Biotic stress is caused by living organisms while abiotic stress is caused for example by environmental extremes. According to the present invention, "enhanced tolerance or resistance to biotic and/or abiotic stress factors" means (1.) that certain negative factors caused by biotic and/or abiotic stress are diminished in a measurable or noticeable amount as compared to plants exposed to the same conditions, but without being treated with an inventive mixture and (2.) that the negative effects are not diminished by a direct action of the inventive mixture on the stress factors, e.g. by its fungicidal or insecticidal action which directly destroys the microorganisms or pests, but rather by a stimulation of the plants' own defensive reactions against said stress factors.

Negative factors caused by biotic stress such as pathogens and pests are widely known and are caused by living organisms, such as competing plants (for example weeds), microorganisms (such as phythopathogenic fungi and/or bacteria) and/or viruses.

Negative factors caused by abiotic stress are also well-known and can often be observed as reduced plant vigor (see above), for example:

less yield and/or less vigor, for both effects examples can be burned leaves, less flowers, pre-mature ripening, later crop maturity, reduced nutritional value amongst others.

Abiotic stress can be caused for example by: extremes in temperature such as heat or cold (heat stress/cold stress); and/or strong variations in temperature; and/or temperatures unusual for the specific season; and/or drought (drought stress); and/or extreme wetness; and/or high salinity (salt stress); and/or radiation (for example by increased UV radiation due to the decreasing ozone layer); and/or increased ozone levels (ozone stress); and/or organic pollution (for example by phytotoxic amounts of pesticides); and/or inorganic pollution (for example by heavy metal contaminants).

As a result of biotic and/or abiotic stress factors, the quantity and the quality of the stressed plants decrease. As far as quality (as defined above) is concerned, reproductive development is usually severely affected with consequences on the crops which are important for fruits or seeds. Synthesis, accumulation and storage of proteins are mostly affected by temperature; growth is slowed by almost all types of stress; polysaccharide synthesis, both structural and storage is reduced or modified: these effects result in a decrease in biomass (yield) and in changes in the nutritional value of the product.

As pointed out above, the above identified indicators for the health condition of a plant may be interdependent and may result from each other. For example, an increased resistance to biotic and/or abiotic stress may lead to a better plant vigor, e.g. to better and bigger crops, and thus to an increased yield. Inversely, a more developed root system may result in an increased resistance to biotic and/or abiotic stress. However, these interdependencies and interactions are neither all known nor fully understood and therefore the different indicators are described separately.

In one embodiment the inventive mixtures effectuate an increased yield of a plant or its product.

In another embodiment the inventive mixtures effectuate an increased vigor of a plant or its product. In another embodiment the inventive mixtures effectuate in an increased quality of a plant or its product. In yet another embodiment the inventive mixtures effectuate an increased tolerance and/or resistance of a plant or its product against biotic stress. In yet another embodiment the inventive mixtures effectuate an increased tolerance and/or resistance of a plant or its product against abiotic stress.

The invention also relates to agrochemical compositions comprising an auxiliary and at least one compound I and at least one compound II, or a cell-free extract of compound II or at least one metabolite thereof having NI effect or UI effect, and/or a mutant of compound II having NI effect or UI effect and producing at least one metabolite as defined herein, or a metabolite or extract of the mutant according to the invention.

An agrochemical composition comprises a NI effective amount or plant health effective amount of compound I. Such an amount can vary in a broad range and is dependent on various factors, e.g. weather, target species, locus, mode of application, soil type, the treated cultivated plant or material and the climatic conditions.

An agrochemical composition comprises a UI effective or plant health effective amount of compound II, or a cell-free extract thereof or at least one metabolite thereof having urease-inhibiting activity, and/or a mutant of compound II having urease-inhibiting activity and producing at least one metabolite as defined herein, or a urease inhibitor metabolite or extract of the mutant. Such an amount can vary in a broad range and is dependent on various factors, such as the fungal or pest species to be controlled, the treated cultivated plant or material, the climatic conditions.

According to one embodiment, individual components of the composition according to the invention such as parts of a kit or parts of a binary or ternary mixture may be mixed by the user himself in a spray tank or any other kind of vessel used for applications (e.g seed treater drums, seed pelleting machinery, knapsack sprayer) and further auxiliaries may be added, if appropriate. When living microorganisms form part of such kit, it must be taken care that choice and amounts of the other parts of the kit (e.g. chemical pesticidal agents) and of the further auxiliaries should not influence the viability of the microbial pesticides in the composition mixed by the user. Especially for bactericides and solvents, compatibility with the respective microbial pesticide has to be taken into account.

Consequently, one embodiment of the invention is a kit for preparing a usable pesticidal composition, the kit comprising a) a composition comprising compound I as defined herein and at least one auxiliary; and b) a composition comprising compound II as defined herein and at least one auxiliary; and optionally c) a composition comprising at least one auxiliary and optionally a further active component III as defined herein.

The compounds or mixtures or compositions according to the invention can be converted into customary types of agrochemical compositions, e.g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones. Suitable anti-freezing agents are ethylene glycol, propylene glycol, urea and glycerin. Suitable anti-foaming agents are silicones, long chain alcohols, and salts of fatty acids. Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants). Suitable tackifiers or binders are polyvinylpyrrolidons, polyvinylacetates, polyvinyl alcohols, polyacrylates, biological or synthetic waxes, and cellulose ethers.

When living microorganisms form part of the compositions, such compositions can be prepared as compositions comprising besides the active ingredients at least one auxiliary (inert ingredient) by usual means (see e.g. H. D. Burges: Formulation of Micobial Biopesticides, Springer, 1998). Suitable customary types of such compositions are suspensions, dusts, powders, pastes, granules, pressings, capsules, and mixtures thereof. Examples for composition types are suspensions (e.g. SC, OD, FS), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). Herein, it has to be taken into account that each formulation type or choice of auxiliary should not influence the viability of the microorganism during storage of the composition and when finally applied to the soil, plant or plant propagation material. Suitable formulations are e.g. mentioned in WO2008/002371, U.S. Pat. Nos. 6,955,912, 5,422,107.

Examples for suitable auxiliaries are those mentioned earlier herein, wherein it must be taken care that choice and amounts of such auxiliaries should not influence the viability of the microbial pesticides in the composition. Especially for bactericides and solvents, compatibility with the respective microorganism of the respective microbial pesticide has to be taken into account. In addition, compositions with microbial pesticides may further contain stabilizers or nutrients and UV protectants. Suitable stabilizers or nutrients are e.g. alpha-tocopherol, trehalose, glutamate, potassium sorbate, various sugars like glucose, sucrose, lactose and maltodextrine (H. D. Burges: Formulation of Micobial Biopesticides, Springer, 1998). Suitable UV protectants are e.g. inorganic compounds like titan dioxide, zinc oxide and iron oxide pigments or organic compounds like benzophenones, benzotriazoles and phenyltriazines. The compositions may in addition to auxiliaries mentioned for compositions comprising compounds I herein optionally comprise 0.1-80% stabilizers or nutrients and 0.1-10% UV protectants.

Examples for composition types and their preparation are:

i) Water-Soluble Concentrates (SL, LS)
   10-60 wt % of a compound I and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible Concentrates (DC)
   5-25 wt % of a compound I and 1-10 wt % dispersant (e.g. polyvinylpyrrolidone) are dissolved in organic solvent (e.g. cyclohexanone) ad 100 wt %. Dilution with water gives a dispersion.

iii) Emulsifiable Concentrates (EC)
   15-70 wt % of a compound I and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)
   5-40 wt % of a compound I and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)
   In an agitated ball mill, 20-60 wt % of a compound I are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type composition up to 40 wt % binder (e.g. polyvinylalcohol) is added.

vi) Water-Dispersible Granules and Water-Soluble Granules (WG, SG)
   50-80 wt % of a compound I are ground finely with addition of dispersants and wetting agents (e.g. sodium lignosulfonate and alcohol ethoxylate) ad 100 wt % and prepared as water-dispersible or water-soluble granules by means of technical appliances (e.g. extrusion, spray tower, fluidized bed). Dilution with water gives a stable dispersion or solution of the active substance.

vii) Water-Dispersible Powders and Water-Soluble Powders (WP, SP, WS)
   50-80 wt % of a compound I are ground in a rotor-stator mill with addition of 1-5 wt % dispersants (e.g. sodium lignosulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)
   In an agitated ball mill, 5-25 wt % of a compound I are comminuted with addition of 3-10 wt % dispersants (e.g. sodium lignosulfonate), 1-5 wt % thickener (e.g. carboxymethylcellulose) and water ad 100 wt % to give a fine suspension of the active substance. Dilution with water gives a stable suspension of the active substance.

ix) Microemulsion (ME)
   5-20 wt % of a compound I are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamically stable microemulsion.

x) Microcapsules (CS)

An oil phase comprising 5-50 wt % of a compound I, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a compound I according to the invention, 0-40 wt % water insoluble organic solvent (e.g. aromatic hydrocarbon), and an isocyanate monomer (e.g. diphenylmethene-4, 4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS composition.

xi) Dustable Powders (DP, DS)

1-10 wt % of a compound I are ground finely and mixed intimately with solid carrier (e.g. finely divided kaolin) ad 100 wt %.

xii) Granules (GR, FG)

0.5-30 wt % of a compound I is ground finely and associated with solid carrier (e.g. silicate) ad 100 wt %. Granulation is achieved by extrusion, spray-drying or fluidized bed.

xiii) Ultra-Low Volume Liquids (UL)

1-50 wt % of a compound I are dissolved in organic solvent (e.g. aromatic hydrocarbon) ad 100 wt %.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The compositions types i) to vii) may optionally comprise further auxiliaries, such as 0.1-1 wt % bactericides, 5-15 wt % anti-freezing agents, 0.1-1 wt % anti-foaming agents, 0.1-80% stabilizers or nutrients, 0.1-10% UV protectants and 0.1-1 wt % colorants.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally are characterized in that they contain an effective quantity of the active components as defined above. Generally, they contain between 0.01 and 95%, preferably between 0.1 and 90%, and in particular between 0.5 and 75%, by weight of active components, in particular active substances.

Solutions for seed treatment (LS), suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds.

Preferred examples of seed treatment formulation types or soil application for pre-mix compositions are of WS, LS, ES, FS, WG or CS-type.

The compositions in question give, after two-to-tenfold dilution, active components concentrations of from 0.01 to 60% by weight, preferably from 0.1 to 40%, in the ready-to-use preparations. Application can be carried out before or during sowing. Methods for applying or treating compound I and compound II and compositions thereof, respectively, on to plant propagation material, especially seeds include dressing, coating, pelleting, dusting, soaking and in-furrow application methods of the propagation material. Preferably, compound I and compound II or the compositions thereof, respectively, are applied on to the plant propagation material by a method such that germination is not induced, e.g. by seed dressing, pelleting, coating and dusting.

Typically, a pre-mix formulation for seed treatment application comprises 0.5 to 99.9 percent, especially 1 to 95 percent, of the desired ingredients, and 99.5 to 0.1 percent, especially 99 to 5 percent, of a solid or liquid adjuvant (including, for example, a solvent such as water), where the auxiliaries can be a surfactant in an amount of 0 to 50 percent, especially 0.5 to 40 percent, based on the pre-mix formulation. Whereas commercial products will preferably be formulated as concentrates (e.g., pre-mix composition (formulation)), the end user will normally employ dilute formulations (e.g., tank mix composition).

Seed treatment methods for applying or treating inventive mixtures and compositions thereof to plant propagation material, especially seeds, are known in the art, and include dressing, coating, filmcoating, pelleting and soaking application methods of the propagation material.

Such methods are also applicable to the combinations according to the invention. In a preferred embodiment, the inventive mixture is applied or treated on to the plant propagation material by a method such that the germination is not negatively impacted. Accordingly, examples of suitable methods for applying (or treating) a plant propagation material, such as a seed, is seed dressing, seed coating or seed pelleting and alike.

It is preferred that the plant propagation material is a seed, seed piece (i.e. stalk) or seed bulb.

Although it is believed that the present method can be applied to a seed in any physiological state, it is preferred that the seed be in a sufficiently durable state that it incurs no damage during the treatment process. Typically, the seed would be a seed that had been harvested from the field; removed from the plant; and separated from any cob, stalk, outer husk, and surrounding pulp or other non-seed plant material. The seed would preferably also be biologically stable to the extent that the treatment would cause no biological damage to the seed. It is believed that the treatment can be applied to the seed at any time between harvest of the seed and sowing of the seed or during the sowing process (seed directed applications). The seed may also be primed either before or after the treatment.

Even distribution of the ingredients in inventive mixtures and adherence thereof to the seeds is desired during propagation material treatment. Treatment could vary from a thin film (dressing) of the formulation containing the combination, for example, a mixture of active ingredient(s), on a plant propagation material, such as a seed, where the original size and/or shape are recognizable to an intermediary state (such as a coating) and then to a thicker film (such as pelleting with many layers of different materials (such as carriers, for example, clays; different formulations, such as of other active ingredients; polymers; and colourants) where the original shape and/or size of the seed is no longer recognizable.

An aspect of the present invention includes application of the inventive mixtures onto the plant propagation material in a targeted fashion, including positioning the ingredients in the combination onto the entire plant propagation material or on only parts thereof, including on only a single side or a portion of a single side. One of ordinary skill in the art would understand these application methods from the description provided in EP954213B1 and WO06/112700.

The inventive mixtures can also be used in form of a "pill" or "pellet" or a suitable substrate and placing, or sowing, the treated pill, or substrate, next to a plant propagation material. Such techniques are known in the art, particularly in EP1124414, WO07/67042, and WO07/67044. Application of the combinations described herein onto plant propagation material also includes protecting the plant propagation material treated with the combination of the present invention by placing one or more pesticide-containing particles next to a pesticide-treated seed, wherein the amount of pesticide is such that the pesticide-treated seed and the pesticide-containing particles together contain an Effective Dose of the pesticide and the pesticide dose contained in the pesticide-treated seed is less than or equal to the Maximal Non-Phytotoxic Dose of the pesticide. Such techniques are known in the art, particularly in WO2005/120226.

Application of the combinations onto the seed also includes controlled release coatings on the seeds, wherein the ingredients of the combinations are incorporated into materials that release the ingredients over time. Examples of controlled release seed treatment technologies are generally known in the art and include polymer films, waxes, or other seed coatings, wherein the ingredients may be incorporated into the controlled release material or applied between layers of materials, or both.

Seed can be treated by applying thereto the compound s present in the inventive mixtures in any desired sequence or simultaneously.

The seed treatment occurs to an unsown seed, and the term "unsown seed" is meant to include seed at any period between the harvest of the seed and the sowing of the seed in the ground for the purpose of germination and growth of the plant.

Treatment to an unsown seed is not meant to include those practices in which the active ingredient is applied to the soil but would include any application practice that would target the seed during the planting process.

Preferably, the treatment occurs before sowing of the seed so that the sown seed has been pretreated with the combination. In particular, seed coating or seed pelleting are preferred in the treatment of the combinations according to the invention. As a result of the treatment, the ingredients in each combination are adhered on to the seed and therefore available for pest control.

The treated seeds can be stored, handled, sowed and tilled in the same manner as any other active ingredient treated seed.

In particular, the present invention relates to a method for protection of plant propagation material from pests and/or improving the health of plants grown from said plant propagation material, wherein the soil, wherein plant propagation material is sown, is treated with an effective amount of an inventive mixture.

In particular, the present invention relates to a method for protection of plant propagation material from pests, wherein the soil, wherein plant propagation material is sown, is treated with an effective amount of an inventive mixture.

In particular, the present invention relates to a method for protection of plant propagation material from harmful fungi, wherein the soil, wherein plant propagation material is sown, is treated with an effective amount of an inventive mixture.

In particular, the present invention relates to a method for protection of plant propagation material from animal pests (insects, acarids or nematodes), wherein the soil, wherein plant propagation material is sown, is treated with an effective amount of an inventive mixture.

In one embodiment, the treatment(s) are carried out as foliar application.

In another embodiment, the treatment(s) are carried out as soil application.

In one embodiment, the treatment(s) are carried out as seed treatment.

When employed in plant protection, the total amounts of active components applied are, depending on the kind of effect desired, from 0.001 to 10 kg per ha, preferably from 0.005 to 2 kg per ha, more preferably from 0.05 to 0.9 kg per ha, in particular from 0.1 to 0.75 kg per ha.

When employed in plant protection by seed treatment, the amount of the inventive mixtures (based on total weight of active components) is in the range from 0.01-10 kg, preferably from 0.1-1000 g, more preferably from 1-100 g per 100 kg of plant propagation material (preferably seeds).

When used in the protection of materials or stored products, the amount of active components applied depends on the kind of application area and on the desired effect. Amounts customarily applied in the protection of materials are 0.001 g to 2 kg, preferably 0.005 g to 1 kg, of active components per cubic meter of treated material.

Various types of oils, wetters, adjuvants, fertilizer, or micronutrients, and further pesticides (e.g. herbicides, insecticides, fungicides, growth regulators, safeners, biopesticides) may be added to the mixtures or compositions comprising them as premix or, if appropriate not until immediately prior to use (tank mix). These agents can be admixed with the mixtures or compositions according to the invention in a weight ratio of 1:100 to 100:1, preferably 1:10 to 10:1.

According to one embodiment, a polyether polymethylsiloxane copolymer may be added to the mixture or composition according to the invention, preferably in a weight ratio of 1:100 to 100:1, more preferably in a weight ratio of 1:10 to 10:1, in particular in a weight ratio of 1:5 to 5:1 based on the total weight of the compound I and compound II.

According to a further embodiment, a mineral oil or a vegetable oil may be added to the mixture or composition according to the invention, preferably in a weight ratio of 1:100 to 100:1, more preferably in a weight ratio of 1:10 to 10:1, in particular in a weight ratio of 1:5 to 5:1 based on the total weight of compound I and compound II.

The user applies the mixture or composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

In one embodiment, the at least one compound I and the at least one compound II are applied simultaneously, either as a mixture or separately, or subsequently to the soil, the plant or the plant propagules.

Moreover, we have found that simultaneous, that is joint or separate, application of at least one active compound I and at least one active compound II or the successive application of at least one active compound I and at least one active compound II synergistically increase the efficacy for controlling pests or for improving the health of a plant or for inhibiting nitrification compared to the application of the individual components alone.

In one embodiment, compound I and compound II are present in a synergistically effective amount.

When applying at least one compound I and at least one compound II sequentially the time between both applications may vary e.g. between 2 hours to 7 days. Also a broader range is possible ranging from 0.25 hour to 30 days, preferably from 0.5 hour to 14 days, particularly from 1 hour to 7 days or from 1.5 hours to 5 days, even more preferred from 2 hours to 1 day.

In the mixtures and compositions, the compound ratios are advantageously chosen so as to produce a synergistic effect.

The term "synergstic effect" is understood to refer in particular to that defined by Colby's formula (Colby, S. R., "Calculating synergistic and antagonistic responses of herbicide combinations", Weeds, 15, pp. 20-22, 1967).

The term "synergistic effect" is also understood to refer to that defined by application of the Tammes method, (Tammes, P. M. L., "Isoboles, a graphic representation of synergism in pesticides", Netherl. J. Plant Pathol. 70, 1964).

In accordance with the present invention, the weight ratios and percentages used herein for a biological extract are based on the total weight of the dry content (solid material) of the respective extract(s).

For mixtures according to the invention comprising compound I (nitrification inhibitor) and compound II (UI), the weight ratio of compound I and compound II generally depends from the properties of the active substances used, usually it is in the range of from 1:1000 to 1000:1, regularly in the range of from 1:500 to 500:1, preferably in the range of from 1:250 to 250:1, more preferably in the range of from 1:100 to 100:1, most preferably in the range of from 1:70 to 70:1, particularly preferably in the range of from 1:50 to 50:1, particularly more preferably in the range of from 1:30 to 30:1, particularly most preferably in the range from 1:20 to 20:1, particularly in the range of from 1:15 to 15:1, especially preferably in the range of from 1:10 to 10:1, especially more preferably in the range of from 1:8 to 8:1, especially most preferably in the range of from 1:6.5 to 6.5:1, especially in the range of from 1:5 to 5:1, in particular preferably in the range of 1:4 to 4:1, in particular more preferably in the range of from 1:3 to 3:1, in particular most preferably in the range of from 2.5:1 to 1:2.5, in particular in the range of from 1:2 to 2:1, for example in the range of from 1:1.5 to 1.5:1. For mixtures according to the invention, the weight ratio of compound 1 and compound II generally depends from the properties of the active substances used, usually it is not more than 1000:1, regularly not more than 250:1, preferably not more than 100:1, more preferably not more than 50:1, most preferably not more than 30:1, particularly preferably not more than 15:1, particularly more preferably not more than 8:1, particularly most preferably not more than 4:1, particularly not more than 2:1, especially preferably not more than 1:1, especially more preferably not more than 1:2, especially most preferably not more than 1:4, especially not more than 1:8, in particular preferably not more than 1:15, in particular more preferably not more than 1:30, in particular most preferably not more than 1:50, in particular not more than 1:100, for example preferably not more than 1:250, for example not more than 1:1000. For mixtures according to the invention, the weight ratio of compound 1 and compound II generally depends from the properties of the active substances used, usually it is at least 1000:1, regularly at least 250:1, preferably at least 100:1, more preferably at least 50:1, most preferably at least 30:1, particularly preferably at least 15:1, particularly more preferably at least 8:1, particularly most preferably at least 4:1, particularly at least 2:1, especially preferably at least 1:1, especially more preferably at least 1:2, especially most preferably at least 1:4, especially at least 1:8, in particular preferably at least 1:15, in particular more preferably at least 1:30, in particular most preferably at least 1:50, in particular at least 1:100, for example preferably at least 1:250, for example at least 1:1000.

In another preferred embodiment, compound I and compound II are present in a weight ratio of from 250:1 to 1:250, preferably in a weight ratio of from 100:1 to 1:100, more preferably in a weight ratio of from 50:1 to 1:50, more preferably in a weight ratio of from 30:1 to 1:30, most preferably in a weight ratio of from 15:1 to 1:15, particularly in a weight ratio of from 8:1 to 1:8, particularly preferably in a weight ratio of from 4:1 to 1:4, particularly more preferably in a weight ratio of from 2:1 to 1:2, particularly most preferably in a weight ratio of from 1.5:1 to 1:1.5.

In another preferred embodiment, compound I and compound II are present in a weight ratio of from 250:1 to 1:250, preferably in a weight ratio of from 100:1 to 1:100, more preferably in a weight ratio of from 50:1 to 1:50, more preferably in a weight ratio of from 30:1 to 1:30, most preferably in a weight ratio of from 15:1 to 1:15, particularly in a weight ratio of from 8:1 to 1:8, particularly preferably in a weight ratio of from 4:1 to 1:4, particularly more preferably in a weight ratio of from 2:1 to 1:2, particularly most preferably in a weight ratio of from 1.5:1 to 1:1.5, wherein the total weight of compound II is based on the amount of the solid material (dry matter) of compound II.

In another preferred embodiment, compound I and compound II are present in a weight ratio of from 10000:1 to 1:100, preferably in a weight ratio of from 5000:1 to 6.5:1, more preferably in a weight ratio of from 1000:1 to 6.5:1, more preferably in a weight ratio of from 300:1 to 6.5:1, most preferably in a weight ratio of from 100:1 to 6.5:1, particularly in a weight ratio of from 75:1 to 6.5:1, particularly preferably in a weight ratio of from 55:1 to 6.5:1, particularly more preferably in a weight ratio of from 40:1 to 6.5:1, particularly most preferably in a weight ratio of from 25:1 to 6.5:1.

In another preferred embodiment, compound I and compound II are present in a weight ratio of from 10000:1 to 1:100, preferably in a weight ratio of from 5000:1 to 13:1, more preferably in a weight ratio of from 1000:1 to 13:1, more preferably in a weight ratio of from 300:1 to 13:1, most preferably in a weight ratio of from 100:1 to 13:1, particularly in a weight ratio of from 75:1 to 13:1, particularly preferably in a weight ratio of from 55:1 to 13:1, particularly more preferably in a weight ratio of from 40:1 to 13:1, particularly most preferably in a weight ratio of from 25:1 to 13:1.

In another preferred embodiment, compound I and compound II are present in a weight ratio of from 10000:1 to 1:100, preferably in a weight ratio of from 5000:1 to 19:1, more preferably in a weight ratio of from 1000:1 to 19:1, more preferably in a weight ratio of from 300:1 to 19:1, most preferably in a weight ratio of from 100:1 to 19:1, particularly in a weight ratio of from 75:1 to 19:1, particularly preferably in a weight ratio of from 55:1 to 19:1, particularly more preferably in a weight ratio of from 40:1 to 19:1, particularly most preferably in a weight ratio of from 25:1 to 19:1

In another preferred embodiment, compound I and compound II are present in a weight ratio of from 10000:1 to 1:100, preferably in a weight ratio of from 5000:1 to 30:1, more preferably in a weight ratio of from 1000:1 to 30:1, more preferably in a weight ratio of from 300:1 to 30:1, most preferably in a weight ratio of from 100:1 to 30:1, particularly in a weight ratio of from 75:1 to 30:1, particularly preferably in a weight ratio of from 55:1 to 30:1, particularly more preferably in a weight ratio of from 40:1 to 30:1.

In another preferred embodiment, compound I and compound II are present in a weight ratio of from 10000:1 to 1:100, preferably in a weight ratio of from 5000:1 to 45:1, more preferably in a weight ratio of from 1000:1 to 45:1, more preferably in a weight ratio of from 300:1 to 45:1, most preferably in a weight ratio of from 100:1 to 45:1, particularly in a weight ratio of from 75:1 to 45:1, particularly preferably in a weight ratio of from 55:1 to 45:1.

In another preferred embodiment, compound I and compound II are present in a weight ratio of from 150:1 to 6.5:1, preferably in a weight ratio of from 100:1 to 19:1, more preferably in a weight ratio of from 75:1 to 25:1, more preferably in a weight ratio of from 70:1 to 30:1, most preferably in a weight ratio of from 65:1 to 35:1, particularly in a weight ratio of from 60:1 to 40:1, particularly preferably in a weight ratio of from 55:1 to 45:1, particularly more preferably in a weight ratio of from 53:1 to 47:1.

In another preferred embodiment, compound I and compound II are present in a weight ratio of from 200:1 to 6.5:1, preferably in a weight ratio of from 120:1 to 13:1, more preferably in a weight ratio of from 75:1 to 19:1, more preferably in a weight ratio of from 60:1 to 19:1, most preferably in a weight ratio of from 50:1 to 22:1, particularly in a weight ratio of from 45:1 to 25:1, particularly preferably in a weight ratio of from 40:1 to 30:1, particularly more preferably in a weight ratio of from 38:1 to 32:1.

In another preferred embodiment, compound I and compound II are present in a weight ratio of from 150:1 to 1:1, preferably in a weight ratio of from 70:1 to 6.5:1, more preferably in a weight ratio of from 45:1 to 8:1, more preferably in a weight ratio of from 40:1 to 10:1, most preferably in a weight ratio of from 35:1 to 13:1, particularly in a weight ratio of from 30:1 to 15:1, particularly preferably in a weight ratio of from 25:1 to 17:1, particularly more preferably in a weight ratio of from 23:1 to 19:1.

In another preferred embodiment, compound I and compound II are present in a weight ratio of from 60:1 to 1:100, preferably in a weight ratio of from 60:1 to 1:10, more preferably in a weight ratio of from 60:1 to 1:1, more preferably in a weight ratio of from 60:1 to 3:1, most preferably in a weight ratio of from 60:1 to 6.5:1, particularly in a weight ratio of from 60:1 to 13:1, particularly preferably in a weight ratio of from 60:1 to 19:1, particularly more preferably in a weight ratio of from 60:1 to 25:1, particularly most preferably in a weight ratio of from 60:1 to 30:1, for example preferably in a weight ratio of from 60:1 to 35:1, for example more preferably in a weight ratio of from 60:1 to 40:1, for example in a weight ratio of from 60:1 to 45:1.

In another preferred embodiment, compound I and compound II are present in a weight ratio of from 45:1 to 1:100, preferably in a weight ratio of from 45:1 to 1:10, more preferably in a weight ratio of from 45:1 to 1:1, more preferably in a weight ratio of from 45:1 to 3:1, most preferably in a weight ratio of from 45:1 to 6.5:1, particularly in a weight ratio of from 45:1 to 13:1, particularly preferably in a weight ratio of from 45:1 to 19:1, particularly more preferably in a weight ratio of from 45:1 to 25:1, particularly most preferably in a weight ratio of from 45:1 to 30:1, for example in a weight ratio of from 45:1 to 35:1. In another preferred embodiment, compound I and compound II are present in a weight ratio of from 30:1 to 1:100, preferably in a weight ratio of from 30:1 to 1:10, more preferably in a weight ratio of from 30:1 to 1:1, more preferably in a weight ratio of from 30:1 to 3:1, most preferably in a weight ratio of from 30:1 to 6.5:1, particularly in a weight ratio of from 30:1 to 13:1, particularly preferably in a weight ratio of from 30:1 to 19:1, particularly more preferably in a weight ratio of from 30:1 to 25:1.

According to a further embodiments of the binary mixtures and compositions, the weight ratio of the compound I and the compound II usually is in the range of from 1000:1 to 1:1, often in the range of from 100:1 to 1:1, regularly in the range of from 50:1 to 1:1, preferably in the range of from 20:1 to 1:1, more preferably in the range of from 10:1 to 1:1, even more preferably in the range of from 4:1 to 1:1 and in particular in the range of from 2:1 to 1:1.

According to a further embodiments of the binary mixtures and compositions, the weight ratio of the compound I and the compound II usually is in the range of from 1:1 to 1:1000, often in the range of from 1:1 to 1:100, regularly in the range of from 1:1 to 1:50, preferably in the range of from 1:1 to 1:20, more preferably in the range of from 1:1 to 1:10, even more preferably in the range of from 1:1 to 1:4 and in particular in the range of from 1:1 to 1:2.

According to further embodiments of the mixtures and compositions, the weight ratio of the compound I and the compound II generally depends from the properties of the active components used, usually it is in the range of from 1:10,000 to 10,000:1, regularly in the range of from 1:100 to 10,000:1, preferably in the range of from 1:100 to 5,000:1, more preferably in the range of from 1:1 to 1,000:1, even more preferably in the range of from 1:1 to 500:1 and in particular in the range of from 10:1 to 300:1.

According to further embodiments of the mixtures and compositions, the weight ratio of the compound I and the compound II usually is in the range of from 20,000:1 to 1:10, often in the range of from 10,000:1 to 1:1, regularly in the range of from 5,000:1 to 5:1, preferably in the range of from 5,000:1 to 10:1, more preferably in the range of from 2,000:1 to 30:1, even more preferably in the range of from 2,000:1 to 100:1 and in particular in the range of from 1,000:1 to 100:1

According to further embodiments of the mixtures and compositions, the weight ratio of the compound I and the compound II usually is in the range of from 1:20,000 to 10:1, often in the range of from 1:10,000 to 1:1, regularly in the range of from 1:5,000 to 1:5, preferably in the range of from 1:5,000 to 1:10, more preferably in the range of from 1:2,000 to 1:30, even more preferably in the range of from 1:2,000 to 1:100 and in particular in the range of from 1:1,000 to 1:100.

In the ternary mixtures, i.e. compositions according to the invention comprising the compound I and compound II and a compound III, the weight ratio of compound I and compound II depends from the properties of the active substances used, usually it is in the range of from 1:100 to 100:1, regularly in the range of from 1:50 to 50:1, preferably in the range of from 1:20 to 20:1, more preferably in the range of from 1:10 to 10:1 and in particular in the range of from 1:4 to 4:1, and the weight ratio of compound I and compound III usually it is in the range of from 1:100 to 100:1, regularly in the range of from 1:50 to 50:1, preferably in the range of from 1:20 to 20:1, more preferably in the range of from 1:10 to 10:1 and in particular in the range of from 1:4 to 4:1

Any further active compounds are, if desired, added in a ratio of from 20:1 to 1:20 to the compound I.

These ratios are also suitable for inventive mixtures applied by seed treatment.

In further specific embodiments, the mixture or composition or kit-of-parts according to the present invention may additionally comprise a fertilizer. In case the mixture or kit-or-parts comprising compound I (nitrification inhibitor) and compound II (UI) is used together with a fertilizer, or when a mixture is provided in combination with a fertilizer, such mixtures may be provided or used as agrochemical mixtures.

In the terms of the present invention "agrochemical mixture" means a combination of at least three or more compounds. The term is, however, not restricted to a physical mixture comprising three or more compounds, but refers to any preparation form of said compounds, the use of which many be time- and/or locus-related.

The agrochemical mixtures may, for example, be formulated separately but applied in a temporal relationship, i.e. simultaneously or subsequently, the subsequent application having a time interval which allows a combined action of the compounds.

Furthermore, the individual compounds of the agrochemical mixtures according to the invention such as parts of a kit or parts of the mixture may be mixed by the user himself in a suitable mixing device. In specific embodiments further auxiliaries may be added, if appropriate.

The term "fertilizers" is to be understood as chemical compounds applied to promote plant and fruit growth. Fertilizers are typically applied either through the soil (for uptake by plant roots), through soil substituents (also for uptake by plant roots), or by foliar feeding (for uptake through leaves). The term also includes mixtures of one or more different types of fertilizers as mentioned below.

The term "fertilizers" can be subdivided into several categories including: a) organic fertilizers (composed of plant/animal matter), b) inorganic fertilizers (composed of chemicals and minerals) and c) urea-containing fertilizers.

Organic fertilizers include manure, e.g. liquid manure, semi-liquid manure, biogas manure, stable manure or straw manure, slurry, liquid dungwater, sewage sludge, worm castings, peat, seaweed, compost, sewage, and guano. Green manure crops (cover crops) are also regularly grown to add nutrients (especially nitrogen) to the soil. Manufactured organic fertilizers include e.g. compost, blood meal, bone meal and seaweed extracts. Further examples are enzyme digested proteins, fish meal, and feather meal. The decomposing crop residue from prior years is another source of fertility.

Inorganic fertilizers are usually manufactured through chemical processes (such as e.g. the Haber-Bosch process), also using naturally occurring deposits, while chemically altering them (e.g. concentrated triple superphosphate). Naturally occurring inorganic fertilizers include Chilean sodium nitrate, mine rock phosphate, limestone, sulfate of potash, muriate of potash, and raw potash fertilizers.

Typical solid fertilizers are in a crystalline, prilled or granulated form. Typical nitrogen containing inorganic fertilizers are ammonium nitrate, calcium ammonium nitrate, ammonium sulfate, ammonium sulfate nitrate, calcium nitrate, diammonium phosphate, monoammonium phosphate, ammonium thio sulfate and calcium cyanamide.

The inorganic fertilizer may be an NPK fertilizer. "NPK fertilizers" are inorganic fertilizers formulated in appropriate concentrations and combinations comprising the three main nutrients nitrogen (N), phosphorus (P) and potassium (K) as well as typically S, Mg, Ca, and trace elements. "NK fertilizers" comprise the two main nutrients nitrogen (N) and potassium (K) as well as typically S, Mg, Ca, and trace elements. "NP fertilizers" comprise the two main nutrients nitrogen (N) and phosphorus (P) as well as typically S, Mg, Ca, and trace elements.

Urea-containing fertilizer may, in specific embodiments, be formaldehyde urea, UAN, urea sulfur, stabilized urea, urea based NPK-fertilizers, or urea ammonium sulfate. Also envisaged is the use of urea as fertilizer. In case urea-containing fertilizers or urea are used or provided, it is particularly preferred that urease inhibitors as defined herein above may be added or additionally be present, or be used at the same time or in connection with the urea-containing fertilizers.

Fertilizers may be provided in any suitable form, e.g. as coated or uncoated granules, in liquid or semi-liquid form, as sprayable fertilizer, or via fertigation etc.

Coated fertilizers may be provided with a wide range of materials. Coatings may, for example, be applied to granular or prilled nitrogen (N) fertilizer or to multi-nutrient fertilizers. Typically, urea is used as base material for most coated fertilizers. The present invention, however, also envisages the use of other base materials for coated fertilizers, any one of the fertilizer materials defined herein. In certain embodiments, elemental sulfur may be used as fertilizer coating. The coating may be performed by spraying molten S over urea granules, followed by an application of sealant wax to close fissures in the coating. In a further embodiment, the S layer may be covered with a layer of organic polymers, preferably a thin layer of organic polymers. In another embodiment, the coated fertilizers are preferably physical mixtures of coated and non-coated fertilizers.

Further envisaged coated fertilizers may be provided by reacting resin-based polymers on the surface of the fertilizer granule. A further example of providing coated fertilizers includes the use of low permeability polyethylene polymers in combination with high permeability coatings.

In specific embodiments the composition and/or thickness of the fertilizer coating may be adjusted to control, for example, the nutrient release rate for specific applications. The duration of nutrient release from specific fertilizers may vary, e.g. from several weeks to many months. The presence of nitrification inhibitors and compound II (UI) in a mixture with coated fertilizers may accordingly be adapted. It is, in particular, envisaged that the nutrient release involves or is accompanied by the release of a nitrification inhibitor and compound II (Up according to the present invention.

Coated fertilizers may be provided as controlled release fertilizers (CRFs). In specific embodiments these controlled release fertilizers are fully coated N—P—K fertilizers, which are homogeneous and which typically show a pre-defined longevity of release. In further embodiments, the CRFs may be provided as blended controlled release fertilizer products which may contain coated, uncoated and/or slow release components. In certain embodiments, these coated fertilizers may additionally comprise micronutrients. In specific embodiments these fertilizers may show a pre-defined longevity, e.g. in case of N—P—K fertilizers.

Additionally envisaged examples of CRFs include patterned release fertilizers. These fertilizers typically show a pre-defined release patterns (e.g. hi/standard/lo) and a pre-defined longevity. In exemplary embodiments fully coated N—P—K, Mg and micronutrients may be delivered in a patterned release manner.

Also envisaged are double coating approaches or coated fertilizers based on a programmed release.

In further embodiments the fertilizer mixture may be provided as, or may comprise or contain a slow release fertilizer. The fertilizer may, for example, be released over any suitable period of time, e.g. over a period of 1 to 5 months, preferably up to 3 months. Typical examples of ingredients of slow release fertilizers are IBDU (isobutylidenediurea), e.g. containing about 31-32% nitrogen, of which 90% is water insoluble; or UF, i.e. an urea-formaldehyde product which contains about 38% nitrogen of which about 70% may be provided as water insoluble nitrogen; or CDU (crotonylidene diurea) containing about 32% nitrogen; or MU (methylene urea) containing about 38 to 40% nitrogen, of which 25-60% is typically cold water insoluble nitrogen; or MDU (methylene diurea) containing about 40% nitrogen, of which less than 25% is cold water insoluble nitrogen; or MO (methylol urea) containing about 30% nitrogen, which may typically be used in solutions; or DMTU (dimethylene triurea) containing about 40% nitrogen, of which less than 25% is cold water insoluble nitrogen; or TMTU (tri methylene tetraurea), which may be provided as component of UF products; or TMPU (tri methylene pentaurea), which may also be provided as component of UF products; or UT (urea triazone solution) which typically contains about 28% nitrogen. The fertilizer mixture may also be long-term nitrogen-bearing fertiliser containing a mixture of acetylene diurea and at least one other organic nitrogen-bearing fertiliser selected from methylene urea, isobutylidene diurea, crotonylidene diurea, substituted triazones, triuret or mixtures thereof.

Any of the above mentioned fertilizers or fertilizer forms may suitably be combined. For instance, slow release fertilizers may be provided as coated fertilizers. They may also be combined with other fertilizers or fertilizer types. The same applies to the presence of a nitrification inhibitor or compound II (UI) according to the present invention, which may be adapted to the form and chemical nature of the fertilizer and accordingly be provided such that its release accompanies the release of the fertilizer, e.g. is released at the same time or with the same frequency. The present invention further envisages fertilizer or fertilizer forms as defined herein above in combination with nitrification inhibitors as defined herein above and compound II (UI) and further in combination with urease inhibitors as defined herein above. Such combinations may be provided as coated or uncoated forms and/or as slow or fast release forms. Preferred are combinations with slow release fertilizers including a coating. In further embodiments, also different release schemes are envisaged, e.g. a slower or a faster release.

The term "fertigation" as used herein refers to the application of fertilizers, optionally soil amendments, and optionally other water-soluble products together with water through an irrigation system to a plant or to the locus where a plant is growing or is intended to grow, or to a soil substituent as defined herein below. For example, liquid fertilizers or dissolved fertilizers may be provided via fertigation directly to a plant or a locus where a plant is growing or is intended to grow. Likewise, nitrification inhibitors according to the present invention, or in combination with additional nitrification inhibitors, may be provided via fertigation to plants or to a locus where a plant is growing or is intended to grow. Fertilizers and nitrification inhibitors according to the present invention, or in combination with additional nitrification inhibitors, may be provided together, e.g. dissolved in the same charge or load of material (typically water) to be irrigated. In further embodiments, fertilizers and nitrification inhibitors may be provided at different points in time. For example, the fertilizer may be fertigated first, followed by the the mixture or composition of the present invention, or preferably, the mixture or composition of the present invention may be fertigated first, followed by the fertilizer. The time intervals for these activities follow the herein above outlined time intervals for the application of fertilizers and nitrification inhibitors, for example in a time interval of from 0.25 hour to 30 days, preferably from 0.5 hour to 14 days, particularly from 1 hour to 7 days or from 1.5 hours to 5 days, even more preferred from 2 hours to 1 day. Also envisaged is a repeated fertigation of fertilizers and mixtures or compositions of the present invention according to the present invention, either together or intermittently, e.g. every 2 hours, 6 hours, 12 hours, 24 hours, 2 days, 3 days, 4 days, 5 days, 6 days or more.

In a further preferred embodiment, the fertilizer may be applied first to the soil or to the plants, followed by the mixture or composition of the present invention, or preferably, the mixture or composition of the present invention may be applied first to the soil or to the plants, followed by the fertilizer. The time intervals for these activities follow the herein above outlined time intervals for the application of fertilizers and nitrification inhibitors, for example in a time interval of from 0.25 hour to 30 days, preferably from 0.5 hour to 14 days, particularly from 1 hour to 7 days or from 1.5 hours to 5 days, even more preferred from 2 hours to 1 day. Also envisaged is a repeated application of fertilizers and mixtures or compositions of the present invention according to the present invention, either together or intermittently, e.g. every 2 hours, 6 hours, 12 hours, 24 hours, 2 days, 3 days, 4 days, 5 days, 6 days or more.

In particularly preferred embodiments, the fertilizer is an ammonium-containing fertilizer.

The agrochemical mixture according to the present invention may comprise one fertilizer as defined herein above and one nitrification inhibitor as defined herein above and one compound II (UI) as defined herein above. In further embodiments, the agrochemical mixture according to the present invention may comprise at least one or more than one fertilizer as defined herein above, e.g. 2, 3, 4, 5, 6, 7, 8, 9, 10 or more different fertilizers (including inorganic, organic and urea-containing fertilizers) and at least one nitrification inhibitor as defined above and at least one compound II (UI) as defined herein above, preferably a combination as defined in the Tables 1 to 49.

In another group of embodiments the agrochemical mixture according to the present invention may comprise at least one or more than one nitrification inhibitor as defined herein above, preferably more than one nitrification inhibitor as defined above and at least one fertilizer as defined herein above and at least one compound II (UI) as defined herein above.

The term "at least one" is to be understood as 1, 2, 3 or more of the respective compound selected from the group consisting of fertilizers as defined herein above, and nitrification inhibitors as defined herein above (also designated as compound I), and urease inhibitors (also designated as compound II).

In addition to at least one fertilizer and at least one nitrification inhibitor as defined herein above and at least one compound II (UI), an agrochemical mixture may comprise further ingredients, compounds, active compounds or compositions or the like. For example, the agrochemical mixture may additionally comprise or composed with or on the basis of a carrier, e.g. an agrochemical carrier, preferably as defined herein. In further embodiments, the agrochemical mixture may further comprise at least one additional pesticidal compound. For example, the agrochemical mixture may additionally comprise at least one further compound selected from herbicides, insecticides, fungicides, growth regulators, biopesticides, urease inhibitors, nitrification inhibitors, and denitrification inhibitors.

In specific embodiments, the treatment may be carried out during all suitable growth stages of a plant as defined herein. For example, the treatment may be carried out during the BBCH principle growth stages.

The term "BBCH principal growth stage" refers to the extended BBCH-scale which is a system for a uniform coding of phenologically similar growth stages of all mono- and dicotyledonous plant species in which the entire developmental cycle of the plants is subdivided into clearly recognizable and distinguishable longer-lasting developmental phases. The BBCH-scale uses a decimal code system, which is divided into principal and secondary growth stages. The abbreviation BBCH derives from the Federal Biological Research Centre for Agriculture and Forestry (Germany), the Bundessortenamt (Germany) and the chemical industry.

In one embodiment the invention relates to a method for reducing nitrification comprising treating a plant growing on soil or soil substituents and/or the locus where the plant is growing or is intended to grow with a mixture or composition of the invention at a growth stage (GS) between GS 00 and GS>BBCH 99 of the plant (e.g. when fertilizing in fall after harvesting apples) and preferably between GS 00 and GS 65 BBCH of the plant.

In one embodiment the invention relates to a method for reducing nitrification comprising treating a plant growing on soil or soil substituents and/or the locus where the plant is growing or is intended to grow with a mixture or composition of the invention (referred to as mixture (Q) in the following) at a growth stage (GS) between GS 00 to GS 45, preferably between GS 00 and GS 40 BBCH of the plant.

In a preferred embodiment the invention relates to a method for reducing nitrification comprising treating a plant growing on soil or soil substituents and/or the locus where the plant is growing or is intended to grow with a mixture or composition of the invention at an early growth stage (GS), in particular a GS 00 to GS 05, or GS 00 to GS 10, or GS 00 to GS 15, or GS 00 to GS 20, or GS 00 to GS 25 or GS 00 to GS 33 BBCH of the plant. In particularly preferred embodiments, the method for reducing nitrification comprises treating a plant growing on soil or soil substituents and/or the locus where the plant is growing or is intended to grow with a mixture or composition of the invention during growth stages including GS 00.

In a further, specific embodiment of the invention, a mixture or composition of the invention is applied to a plant growing on soil or soil substituents and/or the locus where the plant is growing or is intended to grow at a growth stage between GS 00 and GS 55 BBCH, or of the plant.

In a further embodiment of the invention, a mixture or composition of the invention is applied to a plant growing on soil or soil substituents and/or the locus where the plant is growing or is intended to grow at the growth stage between GS 00 and GS 47 BBCH of the plant.

In one embodiment of the invention, a mixture or composition of the invention is applied to a plant growing on soil or soil substituents and/or the locus where the plant is growing or is intended to grow before at and at sowing, before emergence, and until harvest (GS 00 to GS 89 BBCH), or at a growth stage (GS) between GS 00 and GS 65 BBCH of the plant.

Experimental Details

Regarding the isomer ratio of DMPSA, as far as the DMPSA used in the experiments was the free acid of DMPSA, the DMPSA contains 70 to 90 wt.-% 2-(3,4-dimethyl-1H-pyrazol-1-yl)succinic acid ("DMPSA1") and 10 to 30 wt.-% 2-(4,5-dimethyl-1H-pyrazol-1-yl)succinic acid ("DMPSA2"), based on the total weight of all isomers of DMPSA. "Wt.-%" means "percent by weight".

Regarding the isomer ratio of DMPSA, as far as the DMPSA used in the experiments was the ammonium salt and/or potassium salt of DMPSA, these two salts of DMPSA contains approx. 82 to 86 wt.-% 2-(3,4-dimethyl-1H-pyrazol-1-yl)succinic acid ("DMPSA1") and approx 14 to 18 wt.-% 2-(4,5-dimethyl-1H-pyrazol-1-yl)succinic acid ("DMPSA2"), based on the total weight of all isomers of DMPSA. "Wt.-%" means "percent by weight".

The following abbreviations are used in the experimental details section:
NBPT=N-(n-butyl) thiophosphoric acid triamide
NPPT=N-(n-propyl) thiophosphoric acid triamide
DMPSA-di-NH4=Diammonium salt of DMPSA
DMPSA-K2=Dipotassium salt of DMPSA
% appl. N=Percentage of applied nitrogen
appl. Red.N=applied reduced nitrogen
appl. N=applied nitrogen
Comp. no.=Composition number
DAT #=number (#) of days after treatment
DMPSA-K2=Dipotassium salt of DMPSA
DMPSA-NH4 or DMPSA-di-NH4=Diammonium salt of DMPSA
Ha=urea
Limus=Mixture comprising approximately 75% by weight NBPT and approximately 25% by weight NPPT
MW=mean value
NI=nitrification inhibitor
red. N=reduced nitrogen
rel.=relative
sd=standard deviation
UI=urease inhibitor Incubation Experiment:
Measurement of the Nitrification-Inhibiting Effect:

100 g soil (incubated at 20° C. for two weeks to activate the microbial biomass) is filled into 500 ml plastic bottles (e.g. soil sampled from the field) and is moistened to 50% water holding capacity. 1 ml test solution, containing the compositions and mixtures of the invention in the appropriate concentration or DMSO and 10 mg nitrogen in the form of urea is added to the soil and everything mixed well. Bottles are capped but loosely to allow air exchange. The bottles are then incubated at 20 C for 0, 14 and/or 28 days.

For analysis, 300 ml of a 1% $K_2SO_4$-solution is added to the bottle containing the soil and shaken for 2 hrs in a horizontal shaker at 150 rpm. Then the whole solution is filtered through a Macherey-Nagel Filter MN 807 ¼. Ammonium and nitrate content is then analyzed in the filtrate in an autoanalyzer at 550 nm (Merck, AA11).

Calculations (DMPSA+UI trials only):

(Böhland equation)

$$\text{inhibition in \%} = \frac{(NO3-N_{without\ NI\ at\ end\ of\ incubation} - NO3-N_{with\ NI\ at\ end\ of\ incubation})}{(NO3-N_{without\ NI\ at\ end\ of\ incubation} - NO3-N_{at\ beginning})} \times 100$$

The Böhland equation is described in Böhland, H., et al. (1973) "Mittel zur Hemmung bzw. Regelung der Nitrifikation von Ammoniumstickstoff in Kulturböden". DDR-Wirtschaftspatent (Economic patent of the German Democratic Republic) C 05c 169 727. Cited by: Peschke, H. (1985) "Zur Bewertung der inhibierenden Wirkung von Nitrifiziden im Boden", Zbl. Mikrobiol. 140, pp. 583-588.

Volatilization Experiment:

The Urea-Stabilizing Effect Detected as the Volatile NH3 Losses from Soil Surface Applied Urea:

176 g air dried soil is filled into 500 mL laboratory bottle, which is then be watered with de-ionized water up to 50% of its water holding capacity and incubated at room temperature (about 21° C.) for 24 h.

Then 4×0.57 mL of a urea solution containing 80 mg of urea together with the test a.i. or not, is applied at 4 locations with a 1 mL pipette.

$NH_3$ free air blows constantly at a rate of about 4 L per min. through the bottle which bubbles through a scrubber solution which is periodically renewed and analyzed for $NH_4^+$ with an autoanalyzer.

If cumulated $NH_3$ losses due to a treatment is significantly lower than in the untreated control (urea only) which cannot be attributed to a pH effect in the solution than activity of a urease inhibitor has been demonstrated.

Greenhouse Experiment

Detection of Nitrous Oxide Losses:

On application day (DATO), each pot (with/without plants or algae) was set onto a plant saucer designed with an inner compartment for the pot and an outer ring that is filled with water. At time 0, water holding capacity of the soil was set to 60-70% prior to application with/without fertilizer and a.i. Subsequently, a gas sampling chamber was placed over the plant saucer such that the rim fit into the ring filled with water to create a gas-tight chamber and 25 cc air from the chamber were drawn into a syringe and immediately emptied in to a Vacutainer (Labco, 12 ml volume). This equals the Time 0 measurement for each pot. The same procedure was performed with all pots in the experiment. After two hour incubation time, again 25 cc air samples were taken from the gas chambers and emptied into Vacutainers as described above. Plants were then returned to their positions in the climate chamber. The procedure was repeated at precisely the same time of day for up to 19 days.

Samples were analyzed in a Shimadzu 2014 GC equipped with an ECD system.

TABLE A1

Nitrous oxide (N2O) emissions, overview on the samples used for the experiments

| Compound | a.i. | a.i. application rate [kg/ha] | a.i. application rate [% of red. N = urea] | Crop | Parameter |
|---|---|---|---|---|---|
| urea | — | 88 | | Ryegrass | N2O |
| DMPSA-di-NH4 | DMPSA | | 0.20 | | |
| DMPSA-di-NH4 | DMPSA | | 0.35 | | |
| DMPSA-di-NH4 | DMPSA | | 0.50 | | |
| DMPSA-K2 | DMPSA | | 0.20 | | |
| DMPSA-K2 | DMPSA | | 0.35 | | |
| DMPSA-K2 | DMPSA | | 0.50 | | |
| Limus | NBPT/NPPT | | 0.01 | | |
| — | NBPT | | 0.01 | | |

TABLE A2

Nitrous oxide (N2O) emissions, cumulated values µg N2O—N/m2*h

| | Fertilizer | | | | | | | |
|---|---|---|---|---|---|---|---|---|
| | 0 | urea | urea | urea | urea NI | urea | urea | urea |
| | 0 | DMPSA-NH4 0.50 | DMPSA-NH4 0.35 | DMPSA-NH4 0.20 UI | | DMPSA-NH4 0.50 | DMPSA-NH4 0.35 | DMPSA-NH4 0.20 |
| DAT | 0 | | | | Limus 0.01 | Limus 0.01 | Limus 0.01 | Limus 0.01 |
| 1 | 6.12 | 17.40 | 7.89 | 6.74 | 5.71 | 9.59 | 3.18 | 7.28 | 7.70 |
| 2 | 14.65 | 35.29 | 16.36 | 22.08 | 17.84 | 23.35 | 11.43 | 15.35 | 17.73 |
| 3 | 20.32 | 53.23 | 23.64 | 30.26 | 28.36 | 36.40 | 17.51 | 23.37 | 23.91 |
| 4 | 23.29 | 81.98 | 31.59 | 39.25 | 40.61 | 50.58 | 21.95 | 27.66 | 37.18 |
| 5 | 25.76 | 102.01 | 38.95 | 47.97 | 51.02 | 66.61 | 25.29 | 32.61 | 39.90 |
| 6 | 26.52 | 120.13 | 45.83 | 54.68 | 57.34 | 86.91 | 31.04 | 35.81 | 47.86 |
| 7 | 28.04 | 140.69 | 53.03 | 60.89 | 66.12 | 101.42 | 35.81 | 41.54 | 49.15 |
| 8 | 29.99 | 151.61 | 62.02 | 66.75 | 76.79 | 115.22 | 41.56 | 48.61 | 58.07 |
| 10 | 30.85 | 163.77 | 67.48 | 72.23 | 86.54 | 121.76 | 44.40 | 55.02 | 67.40 |
| 12 | 30.92 | 170.61 | 72.35 | 76.32 | 92.81 | 127.30 | 49.53 | 59.12 | 71.27 |
| 16 | 31.02 | 177.32 | 74.66 | 78.21 | 93.10 | 130.85 | 51.65 | 60.33 | 74.98 |
| 19 | 30.87 | 180.33 | 75.03 | 78.47 | 93.49 | 133.40 | 51.80 | 60.70 | 76.27 |
| % appl. N | 0.132 | 0.773 | 0.322 | 0.337 | 0.401 | 0.572 | 0.222 | 0.260 | 0.327 |

TABLE A3

Nitrous oxide (N2O) emissions, cumulated values μg N2O—N/m2*h

| | Fertilizer | | | | | | | |
|---|---|---|---|---|---|---|---|---|
| | urea | urea | urea | urea | urea<br>NI | urea | urea | urea |
| | | DMPSA-<br>NH4<br>0.50 | DMPSA-<br>NH4<br>0.35 | DMPSA-<br>NH4<br>0.20 | DMPSA-<br>K2<br>0.50<br>UI | DMPSA-<br>K2<br>0.35 | DMPSA-<br>K2<br>0.20 | DMPSA-<br>K2<br>0.50 |
| DAT | | NBPT<br>0.01 | NBPT<br>0.01 | NBPT<br>0.01 | NBPT<br>0.01 | | | Limus<br>0.01 |
| 1 | 9.77 | 5.70 | 7.11 | 9.01 | 7.62 | 7.74 | 8.97 | 4.67 |
| 2 | 27.42 | 13.51 | 20.03 | 24.39 | 20.18 | 18.94 | 19.30 | 14.64 |
| 3 | 40.07 | 19.37 | 30.41 | 36.91 | 30.31 | 29.26 | 29.75 | 22.55 |
| 4 | 53.70 | 25.71 | 40.41 | 46.56 | 37.69 | 37.09 | 37.16 | 29.84 |
| 5 | 68.86 | 29.50 | 46.98 | 51.69 | 46.97 | 46.55 | 45.99 | 35.24 |
| 6 | 89.16 | 33.18 | 52.22 | 58.14 | 52.44 | 52.67 | 52.71 | 38.46 |
| 7 | 109.04 | 40.92 | 57.16 | 68.01 | 62.57 | 60.12 | 60.65 | 44.44 |
| 8 | 127.94 | 46.24 | 63.58 | 76.56 | 72.03 | 70.52 | 68.52 | 48.97 |
| 10 | 133.95 | 49.67 | 70.27 | 83.24 | 79.00 | 77.77 | 77.59 | 52.34 |
| 12 | 140.07 | 50.86 | 74.88 | 88.45 | 82.43 | 81.35 | 85.15 | 54.54 |
| 16 | 143.31 | 51.73 | 77.43 | 91.92 | 84.05 | 84.12 | 87.97 | 57.26 |
| 19 | 146.30 | 52.22 | 78.80 | 93.20 | 84.28 | 84.94 | 88.83 | 59.37 |
| % appl. N | 0.628 | 0.224 | 0.338 | 0.400 | 0.361 | 0.364 | 0.381 | 0.255 |

TABLE A4

Nitrous oxide (N2O) emissions, cumulated values μg N2O-N/m2 * h

| | Fertilizer | | | | | | | | | |
|---|---|---|---|---|---|---|---|---|---|---|
| | urea | urea | urea<br>NI | urea | urea | urea | urea | urea<br>NI | urea | urea |
| | DMPSA-<br>K2 0.35 | DMPSA-<br>K2 0.20 | DMPSA-<br>K2 0.50<br>UI | DMPSA-<br>K2 0.35 | DMPSA-<br>K2 0.20 | DMPSA-<br>K2 0.35 | DMPSA-<br>K2 0.20 | DMPSA-<br>K2 0.50<br>UI | DMPSA-<br>K2 0.35 | DMPSA-<br>K2 0.20 |
| DAT | Limus<br>0.01 | Limus<br>0.01 | NBPT<br>0.01 | NBPT<br>0.01 | NBPT<br>0.01 | Limus<br>0.01 | Limus<br>0.01 | NBPT<br>0.01 | NBPT<br>0.01 | NBPT<br>0.01 |
| 1 | 5.19 | 8.34 | 7.24 | 8.09 | 11.04 | | | | | |
| 2 | 15.44 | 19.85 | 19.43 | 21.46 | 25.53 | | | | | |
| 3 | 22.94 | 27.85 | 30.06 | 32.17 | 40.14 | | | | | |
| 4 | 29.18 | 34.90 | 37.73 | 40.48 | 51.18 | | | | | |
| 5 | 34.98 | 41.80 | 46.18 | 48.15 | 54.24 | | | | | |
| 6 | 39.08 | 49.52 | 55.02 | 56.85 | 63.58 | | | | | |
| 7 | 44.49 | 59.03 | 60.08 | 62.53 | 66.06 | | | | | |
| 8 | 48.60 | 66.76 | 69.29 | 70.04 | 73.52 | | | | | |
| 10 | | | | | | 55.33 | 71.94 | 78.21 | 77.87 | 83.66 |
| 12 | | | | | | 59.89 | 76.13 | 82.60 | 83.13 | 90.33 |
| 16 | | | | | | 61.50 | 81.12 | 85.74 | 86.88 | 92.60 |
| 19 | | | | | | 62.69 | 83.74 | 86.53 | 88.95 | 95.00 |
| % appl. N | | | | | | 0.269 | 0.359 | 0.371 | 0.382 | 0.407 |

TABLE B1

NH3 emissions - Overview on the sample used

| Comp. No. | Composition | % NI rel. to urea | % UI (a.i.) rel. to urea | ratio NI:UI 1:x | urea amount mg/vessel. | n |
|---|---|---|---|---|---|---|
| 1 | Urea + 0.01% Limus | 0 | 0.01 | 0 | 80 | 1 |
| 2 | Urea + 0.01% NBPT/DMSO 1:20 | 0 | 0.01 | 0 | 80 | 1 |
| 3 | Urea | 0 | 0 | — | 80 | 1 |
| 4 | Urea + 0.20% DMPSA-di-NH4 | 0.20 | 0.00 | — | 80 | 2 |
| 5 | Urea + 0.25% DMPSA-di-NH4 | 0.25 | 0.00 | — | 80 | 2 |
| 6 | Urea + 0.30% DMPSA-di-NH4 | 0.30 | 0.00 | — | 80 | 2 |
| 7 | Urea + 0.35% DMPSA-di-NH4 | 0.35 | 0.00 | — | 80 | 2 |
| 8 | Urea + 0.40% DMPSA-di-NH4 | 0.40 | 0.00 | — | 80 | 2 |
| 9 | Urea + 0.50% DMPSA-di-NH4 | 0.50 | 0.00 | — | 80 | 2 |
| 10 | Urea + 0.20% DMPSA-K2 | 0.20 | 0.00 | — | 80 | 2 |
| 11 | Urea + 0.25% DMPSA-K2 | 0.25 | 0.00 | — | 80 | 2 |
| 12 | Urea + 0.30% DMPSA-K2 | 0.30 | 0.00 | — | 80 | 2 |

TABLE B1-continued

NH3 emissions - Overview on the sample used

| Comp. No. | Composition | % NI rel. to urea | % UI (a.i.) rel. to urea | ratio NI:UI 1:x | urea amount mg/vessel. | n |
|---|---|---|---|---|---|---|
| 13 | Urea + 0.35% DMPSA-K2 | 0.35 | 0.00 | — | 80 | 2 |
| 14 | Urea + 0.40% DMPSA-K2 | 0.40 | 0.00 | — | 80 | 2 |
| 15 | Urea + 0.50% DMPSA-K2 | 0.50 | 0.00 | — | 80 | 2 |
| 16 | Urea + 0.20% DMPSA-di-NH4 + 0.01% Limus | 0.20 | 0.01 | 20 | 80 | 2 |
| 17 | Urea + 0.25% DMPSA-di-NH4 + 0.01% Limus | 0.25 | 0.01 | 25 | 80 | 3 |
| 18 | Urea + 0.30% DMPSA-di-NH4 + 0.01% Limus | 0.30 | 0.01 | 30 | 80 | 3 |
| 19 | Urea + 0.35% DMPSA-di-NH4 + 0.01% Limus | 0.35 | 0.01 | 35 | 80 | 3 |
| 20 | Urea + 0.40% DMPSA-di-NH4 + 0.01% Limus | 0.40 | 0.01 | 40 | 80 | 3 |
| 21 | Urea + 0.50% DMPSA-di-NH4 + 0.01% Limus | 0.50 | 0.01 | 50 | 80 | 3 |
| 22 | Urea + 0.20% DMPSA-K2 + 0.01% Limus | 0.20 | 0.01 | 20 | 80 | 2 |
| 23 | Urea + 0.25% DMPSA-K2 + 0.01% Limus | 0.25 | 0.01 | 25 | 80 | 3 |
| 24 | Urea + 0.30% DMPSA-K2 + 0.01% Limus | 0.30 | 0.01 | 30 | 80 | 3 |
| 25 | Urea + 0.35% DMPSA-K2 + 0.01% Limus | 0.35 | 0.01 | 35 | 80 | 3 |
| 26 | Urea + 0.40% DMPSA-K2 + 0.01% Limus | 0.40 | 0.01 | 40 | 80 | 3 |
| 27 | Urea + 0.50% DMPSA-K2 + 0.01% Limus | 0.50 | 0.01 | 50 | 80 | 3 |
| 28 | Urea + 0.20% DMPSA-di-NH4 + 0.01% NBPT | 0.20 | 0.01 | 20 | 80 | 3 |
| 29 | Urea + 0.25% DMPSA-di-NH4 + 0.01% NBPT | 0.25 | 0.01 | 25 | 80 | 3 |
| 30 | Urea + 0.30% DMPSA-di-NH4 + 0.01% NBPT | 0.30 | 0.01 | 30 | 80 | 3 |
| 31 | Urea + 0.35% DMPSA-di-NH4 + 0.01% NBPT | 0.35 | 0.01 | 35 | 80 | 3 |
| 32 | Urea + 0.40% DMPSA-di-NH4 + 0.01% NBPT | 0.40 | 0.01 | 40 | 80 | 3 |
| 33 | Urea + 0.50% DMPSA-di-NH4 + 0.01% NBPT | 0.50 | 0.01 | 50 | 80 | 3 |

("n" in the Table B1 refers to the number of repetitions of the experiment)

TABLE B2

03 days and 07 days, cumulated NH3—N losses in % of applied urea-N

| Comp. No. | DAT03 MW | rel. values [% urea] | sd | DAT07 MW | rel. values [% urea] | sd |
|---|---|---|---|---|---|---|
| 1 | 0.5 | 11.3 | — | 2.3 | 8.2 | — |
| 2 | 0.6 | 12.4 | — | 3.4 | 12.2 | — |
| 3 | 4.5 | 100.0 | — | 28.1 | 100.0 | — |
| 4 | 3.0 | 66.6 | 0.5 | 24.5 | 87.2 | 2.0 |
| 5 | 3.2 | 72.1 | 0.2 | 25.3 | 90.2 | 0.0 |
| 6 | 3.2 | 72.8 | 0.1 | 26.8 | 95.3 | 1.3 |
| 7 | 2.8 | 62.8 | 0.1 | 26.1 | 93.0 | 0.2 |
| 8 | 2.6 | 58.5 | 0.4 | 25.0 | 89.0 | 0.6 |
| 9 | 2.2 | 50.3 | 0.5 | 21.2 | 75.7 | 4.7 |
| 10 | 4.5 | 101.5 | 0.0 | 27.3 | 97.2 | 0.6 |
| 11 | 5.3 | 117.9 | 0.1 | 28.8 | 102.7 | 0.1 |
| 12 | 5.2 | 116.5 | 0.7 | 29.2 | 103.9 | 3.2 |
| 13 | 4.5 | 100.5 | 1.3 | 25.4 | 90.4 | 4.5 |
| 14 | 5.2 | 116.0 | 0.1 | 27.6 | 98.2 | 2.3 |
| 15 | 3.5 | 78.6 | 4.2 | 25.2 | 89.7 | 6.2 |
| 16 | 0.3 | 6.6 | 0.0 | 2.5 | 9.0 | 0.4 |
| 17 | 0.3 | 7.5 | 0.0 | 3.0 | 10.6 | 0.4 |
| 18 | 0.3 | 7.5 | 0.1 | 2.7 | 9.7 | 0.4 |
| 19 | 0.3 | 7.4 | 0.1 | 3.2 | 11.4 | 1.3 |
| 20 | 0.3 | 6.6 | 0.1 | 3.0 | 10.7 | 0.7 |
| 21 | 0.3 | 6.4 | 0.1 | 2.8 | 10.0 | 0.6 |
| 22 | 0.5 | 12.1 | 0.2 | 3.8 | 13.4 | 0.7 |
| 23 | 0.6 | 12.8 | 0.2 | 3.6 | 12.7 | 0.3 |
| 24 | 0.6 | 13.2 | 0.1 | 3.9 | 13.8 | 0.3 |
| 25 | 0.6 | 13.9 | 0.1 | 3.9 | 14.0 | 0.4 |
| 26 | 0.6 | 14.4 | 0.2 | 3.8 | 13.7 | 0.2 |
| 27 | 0.5 | 10.7 | 0.1 | 3.4 | 12.3 | 0.5 |
| 28 | 0.3 | 7.7 | 0.1 | 3.9 | 13.9 | 0.1 |
| 29 | 0.4 | 7.9 | 0.1 | 3.4 | 12.0 | 0.2 |
| 30 | 0.3 | 6.8 | 0.1 | 3.0 | 10.8 | 0.3 |
| 31 | 0.3 | 7.2 | 0.1 | 3.4 | 12.1 | 0.2 |
| 32 | 0.3 | 7.7 | 0.1 | 3.4 | 12.0 | 0.6 |
| 33 | 0.4 | 9.1 | 0.1 | 3.5 | 12.6 | 0.3 |

TABLE B3

10 days and mean values of the 3 days (DAT03), 7 days data (DAT07) and 10 days data (DAT10), cumulated NH3-N losses in % of applied urea-N

| Comp. no. | DAT10 MW | rel. values [% urea] | sd | mean value DAT03, DAT07, DAT10 [% urea] | mean value reduction DAT03, DAT07, DAT10 [%] |
|---|---|---|---|---|---|
| 1 | 5.8 | 14.9 | — | 11.4 | 88.6 |
| 2 | 9.7 | 24.9 | — | 16.5 | 83.5 |
| 3 | 38.9 | 100.0 | — | | |
| 4 | 30.4 | 78.0 | 4.4 | 77.3 | 22.7 |
| 5 | 34.4 | 88.4 | 3.7 | 83.6 | 16.4 |
| 6 | 34.1 | 87.6 | 2.9 | 85.2 | 14.8 |
| 7 | 34.4 | 88.3 | 1.0 | 81.4 | 18.6 |
| 8 | 36.6 | 94.0 | 1.7 | 80.5 | 19.5 |
| 9 | 31.6 | 81.1 | 6.6 | 69.0 | 31.0 |
| 10 | 36.7 | 94.2 | 0.9 | 97.7 | 2.3 |
| 11 | 37.7 | 96.8 | 0.7 | 105.8 | −5.8 |
| 12 | 38.7 | 99.4 | 3.8 | 106.6 | −6.6 |
| 13 | 32.0 | 82.1 | 6.9 | 91.0 | 9.0 |
| 14 | 36.1 | 92.7 | 2.4 | 102.3 | −2.3 |
| 15 | 33.8 | 86.7 | 5.1 | 85.0 | 15.0 |
| 16 | 7.7 | 19.8 | 0.5 | 11.8 | 88.2 |
| 17 | 12.3 | 31.7 | 1.4 | 16.6 | 83.4 |
| 18 | 10.0 | 25.8 | 4.6 | 14.3 | 85.7 |
| 19 | 9.6 | 24.6 | 5.8 | 14.5 | 85.5 |
| 20 | 11.5 | 29.6 | 2.8 | 15.7 | 84.3 |
| 21 | 10.6 | 27.3 | 3.6 | 14.6 | 85.4 |
| 22 | 9.8 | 25.1 | 1.9 | 16.9 | 83.1 |
| 23 | 9.3 | 23.9 | 0.4 | 16.5 | 83.5 |
| 24 | 10.7 | 27.5 | 1.0 | 18.2 | 81.8 |
| 25 | 10.8 | 27.8 | 1.4 | 18.5 | 81.5 |
| 26 | 10.3 | 26.4 | 0.8 | 18.2 | 81.8 |
| 27 | 9.4 | 24.0 | 1.6 | 15.7 | 84.3 |
| 28 | 11.9 | 30.5 | 3.8 | 17.4 | 82.6 |
| 29 | 12.3 | 31.7 | 4.8 | 17.2 | 82.8 |
| 30 | 10.7 | 27.4 | 1.4 | 15.0 | 85.0 |
| 31 | 12.2 | 31.4 | 4.6 | 16.9 | 83.1 |
| 32 | 12.8 | 32.9 | 1.3 | 17.5 | 82.5 |
| 33 | 10.8 | 27.7 | 2.7 | 16.5 | 83.5 |

TABLE C1

NH4/NO3 Incubation test, overview on the samples

| Compound | a.i. | application rate [kg/ha] | a.i. application rate [% of red. N = urea] | Crop | Parameter |
|---|---|---|---|---|---|
| urea | — | 88 | | Ryegrass | N2O |
| DMPSA-di-NH4 | DMPSA | | 0.20 | | |
| DMPSA-di-NH4 | DMPSA | | 0.35 | | |
| DMPSA-di-NH4 | DMPSA | | 0.50 | | |
| DMPSA-K2 | DMPSA | | 0.20 | | |
| DMPSA-K2 | DMPSA | | 0.35 | | |
| DMPSA-K2 | DMPSA | | 0.50 | | |
| Limus | NBPT/NPPT | | 0.005 | | |
| Limus | NBPT/NPPT | | 0.01 | | |
| Limus | NBPT/NPPT | | 0.02 | | |
| NBPT | NBPT | | 0.01 | | |

TABLE C2

NH4/NO3 Incubation test, overview on the samples

| Comp. No. | | ratio NI:UI 1:x | % Limus rel. to urea | % NBPT rel. to urea | % NI rel. to urea | mg urea-N per 100 g soil | mg urea per 100 g soil |
|---|---|---|---|---|---|---|---|
| 1 | without N, without a.i. | — | — | — | — | 0 | 0 |
| 2 | Urea | — | — | — | — | 10 | 21.7 |
| 3 | Urea + Limus | 0 | 0.010 | — | — | 10 | 21.7 |
| 4 | Urea + Limus | 0 | 0.020 | — | — | 10 | 21.7 |
| 5 | Urea + Limus | 0 | 0.005 | — | — | 10 | 21.7 |
| 6 | Urea + NBPT/DMSO 1:20 | 0 | — | 0.01 | — | 10 | 21.7 |

TABLE C2-continued

NH4/NO3 Incubation test, overview on the samples

| Comp. No. | | ratio NI:UI 1:x | % Limus rel. to urea | % NBPT rel. to urea | % NI rel. to urea | mg urea-N per 100 g soil | mg urea per 100 g soil |
|---|---|---|---|---|---|---|---|
| 7 | Urea + DMPSA-di-NH4 | 20 | — | — | 0.20 | 10 | 21.7 |
| 8 | Urea + DMPSA-di-NH4 | 35 | — | — | 0.35 | 10 | 21.7 |
| 9 | Urea + DMPSA-di-NH4 | 50 | — | — | 0.50 | 10 | 21.7 |
| 10 | Urea + DMPSA-di-NH4 + Limus | 20 | 0.010 | — | 0.20 | 10 | 21.7 |
| 11 | Urea + DMPSA-di-NH4 + Limus | 35 | 0.010 | — | 0.35 | 10 | 21.7 |
| 12 | Urea + DMPSA-di-NH4 + Limus | 50 | 0.010 | — | 0.50 | 10 | 21.7 |
| 13 | Urea + DMPSA-di-NH4 + Limus | 25 | 0.020 | — | 0.50 | 10 | 21.7 |
| 14 | Urea + DMPSA-di-NH4 + Limus | 40 | 0.005 | — | 0.20 | 10 | 21.7 |
| 15 | Urea + DMPSA-di-NH4 + NBPT/DMSO 1:20 | 20 | — | 0.01 | 0.20 | 10 | 21.7 |
| 16 | Urea + DMPSA-di-NH4 + NBPT/DMSO 1:20 | 35 | — | 0.01 | 0.35 | 10 | 21.7 |
| 17 | Urea + DMPSA-di-NH4 + NBPT/DMSO 1:20 | 50 | — | 0.01 | 0.50 | 10 | 21.7 |
| 18 | | | | | | | |
| 19 | Urea + DM PSA-free acid | 35 | — | — | 0.35 | 10 | 21.7 |
| 20 | Urea + DMPSA-K2 | 20 | — | — | 0.20 | 10 | 21.7 |
| 21 | Urea + DMPSA-K2 | 35 | — | — | 0.35 | 10 | 21.7 |
| 22 | Urea + DMPSA-K2 | 50 | — | — | 0.50 | 10 | 21.7 |
| 23 | Urea + DMPSA-K2 + Limus | 20 | 0.010 | — | 0.20 | 10 | 21.7 |
| 24 | Urea + DMPSA-K2 + Limus | 35 | 0.010 | — | 0.35 | 10 | 21.7 |
| 25 | Urea + DMPSA-K2 + Limus | 50 | 0.010 | — | 0.50 | 10 | 21.7 |
| 26 | Urea + DMPSA-K2 + NBPT/DMSO 1:20 | 20 | — | 0.01 | 0.20 | 10 | 21.7 |
| 27 | Urea + DMPSA-K2 + NBPT/DMSO 1:20 | 35 | — | 0.01 | 0.35 | 10 | 21.7 |
| 28 | Urea + DMPSA-K2 + NBPT/DMSO 1:20 | 50 | — | 0.01 | 0.50 | 10 | 21.7 |
| 29 | Urea + DM PSA-free acid + Limus | 35 | 0.010 | — | 0.35 | 10 | 21.7 |

TABLE C3

NH4/NO3 Incubation test, data after 14 days

| Comp. No. | recovery red. N as % of appl. red.-N | net recovery red. N as % of appl. red.-N | recovery red. N as % of appl. N | net recovery red. N as % of appl. N | NO3—N as % of appl. N | % inhibition of NO3 formation* | Colby (A + B) − (A*B/100) recovery red. N | Colby (A + B) − (A*B/100) inhibition of NO3 formation |
|---|---|---|---|---|---|---|---|---|
| 1 | — | — | — | — | — | — | | |
| 2 | 2.6 | — | 0.0 | — | 91.6 | — | | |
| 3 | 6.2 | 3.6 | 6.2 | 6.2 | 79.3 | 13.8 | | |
| 4 | 23.1 | 20.5 | 18.5 | 18.5 | 78.7 | 14.5 | | |
| 5 | 14.0 | 11.4 | 8.3 | 8.3 | 82.2 | 10.5 | | |
| 6 | 18.4 | 15.9 | 0.0 | 0.0 | 89.9 | 1.9 | | |
| 7 | 48.2 | 45.6 | 45.4 | 45.4 | 50.7 | 45.9 | | |
| 8 | 42.9 | 40.3 | 52.4 | 52.4 | 49.9 | 46.8 | | |
| 9 | 40.7 | 38.1 | 52.5 | 52.5 | 49.9 | 46.7 | | |
| 10 | 51.5 | 48.9 | 59.1 | 59.1 | 36.7 | 61.6 | 47.6 | 53.4 |
| 11 | 55.2 | 52.6 | 66.3 | 66.3 | 29.4 | 69.8 | 42.5 | 54.2 |
| 12 | 71.2 | 68.6 | 75.2 | 75.2 | 19.5 | 80.9 | 40.4 | 54.1 |
| 13 | 75.0 | 72.4 | 77.6 | 77.6 | 15.4 | 85.4 | 50.8 | 54.4 |
| 14 | 54.1 | 51.5 | 60.0 | 60.0 | 37.9 | 60.3 | 51.8 | 51.6 |
| 15 | 54.0 | 51.4 | 62.1 | 62.1 | 30.9 | 68.4 | 54.2 | 46.9 |
| 16 | 62.8 | 60.2 | 68.1 | 68.1 | 28.9 | 70.3 | 49.8 | 47.8 |
| 17 | 62.5 | 59.9 | 67.7 | 67.7 | 22.7 | 77.2 | 47.9 | 47.7 |
| 18 | | | | | | | | |
| 19 | 37.1 | 34.5 | 51.2 | 51.2 | 43.6 | 53.8 | | |
| 20 | 28.9 | 26.3 | 45.5 | 45.5 | 56.7 | 39.2 | | |

TABLE C3-continued

NH4/NO3 Incubation test, data after 14 days

| Comp. No. | recovery red. N as % of appl. red.- N | net recovery red. N as % of appl. red.- N | recovery red. N as % of appl. N | net recovery red. N as % of appl. N | NO3—N as % of appl. N | % inhibition of NO3 formation* | Colby (A + B) − (A*B/100) recovery red. N | inhibition of NO3 formation |
|---|---|---|---|---|---|---|---|---|
| 21 | 27.2 | 24.6 | 44.3 | 44.3 | 56.4 | 39.5 | | |
| 22 | 35.8 | 33.2 | 50.4 | 50.4 | 46.2 | 50.9 | | |
| 23 | 57.4 | 54.8 | 66.0 | 66.0 | 33.6 | 65.0 | 29.0 | 47.6 |
| 24 | 49.4 | 46.8 | 63.3 | 63.3 | 31.8 | 67.1 | 27.3 | 47.9 |
| 25 | 57.3 | 54.7 | 71.6 | 71.6 | 21.0 | 79.2 | 35.7 | 57.7 |
| 26 | 50.4 | 47.8 | 57.9 | 57.9 | 30.3 | 68.7 | 38.0 | 40.4 |
| 27 | 63.3 | 60.7 | 68.7 | 68.7 | 19.6 | 80.7 | 36.5 | 40.7 |
| 28 | 65.9 | 63.3 | 69.9 | 69.9 | 22.1 | 78.0 | 43.8 | 51.8 |
| 29 | 60.7 | 58.1 | 66.9 | 66.9 | 28.6 | 70.6 | 36.9 | 60.2 |

TABLE C4

NH4/NO3 Incubation test, data after 28 days

| Comp. No. | recovery red. N as % of appl. red.- N | net recovery red. N as % of appl. red.- N | recovery red. N as % of appl. N | net recovery red. N as % of appl. N | NO3—N as % of appl. N | % inhibition of NO3 formation* | Colby (A + B) − (A*B/100) recovery red. N | inhibition of NO3 formation |
|---|---|---|---|---|---|---|---|---|
| 1 | — | — | — | — | — | — | | |
| 2 | 6.6 | — | 0.0 | — | 95.4 | — | | |
| 3 | 10.3 | 3.7 | 0.0 | 0.0 | 96.7 | −1.4 | | |
| 4 | 12.4 | 5.8 | 0.0 | 0.0 | 95.3 | 0.1 | | |
| 5 | 21.4 | 14.8 | 0.0 | 0.0 | 96.9 | −1.7 | | |
| 6 | 13.1 | 6.5 | 0.0 | 0.0 | 93.3 | 2.2 | | |
| 7 | 27.5 | 20.9 | 18.5 | 18.5 | 77.0 | 19.5 | | |
| 8 | 39.0 | 32.4 | 27.4 | 27.4 | 70.3 | 26.5 | | |
| 9 | 46.5 | 39.9 | 37.8 | 37.8 | 60.0 | 37.5 | | |
| 10 | 30.0 | 23.4 | 25.3 | 25.3 | 71.5 | 25.3 | 18.4 | 23.8 |
| 11 | 56.6 | 50.0 | 49.2 | 49.2 | 45.3 | 53.1 | 25.5 | 34.8 |
| 12 | 65.2 | 58.6 | 55.9 | 55.9 | 36.8 | 62.1 | 36.7 | 42.1 |
| 13 | 64.0 | 57.4 | 55.7 | 55.7 | 39.2 | 59.6 | 37.6 | 43.3 |
| 14 | 39.7 | 33.1 | 36.6 | 36.6 | 61.9 | 35.5 | 18.2 | 32.6 |
| 15 | 49.3 | 42.6 | 42.3 | 42.3 | 52.1 | 45.9 | 26.1 | 21.2 |
| 16 | 59.5 | 52.9 | 50.9 | 50.9 | 46.2 | 52.1 | 36.8 | 28.1 |
| 17 | 43.7 | 37.1 | 35.2 | 35.2 | 63.4 | 33.9 | 43.8 | 38.9 |
| 18 | | | | | | | | |
| 19 | 37.3 | 30.7 | 31.9 | 31.9 | 62.9 | 34.5 | | |
| 20 | 31.3 | 24.7 | 24.2 | 24.2 | 76.6 | 19.9 | | |
| 21 | 32.4 | 25.8 | 27.9 | 27.9 | 70.0 | 26.9 | | |
| 22 | 37.6 | 31.0 | 31.5 | 31.5 | 68.5 | 28.5 | | |
| 23 | 60.7 | 54.1 | 48.9 | 48.9 | 43.4 | 55.1 | 27.5 | 18.8 |
| 24 | 54.1 | 47.5 | 39.0 | 39.0 | 53.6 | 44.3 | 28.5 | 25.9 |
| 25 | 42.8 | 36.2 | 32.3 | 32.3 | 72.3 | 24.5 | 33.5 | 27.6 |
| 26 | 36.2 | 29.6 | 26.7 | 26.7 | 67.1 | 30.0 | 29.6 | 21.6 |
| 27 | 51.7 | 45.1 | 35.7 | 35.7 | 54.6 | 43.2 | 30.6 | 28.5 |
| 28 | 60.1 | 53.5 | 48.4 | 48.4 | 40.6 | 58.0 | 35.5 | 30.1 |
| 29 | 51.1 | 44.4 | 37.3 | 37.3 | 59.4 | 38.1 | 33.2 | 33.6 |

The experimental data described in the Tables A1 to A4, Tables B1 to B3, and Tables C1 to C4 show that the mixtures comprising (a) DMPSA, or its ammonium salt, or its potassium salt as compound I (nitrification inhibitor) and (b) NBPT, or a mixture comprising NBPT and NPPT, as compound II (urease inhibitor) have a synergistic effect in reducing the N2O emissions from soils, and/or in reducing the NH3 emissions from soils.

The invention claimed is:
1. A mixture comprising a urea-containing fertilizer and as active components
   1) A nitrification inhibitor (I) which is a potassium salt, sodium salt, magnesium salt, or an ammonium salt of 2-(3,4-dimethyl-1H-pyrazol-1-yl)succinic acid and/or 2-(4,5-dimethyl-1H-pyrazol-1-yl)succinic acid, and
   2) a urease inhibitor (II) which is a mixture comprising N-(n-butyl)thiophosphoric acid triamide (NBPT) and N-(n-propyl)thiophosphoric acid triamide (NPPT);
   wherein compound I and compound II are present in a weight ratio of from 50:1 to 7:1.
2. The mixture according to claim 1, wherein compound II is a mixture comprising N-(n-butyl)thiophosphoric acid triamide (NBPT) and N-(n-propyl)thiophosphoric acid triamide (NPPT), wherein NBPT is contained in amounts of from 50 to 90 wt. % and NPPT is contained in amounts of from 10 to 50 wt. % based on the total amount of active urease inhibitors.

3. The mixture according to claim 1, wherein compound I is a potassium salt or an ammonium salt of 2-(3,4-dimethyl-1H-pyrazol-1-yl)succinic acid and/or 2-(4,5-dimethyl-1H-pyrazol-1-yl)succinic acid.

4. An agrochemical composition, the composition comprising an auxiliary and a mixture according to claim 1.

5. A method for enhancing use efficiency of urea-containing fertilizer or for urease inhibition, the method comprising applying an effective amount of the mixture as defined in claim 1 to plant propagules.

6. The method as claimed in claim 5, wherein compound I and compound II are applied simultaneously, either as a mixture or separately, or subsequently to the plant propagules.

7. Plant propagation material, the material comprising a mixture as defined in claim 1, in an amount of from 0.1 to 10 kg active substances per 100 kg of seed.

8. The mixture according to claim 1, wherein compound I is a potassium salt or an ammonium salt of 2-(3,4-dimethyl-1H-pyrazol-1-yl)succinic acid and/or 2-(4,5-dimethyl-1H-pyrazol-1-yl)succinic acid.

9. A mixture comprising a urea-containing fertilizer and as active components
   1) a nitrification inhibitor (I) which is a potassium salt, sodium salt, magnesium salt, or an ammonium salt of 2-(3,4-dimethyl-1H-pyrazol-1-yl)succinic acid and/or 2-(4,5-dimethyl-1H-pyrazol-1-yl)succinic acid, and
   2) a urease inhibitor (II) which is selected from the group consisting of N-(n-butyl)thiophosphoric acid triamide (NBPT) (P.26), N-(n-propyl)thiophosphoric acid triamide (NPPT) (P.27), mixtures comprising N-(n-butyl)thiophosphoric acid triamide (NBPT) and N-(n-propyl)thiophosphoric acid triamide (NPPT) (P.28), mixtures comprising N-(n-butyl) thiophosphoric acid triamide (NBPT) and N-(n-propyl) thiophosphoric acid triamide (NPPT) wherein NBPT is contained in amounts of from 50 to 90 wt. % and NPPT is contained in amounts of from 10 to 50 wt. % based on the total amount of active urease inhibitors (P.29), phenylphosphorodiamidate (PPD/PPDA) (P.30), and 2-nitrophenyl phosphoric triamide (2-NPT) (P.31),
   wherein compound I and compound II are present in a weight ratio of from 50:1 to 7:1.

10. The mixture according to claim 9, wherein compound I is a potassium salt or an ammonium salt of 2-(3,4-dimethyl-1H-pyrazol-1-yl)succinic acid and/or 2-(4,5-dimethyl-1H-pyrazol-1-yl)succinic acid.

11. A method for enhancing the use efficiency of urea-containing fertilizer or for urease inhibition with an effective amount of the mixture as defined in claim 9, wherein compound I and compound II are applied simultaneously, either as a mixture or separately, or subsequently to the plant propagules.

* * * * *